United States Patent
Kumatani et al.

(10) Patent No.: US 11,574,628 B1
(45) Date of Patent: Feb. 7, 2023

(54) DEEP MULTI-CHANNEL ACOUSTIC MODELING USING MULTIPLE MICROPHONE ARRAY GEOMETRIES

(71) Applicant: Amazon Technologies, Inc., Seattle, WA (US)

(72) Inventors: Kenichi Kumatani, San Jose, CA (US); Minhua Wu, San Jose, CA (US); Shiva Sundaram, Fremont, CA (US); Nikko Strom, Kirkland, WA (US); Bjorn Hoffmeister, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/368,331

(22) Filed: Mar. 28, 2019

Related U.S. Application Data

(63) Continuation-in-part of application No. 16/143,910, filed on Sep. 27, 2018, now Pat. No. 10,726,830.

(51) Int. Cl.
*G10L 15/16* (2006.01)
*G10L 25/30* (2013.01)
(Continued)

(52) U.S. Cl.
CPC ............... *G10L 15/16* (2013.01); *G06N 3/08* (2013.01); *G10L 15/02* (2013.01); *G10L 25/30* (2013.01)

(58) Field of Classification Search
CPC ......... G10L 15/02; G10L 15/16; G10L 25/30; G10L 2021/02166; G10L 21/00; G10L 21/0224; G10L 21/0232; G06N 3/08
See application file for complete search history.

(56) References Cited

U.S. PATENT DOCUMENTS

| 9,560,446 B1 * | 1/2017 | Chang | H04R 3/005 |
| 2012/0281853 A1 * | 11/2012 | Dunn | H04R 3/005 |
| | | | 381/92 |

(Continued)

FOREIGN PATENT DOCUMENTS

WO   WO-2015048070 A1 *   4/2015   ......... G10L 21/0272

OTHER PUBLICATIONS

Nakano, Alberto Yoshihiro, Seiichi Nakagawa, and Kazumasa Yamamoto. "Distant speech recognition using a microphone array network." IEICE transactions on information and systems 93.9 (2010): 2451-2462. (Year: 2010).*

(Continued)

*Primary Examiner* — Paras D Shah
(74) *Attorney, Agent, or Firm* — Pierce Atwood LLP

(57) ABSTRACT

Techniques for speech processing using a deep neural network (DNN) based acoustic model front-end are described. A new modeling approach directly models multi-channel audio data received from a microphone array using a first model (e.g., multi-geometry/multi-channel DNN) that is trained using a plurality of microphone array geometries. Thus, the first model may receive a variable number of microphone channels, generate multiple outputs using multiple microphone array geometries, and select the best output as a first feature vector that may be used similarly to beamformed features generated by an acoustic beamformer. A second model (e.g., feature extraction DNN) processes the first feature vector and transforms it to a second feature vector having a lower dimensional representation. A third model (e.g., classification DNN) processes the second feature vector to perform acoustic unit classification and generate text data. The DNN front-end enables improved performance despite a reduction in microphones.

21 Claims, 33 Drawing Sheets

(51) Int. Cl.
*G10L 15/02* (2006.01)
*G06N 3/08* (2023.01)

(56) References Cited

U.S. PATENT DOCUMENTS

| | | | | |
|---|---|---|---|---|
| 2012/0294446 | A1* | 11/2012 | Visser | H04S 1/007 381/17 |
| 2014/0328487 | A1* | 11/2014 | Hiroe | G10L 21/0272 381/56 |
| 2015/0226831 | A1* | 8/2015 | Nakamura | G01S 5/20 367/118 |
| 2016/0372129 | A1* | 12/2016 | Nakadai | G10L 25/84 |
| 2018/0020305 | A1* | 1/2018 | Hardek | H04R 29/004 |
| 2018/0068675 | A1* | 3/2018 | Variani | G10L 19/008 |
| 2018/0206038 | A1* | 7/2018 | Tengelsen | H04S 7/303 |
| 2018/0249267 | A1* | 8/2018 | Klingler | H04R 29/005 |
| 2018/0367930 | A1* | 12/2018 | Hardek | G10L 15/01 |
| 2019/0080689 | A1* | 3/2019 | Kagoshima | G10L 25/51 |
| 2019/0103849 | A1* | 4/2019 | Shaya | H04R 1/406 |
| 2020/0257496 | A1* | 8/2020 | Lee | G06F 1/325 |

OTHER PUBLICATIONS

Xiao, Xiong, et al. "Deep beamforming networks for multi-channel speech recognition." 2016 IEEE International Conference on Acoustics, Speech and Signal Processing (ICASSP). IEEE, 2016. (Year: 2016).*

Tu, Yan-Hui, et al. "An information fusion framework with multi-channel feature concatenation and multi-perspective system combination for the deep-learning-based robust recognition of microphone array speech." Computer Speech & Language 46 (2017): 517-534. (Year: 2017).*

Ochiai, Tsubasa, et al. "Unified architecture for multichannel end-to-end speech recognition with neural beamforming." IEEE Journal of Selected Topics in Signal Processing 11.8 (2017): 1274-1288. (Year: 2017).*

\* cited by examiner

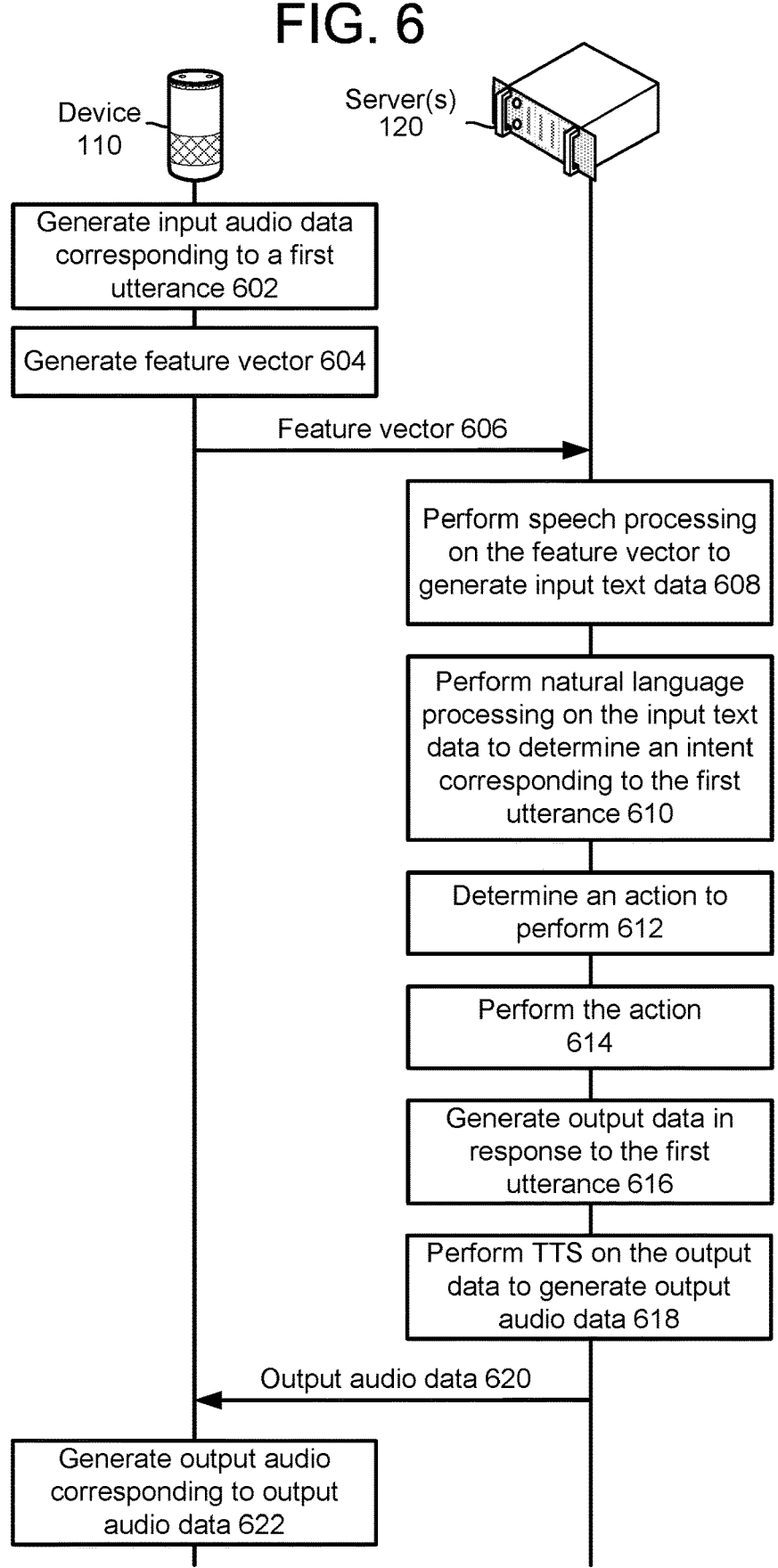

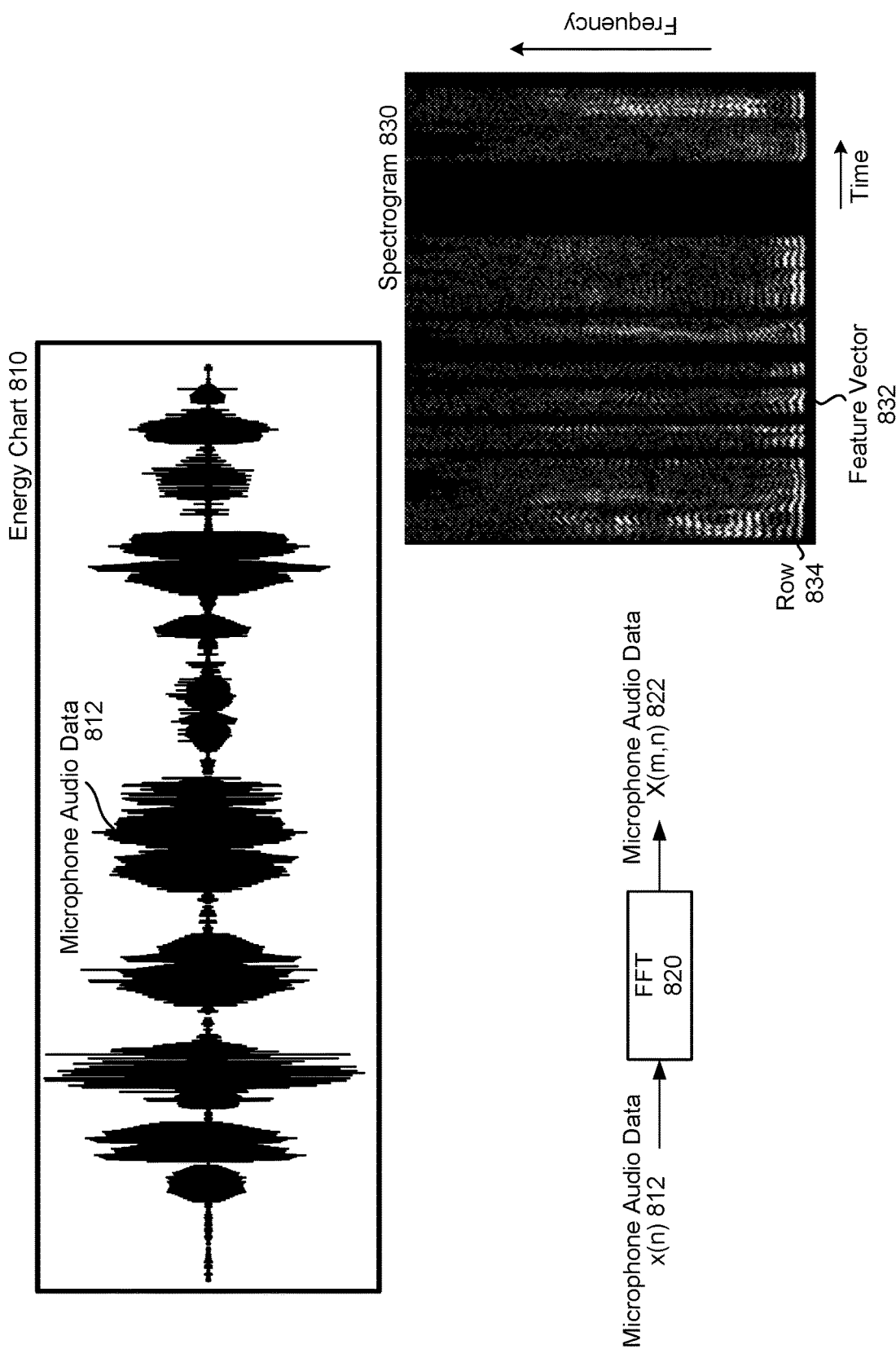

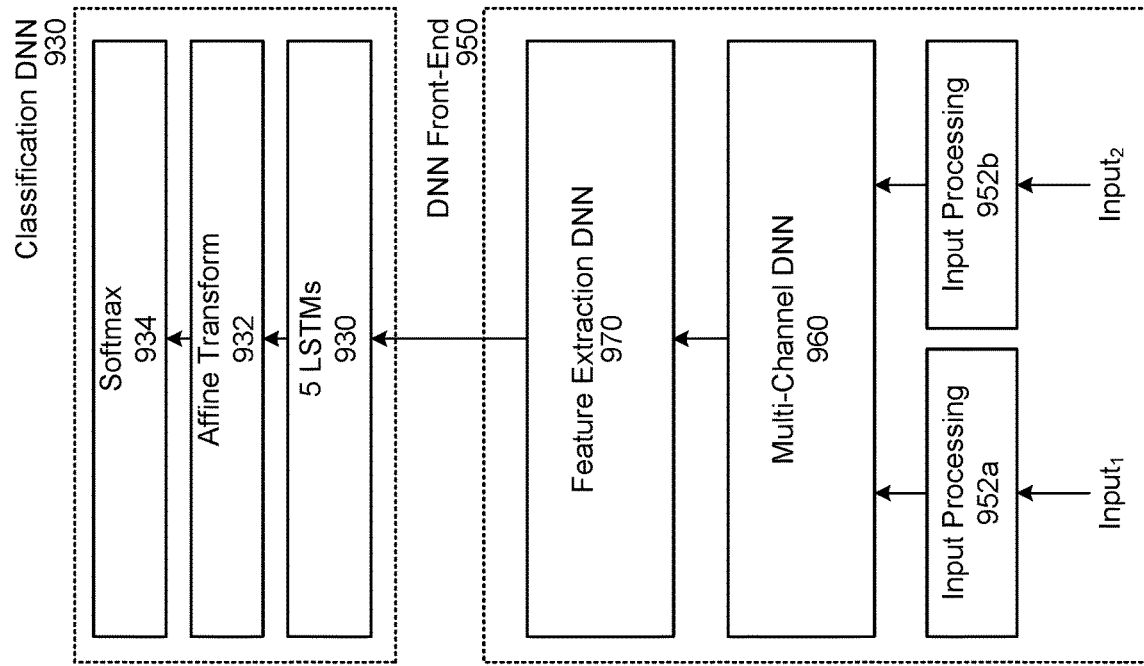
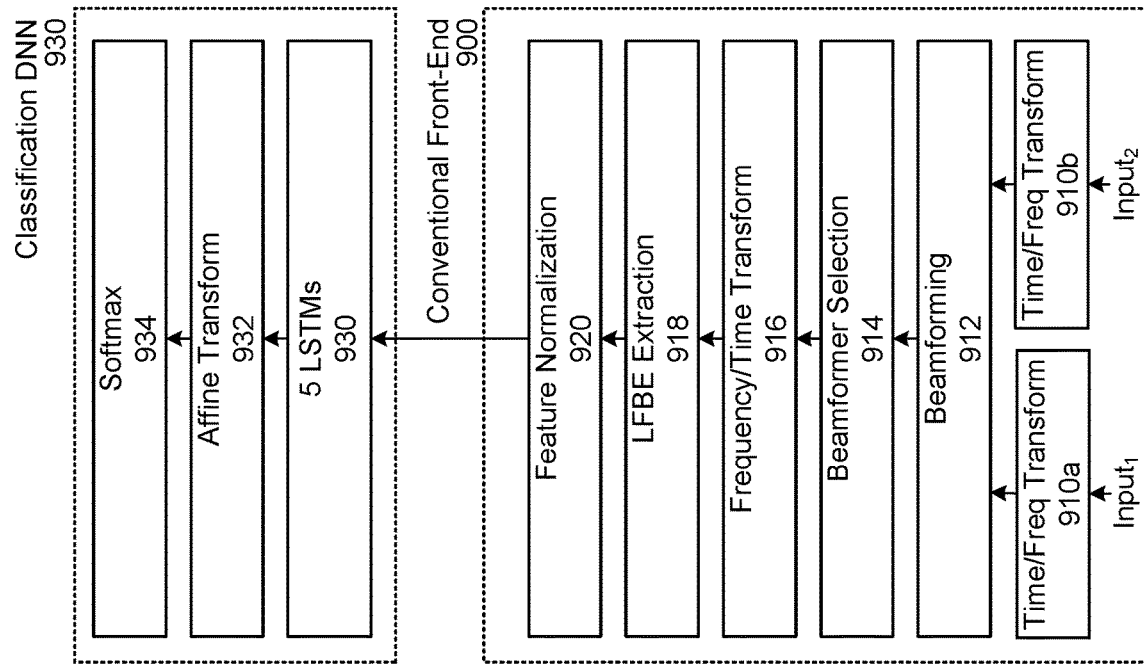
FIG. 9

FIG. 17A

All Potential Microphone Array Configurations 1710

Multi-Geometry Block Affine Transforms 1532

1720 — Determine estimated position(s) associated with all potential microphone array configurations 1722 — Configure multi-geometry block affine transforms with all estimated position(s)

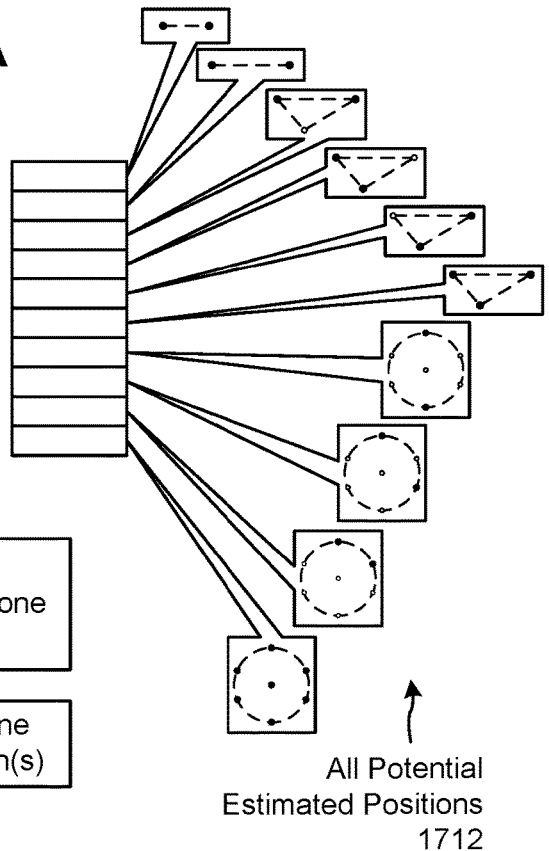

All Potential Estimated Positions 1712

FIG. 17B

1740 — Identify device identification data

1742 — Determine microphone array configuration associated with device identification data 1744 — Select estimated position(s) associated with microphone array configuration 1746 — Configure multi-geometry block affine transforms with relevant estimated position(s)

Relevant Microphone Array Configurations 1730

Multi-Geometry Block Affine Transforms 1532

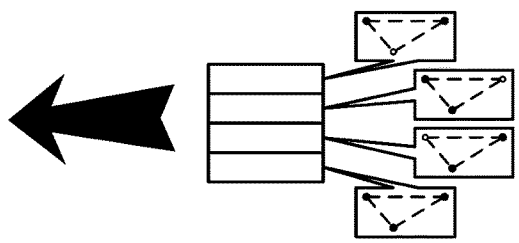

Relevant Estimated Positions 1732

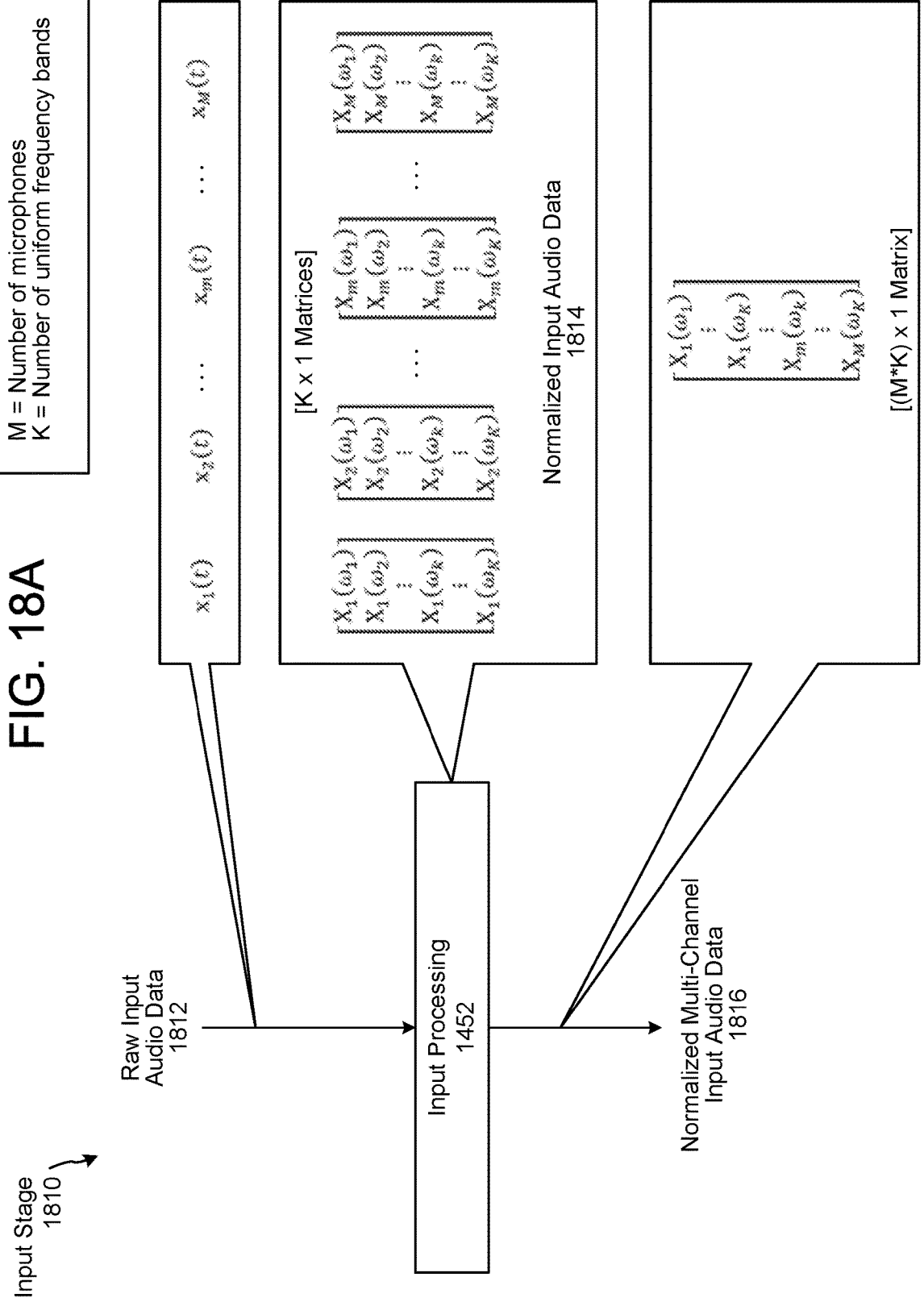

FIG. 18C

Multi-Geometry Multi-Channel DNN Output Stage 1830

K = Number of uniform frequency bands
D = Number of directions
sd = Selected direction
A = Number of microphone arrays
sa = Selected microphone array Normalized Multi-Channel Input Audio Data 1816 → Multi-Geometry / Multi-Channel (MG/MC) DNN 1460 → MG/MC DNN Output Data 1832

Single Direction Output Data 1832a $$\begin{bmatrix} Y_{sa,sd}(\omega_1) \\ Y_{sa,sd}(\omega_2) \\ \vdots \\ Y_{sa,sd}(\omega_K) \end{bmatrix}$$

[K x 1 Matrix]

Multiple Direction Output Data 1832b $$\begin{bmatrix} Y_{sa1,sd1}(\omega_1) & Y_{sa2,sd2}(\omega_1) \\ Y_{sa1,sd1}(\omega_2) & Y_{sa2,sd2}(\omega_2) \\ \vdots & \vdots \\ Y_{sa1,sd1}(\omega_K) & Y_{sa2,sd2}(\omega_K) \end{bmatrix}$$

[K x 2 Matrix]

Multiple-Array Output Data 1832d $$\begin{bmatrix} Y_{1,1}(\omega_1) & Y_{1,D}(\omega_1) & \cdots & Y_{1,D}(\omega_1) \\ Y_{2,1}(\omega_1) & Y_{2,D}(\omega_1) & \cdots & Y_{2,D}(\omega_1) \\ \vdots & \vdots & \ddots & \vdots \\ Y_{A,1}(\omega_1) & Y_{A,D}(\omega_1) & \cdots & Y_{A,D}(\omega_K) \end{bmatrix}$$

[A x (D*K) Matrix]

Single-Array Output Data 1832c $$\begin{bmatrix} Y_{sa,1}(\omega_1) & \cdots & Y_{sa,d}(\omega_1) & \cdots & Y_{sa,D}(\omega_1) \\ Y_{sa,1}(\omega_2) & \cdots & Y_{sa,d}(\omega_2) & \cdots & Y_{sa,D}(\omega_2) \\ \vdots & \cdots & \vdots & \cdots & \vdots \\ Y_{sa,1}(\omega_K) & \cdots & Y_{sa,d}(\omega_K) & \cdots & Y_{sa,D}(\omega_K) \end{bmatrix}$$

[K x D Matrix]

US 11,574,628 B1

DEEP MULTI-CHANNEL ACOUSTIC MODELING USING MULTIPLE MICROPHONE ARRAY GEOMETRIES

CROSS-REFERENCE TO RELATED APPLICATION DATA

This application is a continuation-in-part of, and claims the benefit of priority of, U.S. Non-Provisional patent application Ser. No. 16/143,910, filed Sep. 27, 2018 and entitled "DEEP MULTI-CHANNEL ACOUSTIC MODELING," in the names of Arindam Mandal, et al. The above utility application is herein incorporated by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of computing devices to perform tasks based on the user's spoken commands. The combination of speech recognition processing and/or natural language understanding processing techniques, or otherwise determining the meaning behind audio data of an utterance, is referred to herein as speech processing. Speech processing may also involve converting a user's speech into text data which may then be provided to skills or software configured to execute specific functionality based on the user's spoken commands.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 6 is a signal flow diagram illustrating an example of processing speech and generating output audio according to embodiments of the present disclosure.

FIG. 8 illustrates examples of audio data in a time domain and a frequency domain.

FIG. 9 is a conceptual diagram illustrating components of a conventional audio front-end as well as components of a front-end deep neural network (DNN) according to embodiments of the present disclosure.

FIGS. 17A-17C illustrate examples of processing input audio data using all potential estimated positions or selecting a reduced number relevant estimated positions according to embodiments of the present disclosure.

FIGS. 18A-18D illustrate examples of data generated by different components within the front-end DNN according to embodiments of the present disclosure.

DETAILED DESCRIPTION

Figure 1:
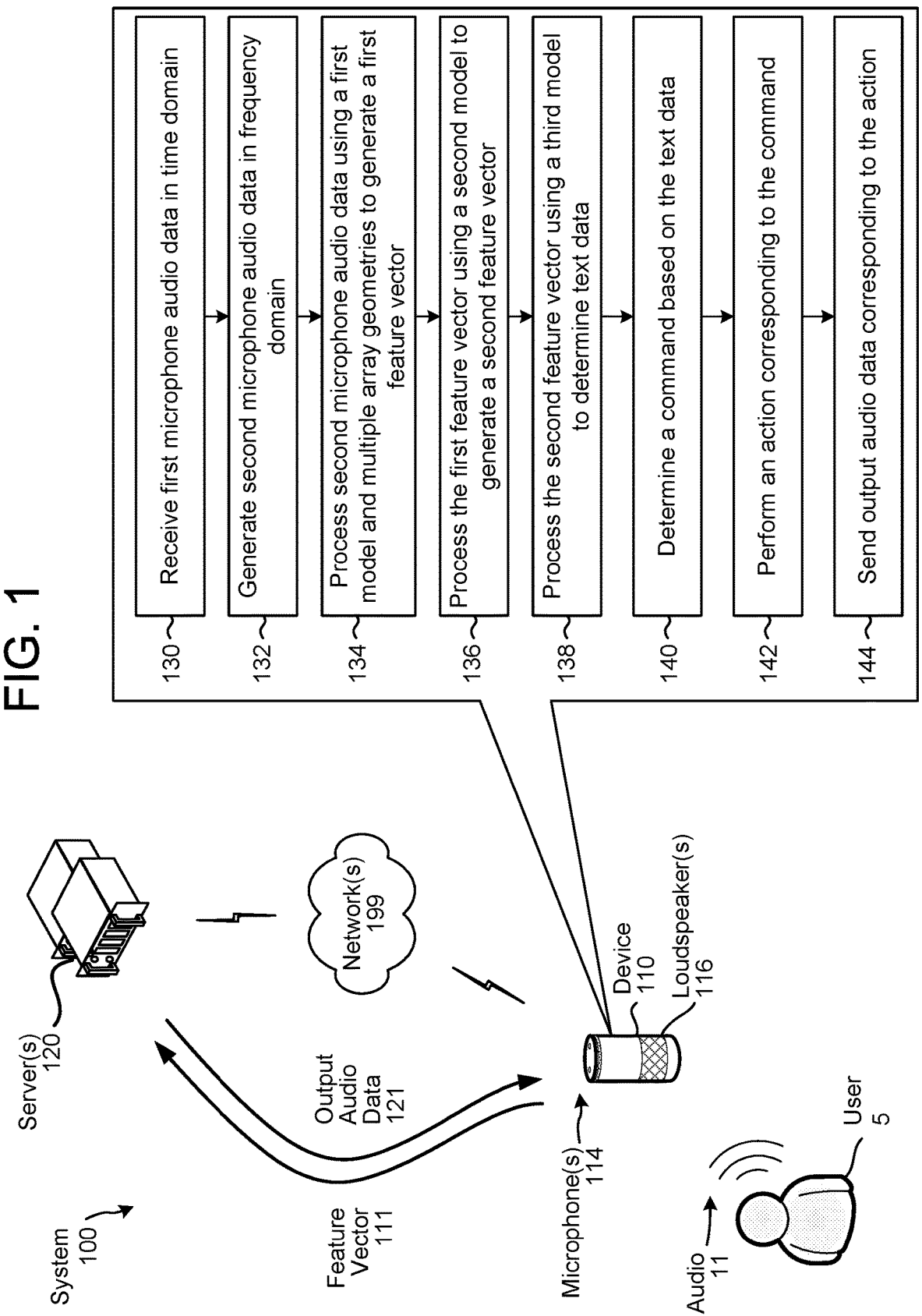
FIG. 1 illustrates a system configured to perform speech processing using a deep neural network (DNN) based acoustic model front-end initialized with data corresponding to multiple microphone array geometries according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech processing system.

In a conventional system, a local device may process input audio data captured by a microphone array to separate the input audio data into individual signals that correspond to a plurality of directions, with each signal corresponding to a particular direction. This may be referred to as "beamforming" and is just one technique for audio signal processing. Beamforming improves speech processing by isolating audio data generated in a specific direction. After beamforming, the local device may select a single audio signal (e.g., beamformed audio data) with the highest energy to upload to remote server(s) for further processing. The remote server(s) may receive the beamformed audio data and perform feature extraction, such as log-mel filter bank energy (LFBE) feature extraction, to generate a feature vector. A conventional audio front-end comprises both beamforming and feature extraction, although the local device typically performs beamforming and the remote server(s) typically perform feature extraction.

The remote server(s) may then perform acoustic unit classification on the feature vector using a classification deep neural network (DNN) to detect distinct short sounds (e.g., predict ASR senon or phoneme targets, sometimes referred to as acoustic modeling). The results from the acoustic modeling may be used in a language modeling operation to ultimately generate output text, which may be used for NLU processing. ASR operations may include both acoustic modeling and language modeling. Thus, a conventional far-field speech recognition system (e.g., distant speech recognition system) consists of distinct components for beamforming, feature extraction and acoustic unit classification/acoustic modeling. These distinct components are typically optimized individually for specific component-specific purposes, such as signal enhancement (e.g., audio signal sounds clearer due to less noise).

To improve speech processing, systems and methods are disclosed that include a DNN-based acoustic model front-end that is initialized with data corresponding to multiple microphone array geometries and mimics beamforming and feature extraction in a manner which may result in a deterministic system. Thus, a conventional audio front-end may be replaced with a new modeling approach where multi-channel audio data from a microphone array is directly modeled in the DNN-based acoustic model front-end before being sent to a remote server. For example, the beamforming may be performed using a first processing block (e.g., multi-geometry/multi-channel DNN) that is trained using a plurality of microphone array geometries. The multi-geometry/multi-channel DNN is configured to process multi-channel input audio data (e.g., audio data corresponding to two or more microphones) using multiple microphone array geometries to generate directional audio data for each of the multiple microphone array geometries, as will be described in greater detail below. For example, the first model may receive a variable number of input microphone channels, generate multiple outputs using multiple microphone array geometries, and generate a compact representation (e.g., first feature vector) by selecting maximum energy values from the multiple outputs. In some examples, some or all of the multiple outputs may be combined, for example using a weighted sum, such that the maximum energy values selected may correspond to several of the multiple outputs. The first feature vector may be used similarly to beamformed features generated by an acoustic beamformer.

Similarly, feature extraction may be performed using a second processing block (e.g., feature extraction DNN) that takes the output (e.g., first feature vector) from the first processing block and transforms it to a lower dimensional representation (e.g., second feature vector). The second feature vector is then sent to a third processing block (e.g., classification DNN) that performs acoustic unit classification, similar to the conventional system.

By replacing the conventional audio front-end with a DNN-based acoustic model front-end, components of the far-field speech recognition system may be jointly optimized for ASR processing (as opposed to individually optimized for signal enhancement). For example, the first processing block (e.g., multi-geometry/multi-channel DNN), the second processing block (e.g., feature extraction DNN) and the third processing block (e.g., classification DNN) may be jointly optimized by optimizing each processing block in a stage-wise or other manner. Additionally or alternatively, components of the far-field speech recognition system may be optimized to capture speech even if this results in more noise.

Another benefit of using the DNN-based acoustic model front-end is that the system may be able to obtain desired system performance even if there is a reduction in a number of microphones, as performance using the techniques herein may be similar using two microphones for audio capture as it is using four or more microphones. Additionally, a bandwidth requirement may be reduced during real time processing as the local device only needs to upload low dimensional feature vectors (e.g., a second feature vector) for speech processing by the server(s) rather than sending more bandwidth intensive raw audio data (or other data).

FIG. 1 illustrates a system configured to perform speech processing using a deep neural network (DNN) based acoustic model front-end initialized with data corresponding to multiple microphone array geometries according to embodiments of the present disclosure. Although the figures and discussion of the present disclosure illustrate certain operational steps of the system in a particular order, the steps described may be performed in a different order (as well as certain steps removed or added) without departing from the intent of the disclosure. A plurality of devices may communicate across one or more network(s) 199. For example, FIG. 1 illustrates an example of a device 110 (e.g., a speech-controlled device) local to a user 5 communicating with server(s) 120 via the network(s) 199.

The server(s) 120 may be configured to process voice commands (e.g., voice inputs) received from the device 110. For example, the device 110 may capture input audio 11 corresponding to a voice command from the user 5 (e.g., an utterance), may generate input audio data representing the audio 11, and may process the input audio data to generate a feature vector 111. For example, the device 110 may determine a number of values, called features, representing the qualities of the audio data, along with a set of those values, called a feature vector or audio feature vector (e.g., feature vector data, vector data, etc.), representing the features/qualities of the audio data within the frame for a particular frequency band. Many different features may be determined, as known in the art, and each feature represents some quality of the audio that may be useful for speech processing. A number of approaches may be used by the device 110 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

Whereas conventional techniques send the input audio data to the server(s) 120 for speech processing, the device may send the feature vector 111 to the server(s) 120 for speech processing and may upload audio data at a later point in time. The server(s) 120 may receive the feature vector 111, may identify the voice command represented in the feature vector 111, may determine one or more action(s) to perform, may perform at least some of the one or more action(s), and/or may send a command to the device 110 to perform at least some of the one or more action(s). Thus, the server(s) 120 may identify the voice command and may perform action(s) and/or send a command to the device 110 to perform action(s) corresponding to the voice command.

FIG. 1 illustrates the server(s) 120 processing a voice command when an utterance is received from a device 110. For example, the server(s) 120 may generate NLU intent data based on the feature vector 111 and may perform one or more action(s) based on the NLU intent data. The server(s) 120 may process the feature vector 111 and generate output audio data 121 as a response to the user 5. For example, the feature vector 111 may correspond to a voice command to stream music (e.g., "Alexa, please play electronic dance music") and the output audio data 121 may correspond to confirmation that the voice command was received (e.g., "Here is a playlist of electronic dance music.") or other responsive data.

As illustrated in FIG. 1, the system 100 may receive (130) first microphone audio data in a time domain. For example, the microphone(s) 114 may capture the audio 11 and generate the first microphone audio data. The system 100 may then generate (132) second microphone audio data in a frequency domain, such as by performing Fast Fourier Transform (FFT) processing or the like. The system 100 may process (134) the second microphone audio data using a first model (e.g., multi-geometry/multi-channel deep neural network (DNN), which will be described in greater detail below) that simulates multiple microphone array geometries (e.g., microphone array configuration(s) or estimated positions corresponding to the microphone array configuration(s)) to generate a first feature vector, may process (136) the first feature vector using a second model (e.g., feature extraction DNN) to generate a second feature vector, and may process (138) the second feature vector using a third model (e.g., classification DNN) to determine text data. For example, the text data may correspond to the utterance represented by the input audio data.

The system 100 may determine (140) a command based on the text data, may perform (142) an action corresponding to the command and may send (144) output audio data corresponding to the action to the device 110. While not illustrated in FIG. 1, in some examples the server(s) 120 may also send an instruction to perform the action to the device 110 without departing from the disclosure.

As will be discussed in greater detail below, the first model (e.g., multi-channel DNN, multi-geometry/multi-channel DNN) takes raw signals collected from multiple microphones and produces a compact representation (e.g., first feature vector) that may be used similarly to beamformed features generated by beamforming in using conventional techniques. For example, the first model (e.g., multi-channel DNN) may perform spatial filtering to separate the input audio data into a plurality of directions, determine an amount of energy in individual frequency bands for each of the plurality of directions, and determine an amount of power in one or more of the plurality of directions, as described in greater detail below with regard to FIG. 10. Additionally or alternatively, the first model (multi-geometry/multi-channel DNN) may receive multi-channel input audio data (e.g., audio data corresponding to two or more microphones) and perform spatial filtering using multiple microphone array geometries to separate the input audio data into a plurality of directions for individual microphone array geometries (e.g., generate individual directional audio data for each microphone array configuration and/or estimated position associated with the microphone array configuration), determine an amount of energy in individual frequency bands for each of the plurality of directions/plurality of microphone array geometries, and determine an amount of power in one or more of the plurality of directions, as described in greater detail below with regard to FIGS. 14-15. For example, the first model may receive a variable number of input microphone channels, generate multiple outputs using multiple microphone array geometries, and the first feature vector by selecting maximum energy values from the multiple outputs. In some examples, some or all of the multiple outputs may be combined, for example using a weighted sum, such that the maximum energy values selected may correspond to several of the multiple outputs. The first feature vector may be used similarly to beamformed features generated by an acoustic beamformer.

If the first model uses multiple microphone array geometries, the first feature vector may correspond to a single direction (e.g., one direction of the plurality of directions, or a combination of two or more directions of the plurality of directions) and a single microphone array geometry, a single direction and a combination of microphone array geometries (e.g., highest energy in a first direction from amongst all of the microphone array geometries), multiple directions (e.g., first direction associated with a first audio source, second direction associated with a second audio source, etc.), the directional data associated with a single microphone array geometry (e.g., each of the plurality of directions for the microphone array geometry), and/or the directional data associated with two or more microphone array geometries, as will be described in greater detail below with regard to FIG. 18C.

The output of the first model (e.g., first feature vector) may be input to the second model (feature extraction DNN), which transforms this output to a lower dimensional representation (e.g., second feature vector). For example, the second model may convert the first feature vector to a Mel-scale using a Mel filter bank or some form of matrix transformation (e.g., affine matrix weighted to convert to the Mel-scale) to combine multiple frequency bands based on the Mel-scale. The Mel-scale aims to mimic the non-linear human ear perception of sound, by being more discriminative at lower frequencies and less discriminative at higher frequencies. Thus, the second feature vector may indicate a magnitude of energy in individual frequency bands of the beamformed audio data, where the frequency bands are non-uniform and based on the Mel-scale.

The output of the second model is input to the third model (e.g., classification DNN), which may detect distinct short sounds (e.g., predict ASR senon or phoneme targets) and ultimately generate the text data for NLU processing. Thus, the third model is trained using data in the form of the second feature vector in order to classify senons, as discussed in greater detail below.

As used herein, the output of the first model may be referred to as a first feature vector (e.g., first feature vector data) and an output of the second model may be referred to as a second feature vector (e.g., second feature vector data). However, this numbering convention is intended for illustrative purposes only and the disclosure may distinguish between feature vector data generated by the first model and the second model using other conventions and/or any techniques known to one of skill in the art without departing from the disclosure. For example, a technical description illustrating how the first model processes the input audio data to generate output feature vector data may refer to generating first feature vector data, second feature vector data, and/or third feature vector data without departing from the disclosure.

One of skill in the art may recognize that the first feature vector data generated by the first model may be different than the second feature vector data generated by the second model in one or more ways without departing from the disclosure. For example, the first feature vector data may represent first qualities of the input audio data, may include a first number of features (e.g., values), and/or correspond to a first number of frequency ranges (e.g., frequency bands), whereas the second feature vector may represent second qualities of the input audio data, may include a second number of features, and/or correspond to a second number of frequency ranges. However, the output of both the first model and the second model may be referred to as feature vectors (e.g., feature vector data) without departing from the disclosure.

As known in the art, a matrix is a rectangular array of numbers arranged in rows and columns. For example, a 2×3 matrix may have two rows and three columns, whereas an m×n matrix may have m rows and n columns. The individual items (e.g., values) in an m×n matrix A are called its elements or entries and may be denoted by $a_{ij}$, where i varies from 1 to m and j varies from 1 to n.

Figure 18B:
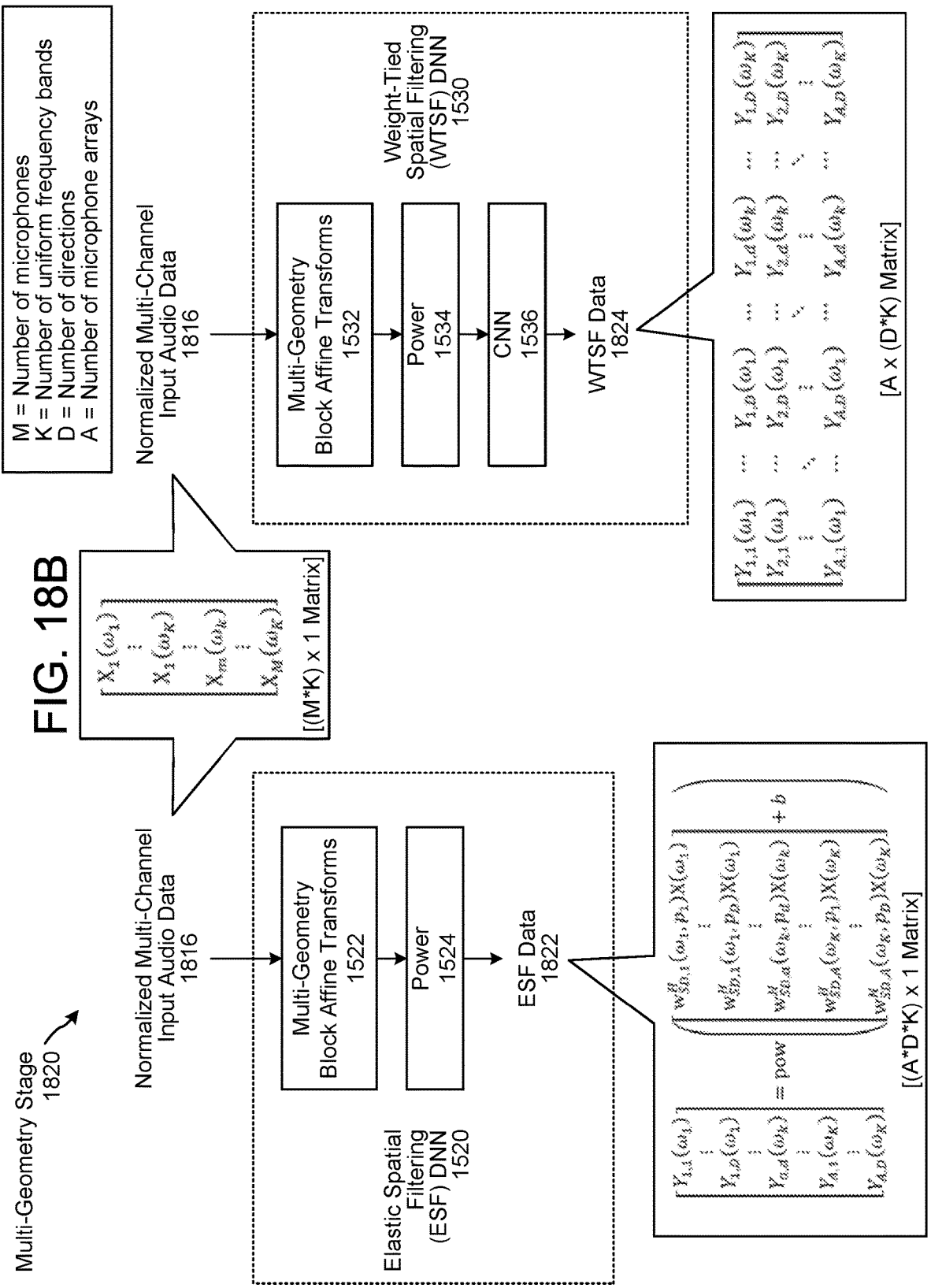

Typically, a matrix with only one column may be referred to as a column vector, whereas a matrix with only one row may be referred to as a row vector. Thus, referring to a feature vector may imply that the feature vector data corresponds to a column vector with a single column and a large number of rows. For example, a first feature vector for a single microphone array geometry may correspond to a (D*K)×1 matrix, where D is the total number of directions and K is the total number of frequency bands, while a second feature vector for multiple microphone array geometries may correspond to a (A*D*K)×1 matrix, where A is the total number of microphone array geometries. However, as illustrated in FIG. 18B, the disclosure is not limited thereto and feature vector data may correspond to a matrix without departing from the disclosure. For example, the second feature vector may be represented as a first matrix having dimensions (A*D*K)×1 (e.g., an actual column vector with directional data in each frequency band for each microphone array geometry), a second matrix having dimensions (D*K)×A (e.g., a column vector for each microphone array geometry), a third matrix having dimensions (A*K)×D (e.g., a column vector for each direction), a fourth matrix having dimensions A×(D*K) (e.g., a row vector for each microphone array geometry), a fifth matrix having dimensions D×(A*K) (e.g., a row vector for each direction), and/or the like without departing from the disclosure.

In some examples, the device 110 may process the feature vector data using matrix transformations. To illustrate an example, a matrix with the same number of rows and columns may be referred to as a square matrix and may be used to represent a linear transformation from a vector space to itself, such as reflection, rotation, and/or shearing. For example, the rotation of vectors in three-dimensional space is a linear transformation, which can be represented by a rotation matrix R: if v is a column vector (a matrix with only one column) describing the position of a point in space, the product Rv is a column vector describing the position of that point after a rotation.

While the example described above illustrates a linear transformation, the disclosure is not limited thereto. As will be described in greater detail below at least with regard to FIG. 10, the first model may generate feature vector data that is equivalent to outputs of an individual beamformer by applying block affine transforms. For example, the block affine transforms may be applied to multi-channel audio data to determine directional audio data associated with a plurality of directions. Thus, the multi-channel audio data (e.g., column vector with dimensions (M*K)×1, where M is a number of microphone input channels and K is the total number of frequency bands) may be processed to generate feature vector data (e.g., column vector with dimensions (D*K)×1), which represents directional audio data (e.g., the energy within individual frequency bands for each direction) for a single microphone array.

The block affine transforms may be referred to as transform data. In some examples, the block affine transforms may include coefficient values, which may represent weight values associated with individual microphone signals. These coefficient values may represent data similar to beamformer coefficient values used in a conventional beamformer. For example, a first affine transform for a particular frequency band may include a first plurality of M coefficient values used to generate first directional data (e.g., first energy value corresponding to a first weighted sum of the microphone signals) associated with a first direction, a second affine transform for the particular frequency band may include a second plurality of M coefficient values used to generate second directional data (e.g., second energy value corresponding to a second weighted sum of the microphone signals) associated with a second direction, and so on. In addition to the coefficient values, the block affine transforms may include a bias vector (or multiple bias vectors) and/or additional coefficients or values without departing from the disclosure. Thus, the block affine transforms may apply one or more mathematical operations without departing from the disclosure.

Additionally or alternatively, as will be described in greater detail below at least with regard to FIGS. 15 and 18B-18C, the first model may generate feature vector data that is equivalent to outputs of multiple beamformers by applying multi-geometry block affine transforms. For example, the multi-geometry block affine transforms may be applied to the multi-channel audio data to determine directional audio data associated with a plurality of directions for each of the microphone array geometries (e.g., microphone array configurations or estimated positions corresponding to the microphone array configurations). Thus, the multi-channel audio data (e.g., column vector with dimensions (M*K)×1) may be processed to generate feature vector data (e.g., column vector with dimensions (A*D*K)×1, where A is the total number of individual microphone array geometries), which represents directional audio data (e.g., the energy within individual frequency bands for each direction) associated with a plurality of microphone array geometries.

In some examples, the device 110 may process the microphone audio data using the first model and the second model to generate the second feature vector. After generating the second feature vector, the device 110 may send the second feature vector to the server(s) 120 to perform acoustic unit classification using the third model. However, the disclosure is not limited thereto and the device 110 and/or the server(s) 120 may process the microphone audio data using the first model and/or the second model without departing from the disclosure. For example, the device 110 may send the first feature vector to the server(s) 120 and the server(s) 120 may generate the second feature vector without departing from the disclosure.

By replacing the conventional audio front-end with a DNN-based acoustic model front-end, the system 100 (e.g., far-field speech recognition system) may be jointly optimized for ASR processing (as opposed to individually optimized for signal enhancement). For example, the first model (e.g., multi-channel DNN), the second model (e.g., feature extraction DNN) and the third model (e.g., classification DNN) may be jointly optimized by optimizing each model in a stage-wise manner.

To illustrate a first example, $1^{st}$-stage input test data may be input to the first model to generate first raw output data, which may be compared to $1^{st}$-stage output test data to determine a first error signal. The system 100 may optimize the first model to minimize the first error signal, resulting in the first model generating first optimized output data. The first optimized output data may be input to the second model to generate second raw output data, which may be compared to $2^{nd}$-stage output test data to determine a second error signal. The system 100 may optimize the second model to minimize the second error signal, resulting in the second model generating second optimized output data. Finally, the second optimized output data may be input to the third model to generate third raw output data, which may be compared to $3^{rd}$-stage output test data to determine a third error signal. The system 100 may optimize the third model to minimize the third error signal, resulting in the third model generating third optimized output data.

To illustrate a second example, $3^{rd}$-stage input test data may be input to the third model to generate first $3^{rd}$-stage raw output data, which may be compared to first $3^{rd}$-stage output test data to determine a first error signal. The system 100 may optimize the third model to minimize the first error signal, resulting in the third model generating first $3^{rd}$-stage optimized output data. After optimizing the third model, $2^{nd}$-stage input test data may be input to the second model to generate first $2^{nd}$-stage raw output data. The system 100 may input the first $2^{nd}$-stage raw output data to the third model to generate second $3^{rd}$-stage raw output data, which may be compared to second $3^{rd}$-stage output test data to determine a second error signal. The system 100 may optimize the second model to minimize the second error signal, resulting in the second model generating first $2^{nd}$-stage optimized output data and the third model generating second $3^{rd}$-stage optimized output data. After optimizing the second model, the system 100 may input $1^{st}$-stage input test data to the first model to generate $1^{st}$-stage raw output data. The system 100 may input the $1^{st}$-stage raw output data to the second model to generate second $2^{nd}$-stage raw output data, which may be input to the third model to generate third $3^{rd}$-stage raw output data. The system 100 may compare the third $3^{rd}$-stage raw output data to third $3^{rd}$-stage output test data to determine a third error signal. The system 100 may optimize the first model to minimize the first error signal, resulting in the first model generating $1^{st}$-stage optimized output data, the second model generating second $2^{nd}$-stage optimized output data, and the third model generating third $3^{rd}$-stage optimized output data.

The first example described above illustrates a first technique of training the models in a forward direction (e.g., $1^{st}$-$2^{nd}$-$3^{rd}$), which requires additional test data. For example, the first example requires intermediate test data (e.g., test data at the output of each model) in order to train the models effectively. In contrast, the second example illustrates a second technique of training the models in a backward direction (e.g., $3^{rd}$-$2^{nd}$-$1^{st}$), which does not require intermediate test data. Instead, using the second technique, the system 100 may train the models using only $3^{rd}$-stage output test data (e.g., expected output of the third model). Additionally or alternatively, while the second example refers to three sets of test data (e.g., first $3^{rd}$-stage output test data, second $3^{rd}$-stage output test data, and third $3^{rd}$-stage output test data), the disclosure is not limited thereto and in some examples the system 100 may generate the first error signal, the second error signal, and the third error signal using only a single set of test data (e.g., third $3^{rd}$-stage output test data) without departing form the disclosure.

While the examples described above refer to the system 100 jointly optimizing the first model, the second model and the third model, the disclosure is not limited thereto. Instead, the system 100 may jointly optimize only the first model and the second model and/or only the second model and the third model without departing from the disclosure.

Additionally or alternatively, the system 100 may be optimized to capture speech (e.g., target phonemes), even if this results in more noise. Another benefit of using the DNN-based acoustic model front-end is a reduction in a number of microphones, as performance is similar using two microphones 114 as it is using four or more microphones 114. Additionally, a bandwidth requirement may be reduced during real time processing as the device 110 only needs to upload low dimensional feature vectors (e.g., a second feature vector) for speech processing by the server(s) 120 rather than sending more bandwidth intensive raw audio data (or other data). In some examples, the raw input audio data may be uploaded at a later point in time (for example for system correction and/or retraining), although the disclosure is not limited thereto and the device 110 may either upload or not upload the raw input audio data without departing from the disclosure.

The trained model and other models described herein, which are implemented by components of the system, may be trained and operated according to various machine-learning techniques. Such techniques may include, for example, neural networks (such as deep neural networks (DNNs) and/or recurrent neural networks (RNNs)), inference engines, and trained classifiers. Examples of trained classifiers include Support Vector Machines (SVMs), neural networks, decision trees, adaptive boosting (AdaBoost) combined with decision trees, and random forests. For example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

In some embodiments, the trained model is a deep neural network (DNN) that is trained using distributed batch stochastic gradient descent; batches of training data may be distributed to computation nodes where they are fed through the DNN in order to compute a gradient for that batch. The device 110 may update the DNN by computing a gradient by comparing audio data with a stored representation of a particular word and back-propagating error data based thereon. In some embodiments, the DNN includes additional forward pass targets that estimate synthetic gradient values and the device 110 updates the DNN by selecting one or more synthetic gradient values.

Figure 2:
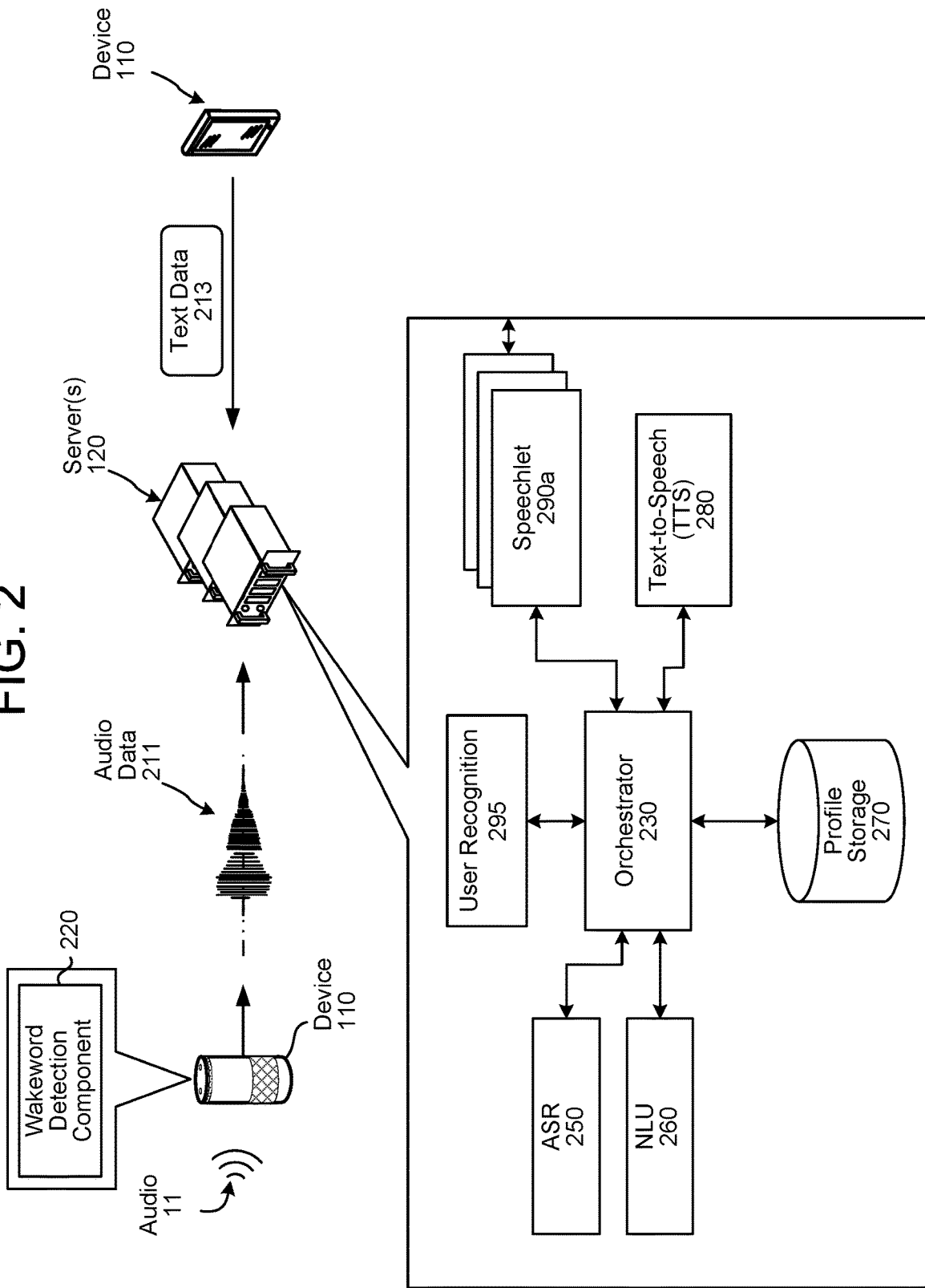
FIG. 2 is a conceptual diagram of components of a system according to embodiments of the present disclosure.

The system may operate using various components as described in FIG. 2. The various components may be located on same or different physical devices. Communication between various components may occur directly or across a network(s) 199.

An audio capture component(s), such as a microphone(s) 114 or an array of microphones of the device 110, captures audio 11. The device 110 processes audio data, representing the audio 11, to determine whether speech is detected. The device 110 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. This process may also be referred to as keyword detection, with a wakeword being a specific example of a keyword. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the server(s) 120. The audio data 211 may include data corresponding to the wakeword, or the portion of the audio data 211 corresponding to the wakeword may be removed by the device 110 prior to sending the audio data 211 to the server(s) 120.

Upon receipt by the server(s) 120, the audio data 211 may be sent to an orchestrator component 230. The orchestrator component 230 may include memory and logic that enables the orchestrator component 230 to transmit various pieces and forms of data to various components of the system, as well as perform other operations.

The orchestrator component 230 sends the audio data 211 to an automatic speech recognition (ASR) component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to a natural language understanding (NLU) component 260, either directly or via the orchestrator component 230. The text data sent from the ASR component 250 to the NLU component 260 may include a top scoring hypothesis or may include an N-best list including multiple hypotheses. An N-best list may additionally include a respective score associated with each hypothesis represented therein. Each score may indicate a confidence of ASR processing performed to generate the hypothesis with which the score is associated.

Alternatively, the device 110 may send text data 213 to the server(s) 120. Upon receipt by the server(s) 120, the text data 213 may be sent to the orchestrator component 230. The orchestrator component 230 may send the text data 213 to the NLU component 260.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent representing an action that a user desires be performed as well as pieces of the input text data that allow a device (e.g., a device 110, the server(s) 120, etc.) to execute the intent. For example, if the text data corresponds to "call John," the NLU component 260 may determine an intent that the system establish a two-way communication channel between the device 110 originating the call and a device of the recipient "John."

The NLU component 260 outputs NLU results to the orchestrator component 230. The NLU results may include a representation of a single intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value. The orchestrator component 230 may send the NLU results to an associated speechlet component 290. If the NLU results include multiple NLU hypotheses, the orchestrator component 230 may send a portion of the NLU results corresponding to the top scoring NLU hypothesis to a speechlet component 290 associated with the top scoring NLU hypothesis.

A "speechlet" or "speechlet component" may be software running on the server(s) 120 that is akin to a software application running on a traditional computing device. That is, a speechlet component 290 may enable the server(s) 120 to execute specific functionality in order to perform one or more actions (e.g., provide information to a user, display content to a user, output music, or perform some other requested action). The server(s) 120 may be configured with more than one speechlet component 290. For example, a weather speechlet component may enable the server(s) 120 to provide weather information, a ride sharing speechlet component may enable the server(s) 120 to schedule a trip with respect to a ride sharing service, a restaurant speechlet component may enable the server(s) 120 to order a pizza with respect to a restaurant's online ordering system, a communications speechlet component may enable the system to perform messaging or multi-endpoint communications, a device-specific speechlet may enable the system to perform one or more actions specific to the device 110, etc. A speechlet component 290 may operate in conjunction between the server(s) 120 and other devices such as a device 110 local to a user in order to complete certain functions. Inputs to a speechlet component 290 may come from various interactions and input sources.

The functionality described herein as a speechlet or speechlet component may be referred to using many different terms, such as an action, bot, app, or the like.

A speechlet component 290 may include hardware, software, firmware, or the like that may be dedicated to the particular speechlet component 290 or shared among different speechlet components 290. A speechlet component 290 may be part of the server(s) 120 (as illustrated in FIG. 2) or may be located at whole (or in part) with one or more separate servers.

Unless expressly stated otherwise, reference to a speechlet, speechlet device, or speechlet component may include a speechlet component operating within the server(s) 120 (for example as speechlet component 290) and/or speechlet component operating within a server(s) separate from the server(s) 120.

A speechlet component 290 may be configured to perform one or more actions. An ability to perform such action(s) may sometimes be referred to as a "skill." That is, a skill may enable a speechlet component 290 to execute specific functionality in order to provide data or produce some other output requested by a user. A particular speechlet component 290 may be configured to execute more than one skill. For example, a weather skill may involve a weather speechlet component providing weather information to the server(s) 120, a ride sharing skill may involve a ride sharing speechlet component scheduling a trip with respect to a ride sharing service, an order pizza skill may involve a restaurant speechlet component ordering a pizza with respect to a restaurant's online ordering system, a windows control skill may involve a device-specific speechlet component causing a vehicle to move its windows, etc.

A speechlet component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, device-specific skills, as well as custom skills that are not associated with any pre-configured type of skill.

In some examples, the system may be configured with different device-specific speechlet components (illustrated as part of the speechlet components 290 in FIG. 2). A device-specific speechlet component may be specific to a vehicle manufacturer, an appliance manufacturer, or some other device manufacturer that does not control or maintain the server(s) 120.

A user profile may be configured with top-level speechlets. Thus, a user may invoke a top-level speechlet without explicitly referring to the speechlet in the user input. For example, a weather speechlet may be a top-level speechlet. A user may say "Alexa, what is the weather." In response, the system may call the weather speechlet to provide weather information, even though the user did not explicitly refer to the weather speechlet in the user input.

A user profile may also be configured with non-top-level speechlets. Thus, a user may need to explicitly refer to a non-top-level speechlet in a user input in order to cause the system to call the particular non-top-level speechlet to perform an action responsive to the user input. For example, the system may be configured with a top-level weather speechlet and a non-top-level Weather Underground speechlet. To cause the non-top-level Weather Underground speechlet to be called instead of the top-level weather speechlet, a user may need to explicitly refer to the non-top-level Weather Underground speechlet in the user input, for example by saying "Alexa, ask Weather Underground what is the weather for tomorrow."

In certain instances, the server(s) 120 may receive or determine text data responsive to a user input, when it may be more appropriate for audio to be output to a user. The server(s) 120 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The server(s) 120 may include profile storage 270. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be an umbrella profile specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a single group profile may additionally include preferences specific to the user associated therewith. That is, each user profile may include preferences unique from one or more other user profiles associated with the same group profile. A user profile may be a stand-alone profile or may be associated with a group profile.

A user profile may represent speechlet components enabled by the user associated with the user profile. The system may be configured such that certain speechlet components may not be invoked by a user's input unless the user has enabled the speechlet component. The system may automatically enable a device-specific speechlet component with respect to a user profile when the user associates a device, associated with the device-specific speechlet component, with the user's profile. For example, if the user associates a vehicle with their user profile, the system may enable the vehicle manufacturer's speechlet component without a particular user request to do so. The system may hide a device-specific speechlet component from a user until the user has associated a device (associated with the device-specific speechlet component) with their user profile. This is because device-specific speechlet components may be configured to only provide functionality useful to users having devices associated with the device-specific speechlet components. For example, a particular vehicle manufacturer's speechlet component may only provide functionality useful to a user having one or more of the vehicle manufacturer's vehicles.

When a user associates a device with their user profile, the user may provide the system with account information (e.g., account number, username, password, etc.). The server(s) 120 (or components thereof) may use the account information to communicate with a device server(s) associated with the vehicle. The server(s) 120 may be restricted from sending data to or receiving data from a device server(s) until the server(s) 120 authenticates itself with the device server(s) using the account information and/or a device identifier specific to the device newly associated with the user profile.

The profile storage 270, or a different storage, may store device profiles. Each device profile may be associated with a different device identifier. Each device profile may represent output capabilities (e.g., audio, video, quality of output, etc.) of the device. Each device profile may also represent a speechlet component identifier specific to a device-specific speechlet component associated with the device. For example, if the device 110 is a vehicle, the speechlet component identifier may represent a vehicle manufacturer speechlet component associated with the vehicle. For further example, if the device 110 is an appliance, the speechlet component identifier may represent an appliance manufacturer speechlet component associated with the appliance.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the component(s) of the system(s) and/or user are located.

The server(s) 120 may include a user recognition component 295 that recognizes one or more users associated with data input to the system. The user recognition component 295 may take as input the audio data 211, text data 213, and/or text data output by the ASR component 250. The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.) received by the system in correlation with the present user input to stored biometric data of users. The user recognition component 295 may further perform user recognition by comparing image data (e.g., including a representation of at least a feature of a user) received by the system in correlation with the present user input with stored image data including representations of features of different users. The user recognition component 295 may perform additional user recognition processes, including those known in the art. Output of the user recognition component 295 may include a single user identifier corresponding to the most likely user that originated the present input. Alternatively, output of the user recognition component 295 may include an N-best list of user identifiers with respective scores indicating likelihoods of respective users originating the present input. The output of the user recognition component 295 may be used to inform NLU processing as well as processing performed by speechlet components 290.

Figure 3:
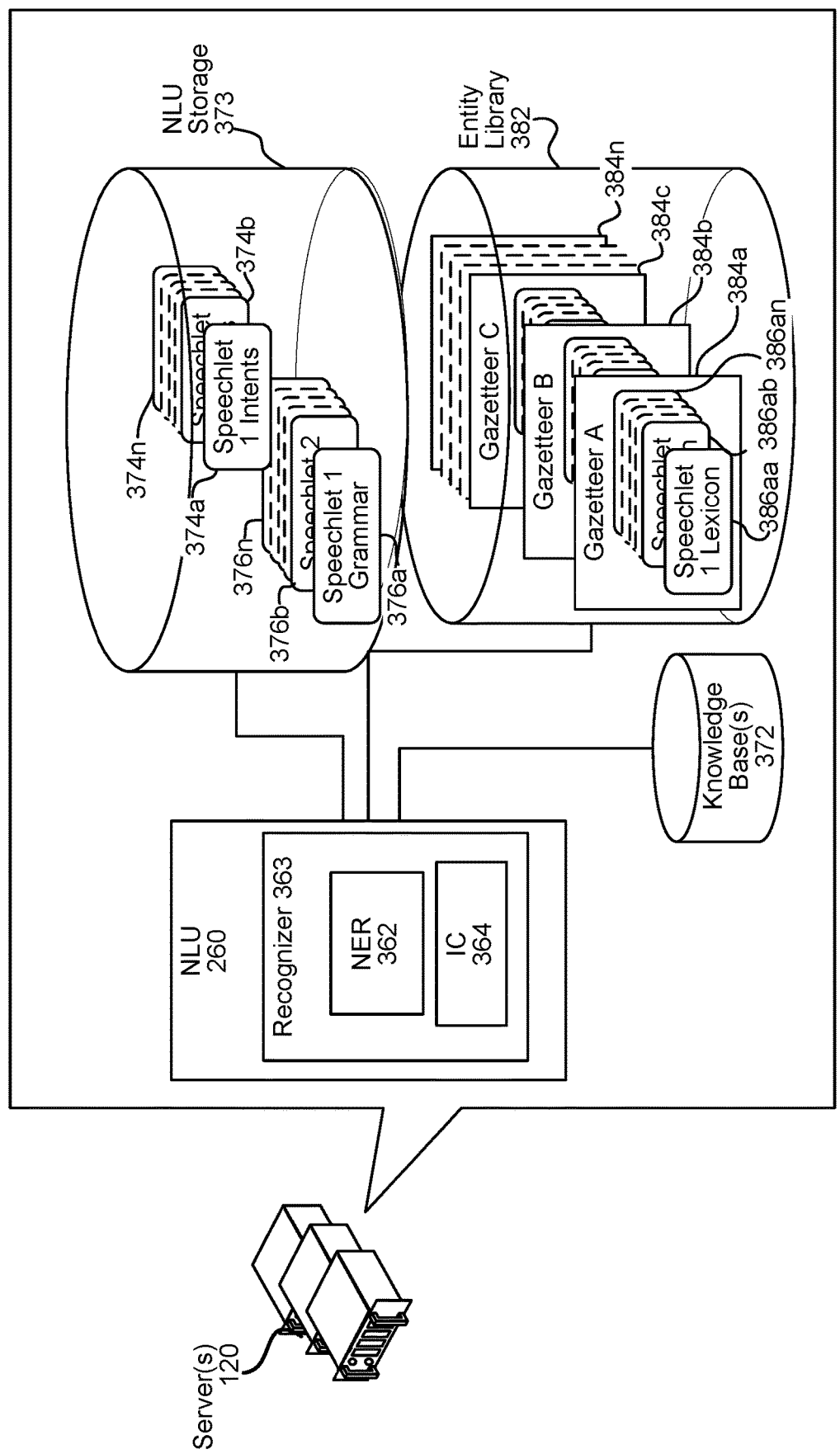
FIG. 3 is a conceptual diagram of how natural language understanding processing is performed according to embodiments of the present disclosure.

FIG. 3 illustrates how NLU processing is performed on text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the server(s) 120, etc.) to complete that action. For example, if the NLU component 260 receives text data corresponding to "tell me the weather," the NLU component 260 may determine that the user intends the system to output weather information.

The NLU component 260 may process text data including several hypotheses. For example, if the ASR component 250 outputs text data including an N-best list of ASR hypotheses, the NLU component 260 may process the text data with respect to all (or a portion of) the ASR hypotheses represented therein. Even though the ASR component 250 may output an N-best list of ASR hypotheses, the NLU component 260 may be configured to only process with respect to the top scoring ASR hypothesis in the N-best list.

The NLU component 260 may annotate text data by parsing and/or tagging the text data. For example, for the text data "tell me the weather for Seattle," the NLU component 260 may tag "Seattle" as a location for the weather information.

The NLU component 260 may include one or more recognizers 363. Each recognizer 363 may be associated with a different speechlet component 290. Each recognizer 363 may process with respect to text data input to the NLU component 260. Each recognizer 363 may operate in parallel with other recognizers 363 of the NLU component 260.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity that may be applicable to processing performed by a speechlet component 290, associated with the recognizer 363 implementing the NER component 362. The NER component 362 (or other component of the NLU component 260) may also determine whether a word refers to an entity whose identity is not explicitly mentioned in the text data, for example "him," "her," "it" or other anaphora, exophora or the like.

Each recognizer 363, and more specifically each NER component 362, may be associated with a particular grammar model and/or database 373, a particular set of intents/actions 374, and a particular personalized lexicon 386. Each gazetteer 384 may include speechlet-indexed lexical information associated with a particular user and/or device 110. For example, a Gazetteer A (384a) includes speechlet-indexed lexical information 386aa to 386an. A user's music speechlet lexical information might include album titles, artist names, and song names, for example, whereas a user's contact list speechlet lexical information might include the names of contacts. Since every user's music collection and contact list is presumably different, this personalized information improves entity resolution.

An NER component 362 applies grammar models 376 and lexical information 386 associated with the speechlet component 290 (associated with the recognizer 363 implementing the NER component 362) to determine a mention of one or more entities in text data. In this manner, the NER component 362 identifies "slots" (corresponding to one or more particular words in text data) that may be needed for later processing. The NER component 362 may also label each slot with a type (e.g., noun, place, city, artist name, song name, etc.).

Each grammar model 376 includes the names of entities (i.e., nouns) commonly found in speech about the particular speechlet component 290 to which the grammar model 376 relates, whereas the lexical information 386 is personalized to the user and/or the device 110 from which the user input originated. For example, a grammar model 376 associated with a shopping speechlet component may include a database of words commonly used when people discuss shopping.

A downstream process called named entity resolution (discussed in detail elsewhere herein) actually links a portion of text data to an actual specific entity known to the system. To perform named entity resolution, the NLU component 260 may utilize gazetteer information (384a-384n) stored in an entity library storage 382. The gazetteer information 384 may be used to match text data with different entities, such as song titles, contact names, etc. Gazetteers 384 may be linked to users (e.g., a particular gazetteer may be associated with a specific user's music collection), may be linked to certain speechlet components 290 (e.g., a shopping speechlet component, a music speechlet component, a video speechlet component, a device-specific speechlet component, etc.), or may be organized in a variety of other ways.

Each recognizer 363 may also include an intent classification (IC) component 364. An IC component 364 parses text data to determine an intent(s), associated with the speechlet component 290 (associated with the recognizer 363 implementing the IC component 364), that potentially represents the user input. An intent represents to an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 374, associated with the speechlet component 290 that is associated with the recognizer 363 implementing the IC component 364.

The intents identifiable by a specific IC component 364 are linked to speechlet-specific (i.e., the speechlet component 290 associated with the recognizer 363 implementing the IC component 364) grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386

(associated with the speechlet component 290 associated with the recognizer 363 implementing the NER component 362), attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music speechlet recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music speechlet, which an IC component 364 (also implemented by the music speechlet recognizer) may determine corresponds to a <PlayMusic> intent. At this stage, no determination has been made as to the meaning of "mother's little helper" and "the rolling stones," but based on grammar rules and models, the NER component 362 has determined the text of these phrases relates to the grammatical object (i.e., entity) of the user input represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words associated with the speechlet component 290 (in the knowledge base 372). For example, if the text data includes "play songs by the rolling stones," after failing to determine an album name or song name called "songs" by "the rolling stones," the NER component 362 may search the speechlet vocabulary for the word "songs." In the alternative, generic words may be checked before the gazetteer information, or both may be tried, potentially producing two different results.

An NER component 362 may tag text data to attribute meaning thereto. For example, an NER component 362 may tag "play mother's little helper by the rolling stones" as: {speechlet} Music, {intent}<PlayMusic>, {artist name} rolling stones, {media type} SONG, and {song title} mother's little helper. For further example, the NER component 362 may tag "play songs by the rolling stones" as: {speechlet} Music, {intent}<PlayMusic>, {artist name} rolling stones, and {media type} SONG.

Figure 4:
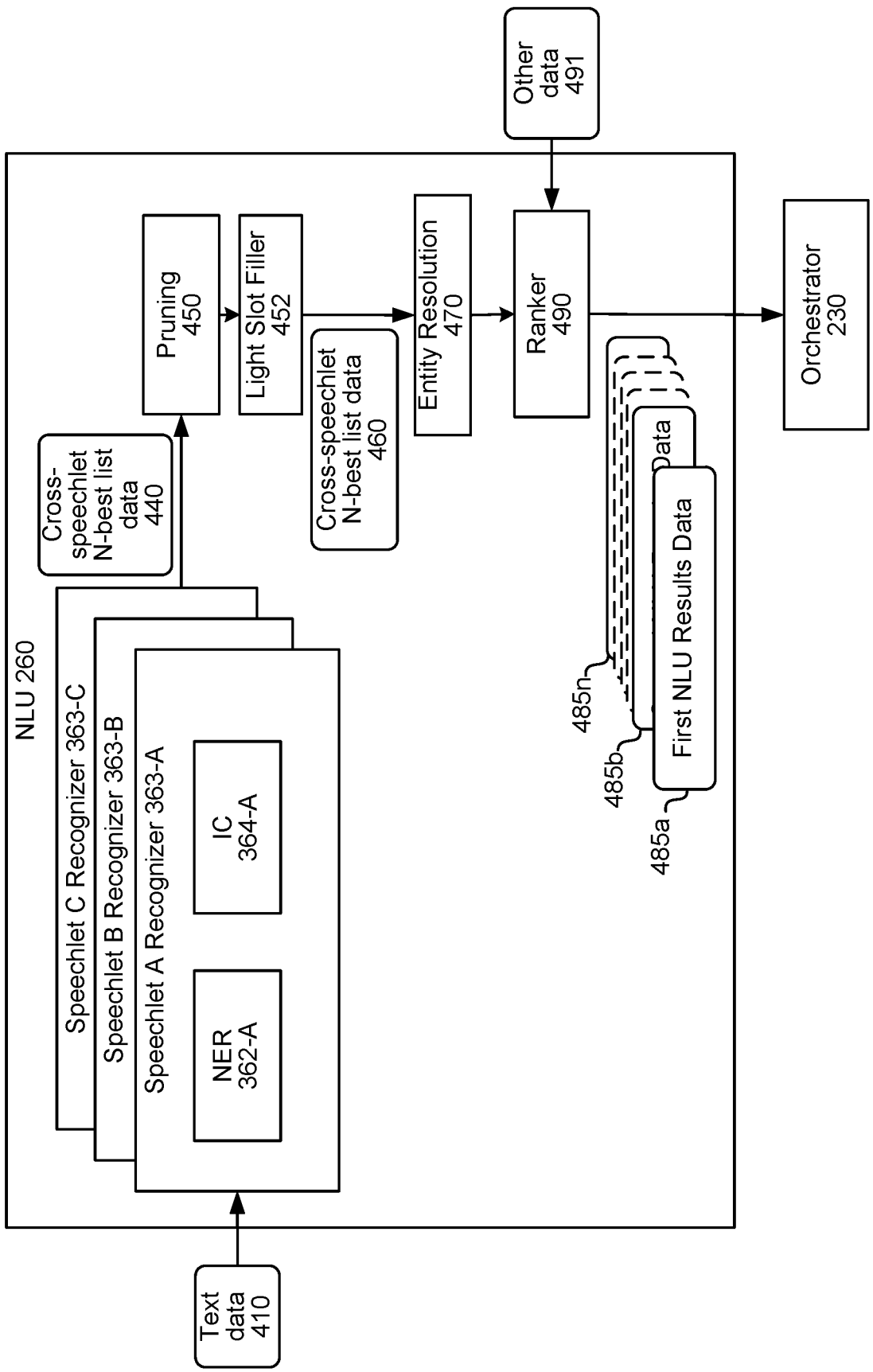
FIG. 4 is a conceptual diagram of how natural language understanding processing is performed according to embodiments of the present disclosure.

The NLU component 260 may generate cross-speechlet N-best list data 440, which may include a list of NLU hypotheses output by each recognizer 363 (as illustrated in FIG. 4). A recognizer 363 may output tagged text data generated by an NER component 362 and an IC component 364 operated by the recognizer 363, as described above. Each NLU hypothesis including an intent indicator and text/slots called out by the NER component 362 may be grouped as an NLU hypothesis represented in the cross-speechlet N-best list data 440. Each NLU hypothesis may also be associated with one or more respective score(s) for the NLU hypothesis. For example, the cross-speechlet N-best list data 440 may be represented as, with each line representing a separate NLU hypothesis:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The NLU component 260 may send the cross-speechlet N-best list data 440 to a pruning component 450. The pruning component 450 may sort the NLU hypotheses represented in the cross-speechlet N-best list data 440 according to their respective scores. The pruning component 450 may then perform score thresholding with respect to the cross-speechlet N-best list data 440. For example, the pruning component 450 may select NLU hypotheses represented in the cross-speechlet N-best list data 440 associated with confidence scores satisfying (e.g., meeting and/or exceeding) a threshold confidence score. The pruning component 450 may also or alternatively perform number of NLU hypothesis thresholding. For example, the pruning component 450 may select a maximum threshold number of top scoring NLU hypotheses. The pruning component 450 may generate cross-speechlet N-best list data 460 including the selected NLU hypotheses. The purpose of the pruning component 450 is to create a reduced list of NLU hypotheses so that downstream, more resource intensive, processes may only operate on the NLU hypotheses that most likely represent the user's intent.

The NLU component 260 may also include a light slot filler component 452. The light slot filler component 452 can take text data from slots represented in the NLU hypotheses output by the pruning component 450 and alter it to make the text data more easily processed by downstream components. The light slot filler component 452 may perform low latency operations that do not involve heavy operations such as reference to a knowledge base. The purpose of the light slot filler component 452 is to replace words with other words or values that may be more easily understood by downstream system components. For example, if an NLU hypothesis includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-speechlet N-best list data 460.

The NLU component 260 sends the cross-speechlet N-best list data 460 to an entity resolution component 470. The entity resolution component 470 can apply rules or other instructions to standardize labels or tokens from previous stages into an intent/slot representation. The precise transformation may depend on the speechlet component 290. For example, for a travel speechlet component, the entity resolution component 270 may transform text data corresponding to "Boston airport" to the standard BOS three-letter code referring to the airport. The entity resolution component 470 can refer to a knowledge base that is used to specifically identify the precise entity referred to in each slot of each NLU hypothesis represented in the cross-speechlet N-best list data 460. Specific intent/slot combinations may also be tied to a particular source, which may then be used to resolve the text data. In the example "play songs by the stones," the entity resolution component 470 may reference a personal music catalog, Amazon Music account, user profile data, or the like. The entity resolution component 470 may output text data including an altered N-best list that is based on the cross-speechlet N-best list data 460, and that includes more detailed information (e.g., entity IDs) about the specific entities mentioned in the slots and/or more detailed slot data that can eventually be used by a speechlet component 290. The NLU component 260 may include multiple entity resolution components 470 and each entity resolution component 470 may be specific to one or more speechlet components 290.

The entity resolution component 470 may not be successful in resolving every entity and filling every slot represented in the cross-speechlet N-best list data 460. This may result in the entity resolution component 470 outputting incomplete results.

The NLU component 260 may include a ranker component 490. The ranker component 490 may assign a particular confidence score to each NLU hypothesis input therein. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first speechlet component includes slots that are all filled/resolved, that NLU hypothesis may be assigned a higher confidence score than another NLU hypothesis including at least some slots that are unfilled/unresolved by the entity resolution component 470.

The ranker component 490 may apply re-scoring, biasing, or other techniques to determine the top scoring NLU hypotheses. To do so, the ranker component 490 may consider not only the data output by the entity resolution component 470, but may also consider other data 491. The other data 491 may include a variety of information. The other data 491 may include speechlet component 290 rating or popularity data. For example, if one speechlet component 290 has a particularly high rating, the ranker component 490 may increase the score of an NLU hypothesis associated with that speechlet component 290. The other data 491 may also include information about speechlet components 290 that have been enabled for the user identifier and/or device identifier associated with the current user input. For example, the ranker component 490 may assign higher scores to NLU hypotheses associated with enabled speechlet components 290 than NLU hypotheses associated with non-enabled speechlet components 290. The other data 491 may also include data indicating user usage history, such as if the user identifier associated with the current user input is regularly associated with user input that invokes a particular speechlet component 290 or does so at particular times of day. The other data 491 may additionally include data indicating date, time, location, weather, type of device 110, user identifier, device identifier, context, as well as other information. For example, the ranker component 490 may consider when any particular speechlet component 290 is currently active (e.g., music being played, a game being played, etc.) with respect to the user or device associated with the current user input. The other data 291 may also include device type information. For example, if the device 110 does not include a display, the ranker component 490 may decrease the score associated with NLU hypotheses that would result in displayable content being presented to a user.

Following ranking by the ranker component 490, the NLU component 260 may output NLU results data 485 to the orchestrator component 230. The NLU results data 485 may include first NLU results data 485a including tagged text data associated with a first speechlet component 290a, second NLU results data 485b including tagged text data associated with a second speechlet component 290b, etc. The NLU results data 485 may include the top scoring NLU hypotheses (e.g., in the form of an N-best list) as determined by the ranker component 490. Alternatively, the NLU results data 485 may include the top scoring NLU hypothesis as determined by the ranker component 490.

Prior to the orchestrator component 230 sending text data to the NLU component 260, the orchestrator component 230 may determine whether the device 110 is associated with a device-specific speechlet component 290. The orchestrator component 230 may use the device identifier, received from the device 110, to determine device profile data associated with the device 110. The orchestrator component 230 may determine the device profile data represents a speechlet component identifier unique to a device-specific speechlet component associated with the device 110. Alternatively, the orchestrator component 230 may determine the device profile data represents a manufacturer of the device 110. The orchestrator component 230 may then determine whether the system includes a device-specific speechlet component associated with the device manufacturer.

If the orchestrator component 230 determines the device 110 is associated with a device-specific speechlet component, the orchestrator component 230 calls the NLU component 260 twice. The orchestrator component 230 calls the NLU component 260 to perform NLU processing on text data (received from the device 110, or output by the ASR component 250) with respect to various speechlet components of the system, as described above with respect to FIGS. 3 and 4. The orchestrator component 230 also separately calls the NLU component 260 to perform NLU processing on the text data specifically with respect to the device-specific speechlet component. The NLU component 260 may perform the foregoing processing at least partially in parallel, and output NLU results of the respective processing to the orchestrator component 230. The orchestrator component 230 may then rank the received NLU results to determine which speechlet component should be called to execute with respect to the current user input.

Figure 5:
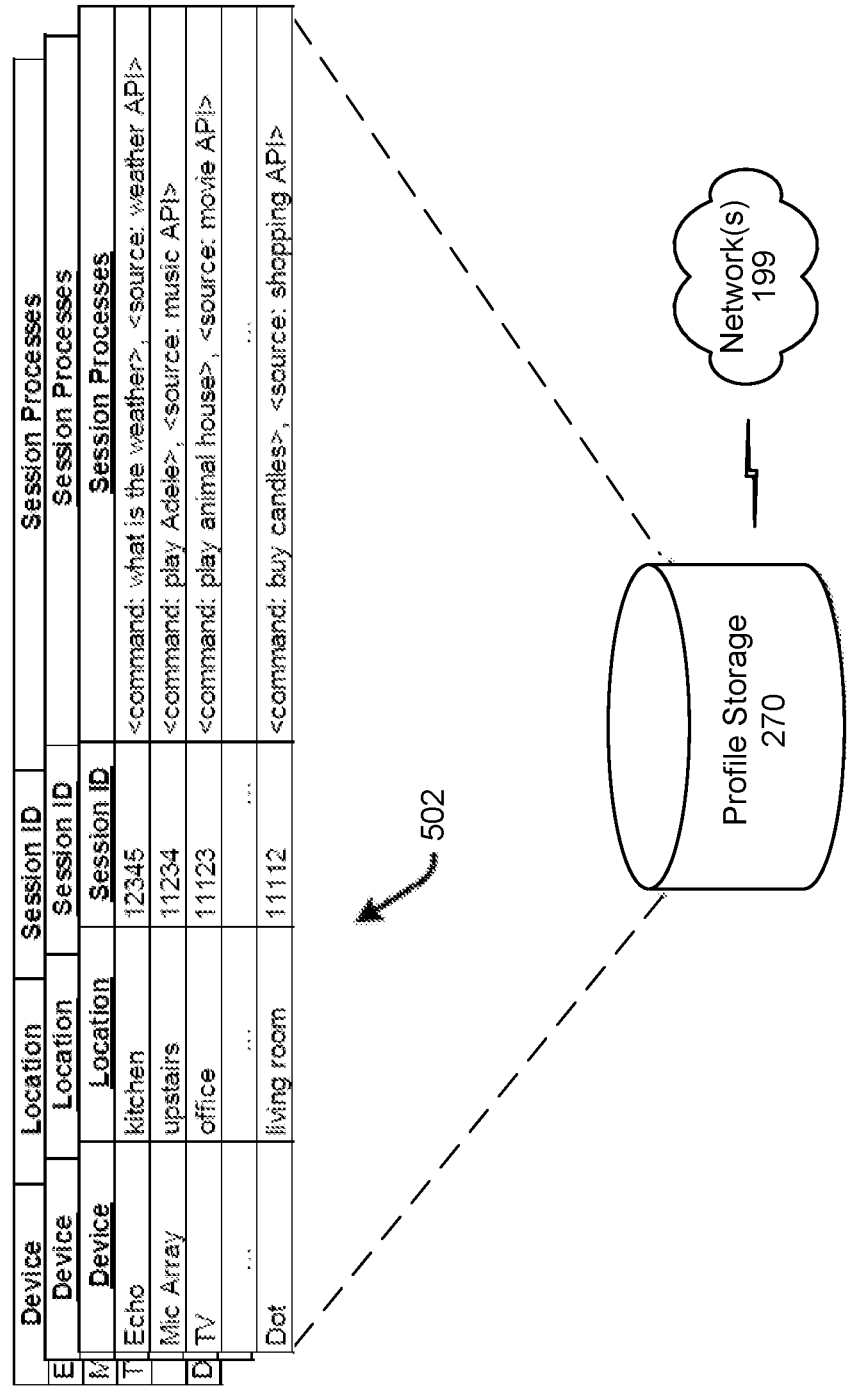
FIG. 5 illustrates data stored and associated with user profiles according to embodiments of the present disclosure.

FIG. 5 illustrates data stored and associated with user accounts according to embodiments of the present disclosure. The server(s) 120 may include or refer to data regarding user accounts 502 (e.g., user profile(s)), shown by the profile storage 270 illustrated in FIG. 5. The profile storage 270 may be located proximate to server(s) 120, or may otherwise be in communication with various components, for example over network(s) 199. In an example, the profile storage 270 is a cloud-based storage.

As discussed above, the profile storage 270 may include a variety of information related to individual users, households, accounts, etc. that interact with the system 100. For illustration, as shown in FIG. 5, each user profile 502 may include data such as device type information, device location information, session ID information, and processes performed with respect to each session ID. Each user profile 502 may also include information about previous usage history (e.g., number of times an application is used), previous commands/intents, temporal information or the like. In addition, a user profile 502 may store other data as well. In some examples, the profile storage 270 may include data regarding devices associated with particular individual user accounts 502. Such data may include device identifier (ID) and internet protocol (IP) address information for different devices as well as names by which the devices may be referred to by a user. Further qualifiers describing the devices may also be listed along with a description of the type of object of the device.

FIG. 6 is a signal flow diagram illustrating an example of processing speech and generating output audio according to embodiments of the present disclosure. A device 110 may generate (602) input audio data corresponding to an utterance of a user. For example, the device 110 may capture input audio using one or more microphone(s) 114 and may generate the input audio data representing the utterance. Using the input audio data, the device 110 may generate (604) a feature vector corresponding to the utterance and send (606) the feature vector to the server(s) 120 for speech processing.

When the server(s) 120 receives the feature vector, the server(s) 120 may perform (608) speech processing on the feature vector to generate input text data. The server(s) 120 may also perform (610) natural language processing on the input text data to determine an intent of a user command represented in the utterance. Based on the intent of the user command, the server(s) 120 may determine (612) an action to perform and may perform (614) the action. For example, the server(s) 120 may determine that the user wants to play music and may identify a music source available to the user from which to stream. However, the disclosure is not limited thereto and the server(s) 120 may perform any action known to one of skill in the art without departing from the disclosure. Additionally or alternatively, the server(s) 120 may send a command to the device 110 to perform the action without departing from the disclosure.

After performing the action in step 614, the server(s) 120 may generate (616) output data in response to the first utterance and may perform (618) text-to-speech (TTS) processing on the output data to generate output audio data. For example, the output data may include text data to be output to a user as synthesized speech and the server(s) 120 may perform TTS processing to generate the output audio data including the synthesized speech.

The server(s) 120 may send (620) the output audio data to the user device 110 and the device 110 may generate (622) output audio corresponding to the output audio data. For example, using the output audio data and the loudspeaker(s) 116, the device 110 may generate the output audio for a user 5 local to the device 110. If the user 5 responds to the audio, the device 110 may receive second input audio corresponding to a second utterance and repeat the steps listed above.

For ease of illustration, FIG. 6 illustrates a high level signal flow diagram encompassing the overall system for processing speech and generating output audio. However, the server(s) 120 may perform additional steps to determine an intent corresponding to the speech and generate output audio.

The device 110 may generate input audio data using microphone(s) 114. For example, the microphone(s) 114 may generate first input audio data in a time domain. For computational efficiency, however, the system 100 may convert the first input audio data to second input audio data in a frequency domain prior to processing the input audio data. Thus, the first input audio data (e.g., time-discrete signal) is transformed into the second input audio data in the frequency domain or subband domain. To convert from the time domain to the frequency or subband domain, the system 100 may use Discrete Fourier Transforms (DFTs), such as Fast Fourier transforms (FFTs), short-time Fourier Transforms (STFTs), and/or the like.

The following high level description of converting from the time domain to the frequency domain refers to microphone audio data x(n), which is a time-domain signal comprising output from the microphone(s) 114. As used herein, a variable x(n) corresponds to the time-domain signal, whereas a variable X(n) corresponds to a frequency-domain signal (e.g., after performing FFT on the microphone audio data x(n)). A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data X(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." So, for example, if the sound wave consisted solely of a pure sinusoidal 1 kHz tone, then the frequency domain representation would consist of a discrete amplitude spike in the bin containing 1 kHz, with the other bins at zero. In other words, each tone "m" is a frequency index (e.g., frequency bin).

Figure 7A:
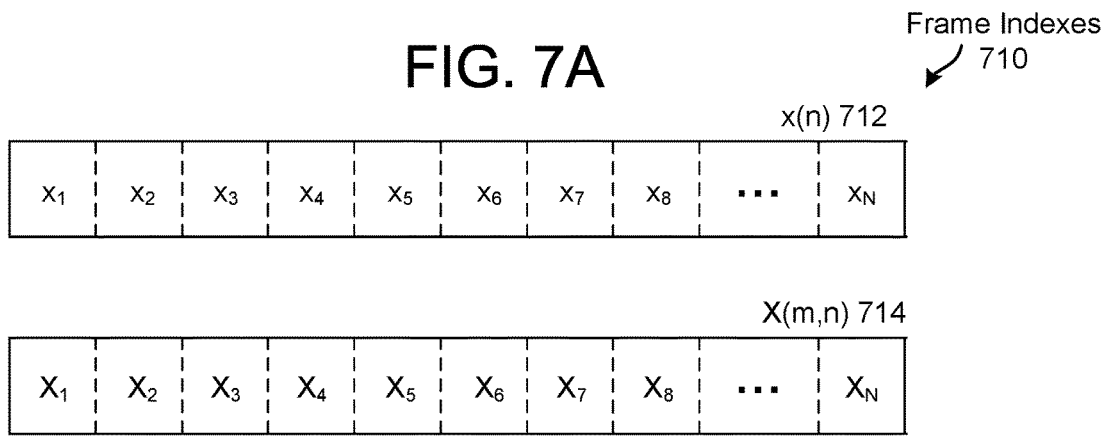
FIGS. 7A-7C illustrate examples of channel indexes, tone indexes and frame indexes.

FIG. 7A illustrates an example of frame indexes 710 including microphone audio data x(n) 712 in the time domain and microphone audio data X(m, n) 714 in the frequency domain. For example, the system 100 may apply a FFT to the time-domain microphone audio data x(n) 712, producing the frequency-domain microphone audio data X(m,n) 714, where the tone index "m" ranges from 0 to M and "n" is a frame index ranging from 0 to N. As illustrated in FIG. 7A, the history of the values across iterations is provided by the frame index "n", which ranges from 1 to N and represents a series of samples over time.

Figure 7B:
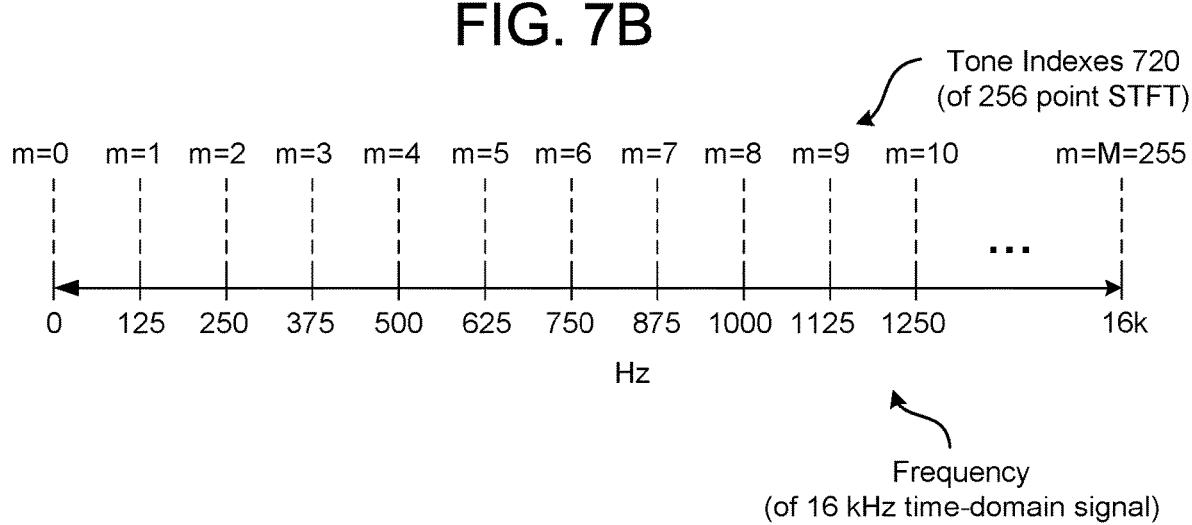

FIG. 7B illustrates an example of performing an M-point FFT on a time-domain signal. As illustrated in FIG. 7B, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. As illustrated in FIG. 7B, each tone index 720 in the 256-point FFT corresponds to a frequency range (e.g., subband) in the 16 kHz time-domain signal. While FIG. 7B illustrates the frequency range being divided into 256 different subbands (e.g., tone indexes), the disclosure is not limited thereto and the system 100 may divide the frequency range into M different subbands. While FIG. 7B illustrates the tone index 720 being generated using a Fast Fourier Transform (FFT), the disclosure is not limited thereto. Instead, the tone index 720 may be generated using Short-Time Fourier Transform (STFT), generalized Discrete Fourier Transform (DFT) and/or other transforms known to one of skill in the art (e.g., discrete cosine transform, non-uniform filter bank, etc.).

Given a signal x[n], the FFT X(m,n) of x[n] is defined by $$X(m, n) = \sum_{k=0}^{K-1} x_k e^{-i2\pi*m*n*k/K} \quad [1]$$

Where m is a frequency index, n is a frame index, and K is an FFT size. Hence, for each block (at frame index n) of K samples, the FFT is performed which produces K complex tones X(m,n) corresponding to frequency index m and frame index n.

Figure 7C:
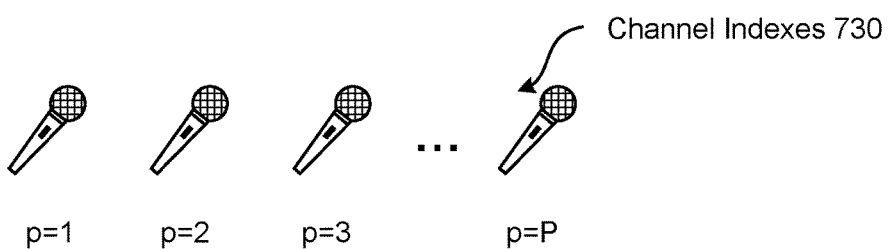

The system 100 may include multiple microphone(s) 114, with a first channel p corresponding to a first microphone 114a, a second channel (p+1) corresponding to a second microphone 114b, and so on until a final channel (P) that corresponds to microphone 114P. FIG. 7C illustrates channel indexes 730 including a plurality of channels from channel p to channel P. While many drawings illustrate two channels (e.g., two microphones 114), the disclosure is not limited thereto and the number of channels may vary. For the purposes of discussion, an example of system 100 includes "P" microphones 114 (P>1) for hands free near-end/far-end distant speech recognition applications.

FIG. 8 illustrates examples of audio data in a time domain and a frequency domain. As illustrated in FIG. 8, energy chart 810 represents microphone audio data x(n) 812 in a time domain, which can be converted using FFT 820 to microphone audio data X(m,n) 822 in a frequency domain. The microphone audio data X(m,n) 822 may be a one dimensional vector of complex numbers, which may be used to calculate a two dimensional matrix of frequency magnitude versus frequency. The system 100 may track an amplitude of each frequency over time, illustrated by spectrogram 830. As illustrated in FIG. 8, the spectrogram 830 may represent time along the horizontal axis (e.g., x-axis) and may represent frequency along the vertical axis (e.g., y-axis), with a magnitude represented by a color between black (e.g., low magnitude) and white (e.g., high magnitude). For example, a feature vector 832 may correspond to a specific point in time, with each row 834 corresponding to a specific frequency. Thus, the microphone audio data X(m, n) 822 enables the system 100 to determine a magnitude associated with each frequency and/or analyze individual frequency bands of the microphone audio data separately.

While FIG. 8 illustrates an example of the microphone audio data X(m,n) 822 in the spectrogram 830, this is intended for ease of illustration and the disclosure is not limited thereto. Instead, while the spectrogram 830 may only illustrate a magnitude and/or power of the microphone audio data X(m,n) 822, the microphone audio data X(m,n) 822 may be comprised of real and imaginary components that are used by the device 110 to perform beamforming or the like. For example, the real and imaginary components of the microphone audio data X(m,n) 822 may include phase information that indicates a time difference between two microphones. Using this phase information, the device 110 may determine which microphone captured audio first and/or perform beamforming.

FIG. 9 is a conceptual diagram illustrating components of a conventional audio front-end as well as components of a front-end deep neural network (DNN) according to embodiments of the present disclosure.

As illustrated in FIG. 9, a conventional front-end 900 may receive input audio data (e.g., Input₁ and Input₂) from at least two microphones 114. While FIG. 9 illustrates receiving input audio data from only two microphones, in some examples the conventional front-end 900 may receive input audio data from three or more microphones 114. This input audio data is in the time domain, so Time/Frequency Transform 910a and 910b may convert the input audio data to the frequency domain prior to beamforming.

Beamforming 912 refers to processing the input audio data to separate the input audio data into individual signals that correspond to a plurality of directions, with each signal corresponding to a particular direction. This may be referred to as beamforming and it improves speech processing by isolating audio data generated in a specific direction. After beamforming, beamformer selection 914 may select a single audio signal (e.g., beamformed audio data) with the highest energy. However, in some examples the beamformer selection 914 may select two or more audio signals.

In some examples, the beamforming 912 and the beamformer selection 914 may be performed on a local device and the local device may upload the beamformed audio data (e.g., in the frequency domain) to a remote device (e.g., the server(s) 120 or the like) for further processing. However, the conventional front-end 900 is not limited thereto and in some examples the beamforming 912, the beamformer selection 914, and the frequency/time transform 916 may be performed on the local device and the local device may upload the beamformed audio data (e.g., in the time domain), may perform additional processing, and/or the like.

The remote server(s) may receive the beamformed audio data (e.g., in the frequency domain) and Frequency/Time Transform 916 may then convert the beamformed audio data back into the time domain (e.g., reconstruct the time-domain signal). The remote server(s) 120 may perform feature extraction on the time-domain signal, such as log-mel filter bank energy (LFBE) feature extraction (e.g., LFBE extraction 918), to generate a feature vector. For example, the LFBE extraction 918 may perform a series of steps, including performing a Fourier Transform (e.g., STFT, FFT or the like) and applying filters (e.g., triangular filters) in a filter bank on a Mel-scale to the power spectrum to extract frequency bands. The Mel-scale aims to mimic the non-linear human ear perception of sound, by being more discriminative at lower frequencies and less discriminative at higher frequencies. For example, converting between Hertz (f) and Mel (m) may use the following equations:

$$m = 2595 * \log_{10}\left(1 + \frac{f}{700}\right) \quad [2]$$

$$f = 700(10^{m/2595} - 1) \quad [3]$$

Each filter in the filter bank is triangular having a response of 1 at the center frequency and decrease linearly towards 0 till it reaches the center frequencies of the two adjacent filters where the response is 0.

Thus, the feature vector may indicate a magnitude of energy in individual frequency bands of the beamformed audio data, where the frequency bands are non-uniform and based on the Mel-scale. However, the conventional front-end 900 is not limited thereto and in some examples the LFBE extraction 918 may determine Mel-Frequency Cepstrum Coefficients (MFCCs) instead. For example, the filter bank coefficients used by the LFBE extraction 918 may be highly correlated, which can be a problem for some machine learning algorithms. To avoid this, the LFBE extraction 918 may apply Discrete Cosine Transform (DCT) to decorrelate the filter bank coefficients and yield a compressed representation of the filter banks (e.g., a process also referred to as whitening). In some examples, the resulting cepstral coefficients 2-13 may be retained and the rest may be discarded.

Regardless of whether the conventional front-end 900 uses Mel-scaled filter banks and/or Mel-Frequency Cepstrum Coefficients (MFCCs), the conventional front-end 900 may perform feature normalization 920 to normalize the feature vector. For example, the feature normalization 920 may perform causal and global mean-variance normalization. In some examples, the feature normalization 920 may subtract the mean of each coefficient from all frames to generate a mean-normalized feature vector. Thus, the feature normalization 920 balances the spectrum and improves a Signal-to-Noise ratio (SNR) or other signal quality metric of the output of the conventional front-end 900.

The conventional front-end 900 may output a normalized feature vector to a classification DNN 930 to perform acoustic unit classification (e.g., acoustic modeling). In some examples, the classification DNN 930 may be included in the ASR component 250, although the disclosure is not limited thereto. For example, the classification DNN may detect distinct short sounds (e.g., predict ASR senon or phoneme targets, sometimes referred to as acoustic modeling). The results from the acoustic modeling may be used in a language modeling operation to ultimately generate output text, which may be used for NLU processing. ASR operations may include both acoustic modeling and language modeling. As illustrated in FIG. 9, the classification DNN 930 may include 5 long short-term memory components (LSTMs) 930 (although the disclosure is not limited thereto and the number of LSTMs may vary), affine transform 932 and softmax 934 layers. The classification DNN 930 is trained using data in the form of the normalized LFBE features in order to classify senons. The posterior of each senon is associated with the Hidden Markov Model (HMM) state.

Each LSTM of the 5 LSTMs 930 may be configured to "remember" values over an arbitrary time limit, as understood by one of skill in the art. The affine transform 932 may apply an affine transform (or affine transformation), which may be represented using the following equation:

$$\vec{y} = f(\vec{x}) = A\vec{x} + \vec{b} \quad [4]$$

Additionally or alternatively, an affine transform may be represented using an augmented matrix and an augmented vector to enable matrix multiplication. The technique requires that all vectors are augmented with a "1" at the end, and all matrices are augmented with an extra row of zeros at the bottom, an extra column (e.g., the translation vector) to the right, and a "1" in the lower right corner. For example, if A is a matrix, then equation [4] is equivalent to the following affine transformation matrix:

$$\begin{bmatrix} \vec{y} \\ 1 \end{bmatrix} = \begin{bmatrix} A & \vec{b} \\ 0 \cdots 0 & 1 \end{bmatrix} \begin{bmatrix} \vec{x} \\ 1 \end{bmatrix} \quad [5]$$

Finally, the softmax 934 may apply a softmax function (e.g., normalized exponential function) to highlight the largest values and suppress values which are significantly below the maximum value.

Thus, a conventional far-field speech recognition system (e.g., distant speech recognition system) consists of distinct components for beamforming (e.g., beamforming 912 and beamformer selection 914), feature extraction (e.g., LFBE extraction 918 and feature normalization 920) and acoustic units classification (e.g., classification DNN 930). These distinct components are typically optimized individually for signal enhancement (e.g., audio signal sounds clearer due to less noise).

To improve speech processing, the present disclosure illustrates an example architecture that includes a DNN-based acoustic model front-end that mimics beamforming and feature extraction in a data-driven manner. For example, FIG. 9 illustrates a new architecture that replaces the conventional audio front-end 900 with a new modeling approach where multi-channel input audio data from the microphone(s) 114 is directly modeled in DNN front-end 950.

The DNN front-end 950 includes an input stage that receives input audio data (e.g., Input$_1$ and Input$_2$) for each input channel (e.g., from each of the microphone(s) 114) and performs input processing 952. For example, the DNN front-end 950 may convert the input audio data from a time domain to a frequency domain and/or perform normalization to control a magnitude of the modified input audio data.

In some examples, the input processing 952 may perform Fast Fourier Transform (FFT) processing and/or global mean and variance normalization (GMVN) processing to generate the modified input audio data. For example, the FFT processing may convert the input audio data from the time domain to the frequency domain using any technique known to one of skill in the art. After converting to the frequency domain, GMVN processing normalizes the input audio data by transforming the input audio data to a global mean and global variance. Thus, normalizing the input audio data may standardize values based on a uniform scale, which may eliminate mismatches between training and test utterances as well as between utterances from different users. However, the disclosure is not limited thereto and the system 100 may perform normalization using any technique known to one of skill in the art without departing from the disclosure.

In some examples, the input processing 952 may perform FFT processing and/or GMVN processing separately for each input channel, although the disclosure is not limited thereto. For example, FIG. 9 illustrates the DNN front-end 950 receiving two input channels, with first input audio data Input$_1$ being processed by first input processing 952a and second input audio data Input$_2$ being processed by second input processing 952b. After the input audio data is converted to the frequency domain (e.g., using FFT processing) and/or normalized (e.g., using GMVN processing) to generate Discrete Fourier Transform (DFT) coefficients, the two channels of input audio data are concatenated and passed to a multi-channel deep neural network (DNN) 960. However, the disclosure is not limited thereto and the DNN front-end 950 may modify the input audio data using any technique known to one of skill in the art before inputting the input audio data to the multi-channel DNN 960. For example, the DNN front-end 950 may use any technique to convert the input audio data to the frequency domain and/or to normalize the input audio data without departing from the disclosure.

The multi-channel DNN 960 takes raw signals collected from multiple microphones and produces a compact representation (e.g., first feature vector) that may be used similarly to beamformed features generated by beamforming 912 and/or beamformer selection 914. For example, as will be discussed in greater detail with regard to FIG. 10, the multi-channel DNN 960 may perform spatial filtering to separate the input audio data into a plurality of directions and determine an amount of energy in individual frequency bands for each of the plurality of directions.

The output of the multi-channel DNN 960 (e.g., first feature vector) is sent to feature extraction DNN 970, which transforms this output to a lower dimensional representation (e.g., second feature vector). For example, the feature extraction DNN 970 may multiply the first feature vector by a matrix to combine multiple frequency bands based on the Mel-scale. The Mel-scale aims to mimic the non-linear human ear perception of sound, by being more discriminative at lower frequencies and less discriminative at higher frequencies, as discussed above with regard to equations [2] and [3]. Thus, the second feature vector may indicate a magnitude of energy in individual frequency bands of the beamformed audio data, where the frequency bands are non-uniform and based on the Mel-scale. For example, the first feature vector output by the multi-channel DNN 960 may include a plurality of frequency ranges having a first size, whereas the second feature vector output by the feature extraction DNN 970 may include a plurality of frequency ranges having varying sizes (e.g., second size, third size, etc.) based on the Mel-scale. However, the feature extraction DNN 970 is not limited thereto and in some examples the feature extraction DNN 970 may determine Mel-Frequency Cepstrum Coefficients (MFCCs) without departing from the disclosure While feature extraction corresponding to LFBE extraction 918 is performed using a remote device, the device 110 may perform feature extraction DNN 970 locally and send the second feature vector to the server(s) 120 to perform acoustic unit classification using the classification DNN 930, which is identical to the classification DNN 930 described above. For example, the classification DNN 930 may detect distinct short sounds (e.g., predict ASR senon or phoneme targets, sometimes referred to as acoustic modeling). The results from the acoustic modeling may be used in a language modeling operation to ultimately generate output text, which may be used for NLU processing. ASR operations may include both acoustic modeling and language modeling. As illustrated in FIG. 9, the classification DNN 930 may include 5 long short-term memory components (LSTMs) 930 (although the disclosure is not limited thereto and the number of LSTMs may vary), affine transform 932 and softmax 934 layers. The classification DNN 930 is trained using data in the form of the second feature vector in order to classify senons. The posterior of each senon is associated with the Hidden Markov Model (HMM) state.

By replacing the conventional audio front-end 900 with the DNN front-end 950, the far-field speech recognition system may be jointly optimized for ASR processing (as opposed to individually optimized for signal enhancement). For example, the multi-channel DNN 960, the feature extraction DNN 970, and the classification DNN 930 may be jointly optimized, despite being divided between the device 110 and the server(s) 120, by optimizing each processing block in a stage-wise manner. Additionally or alternatively, the far-field speech recognition system may be optimized to capture speech (e.g., target phonemes), even if this results in more noise, as this improves performance of ASR processing.

Another benefit of using the DNN front-end 950 is that the system may be able to obtain desired system performance even if there is a reduction in a number of microphones, as performance using the techniques herein may be similar using two microphones for audio capture as it is using four or more microphones. However, the disclosure is not limited thereto and the DNN front-end 950 may receive input audio data from three or more microphones 114 without departing from the disclosure. Additionally or alternatively, a bandwidth requirement may be reduced during real time processing as the device 110 only needs to upload low dimensional feature vectors (e.g., a second feature vector) for speech processing by the server(s) 120 rather than sending more bandwidth intensive raw audio data (or other data). In some examples, the raw input audio data may be uploaded at a later point in time (for example for system correction and/or retraining), although the disclosure is not limited thereto and the device 110 may either upload or not upload the raw audio data without departing from the disclosure.

Figure 10:
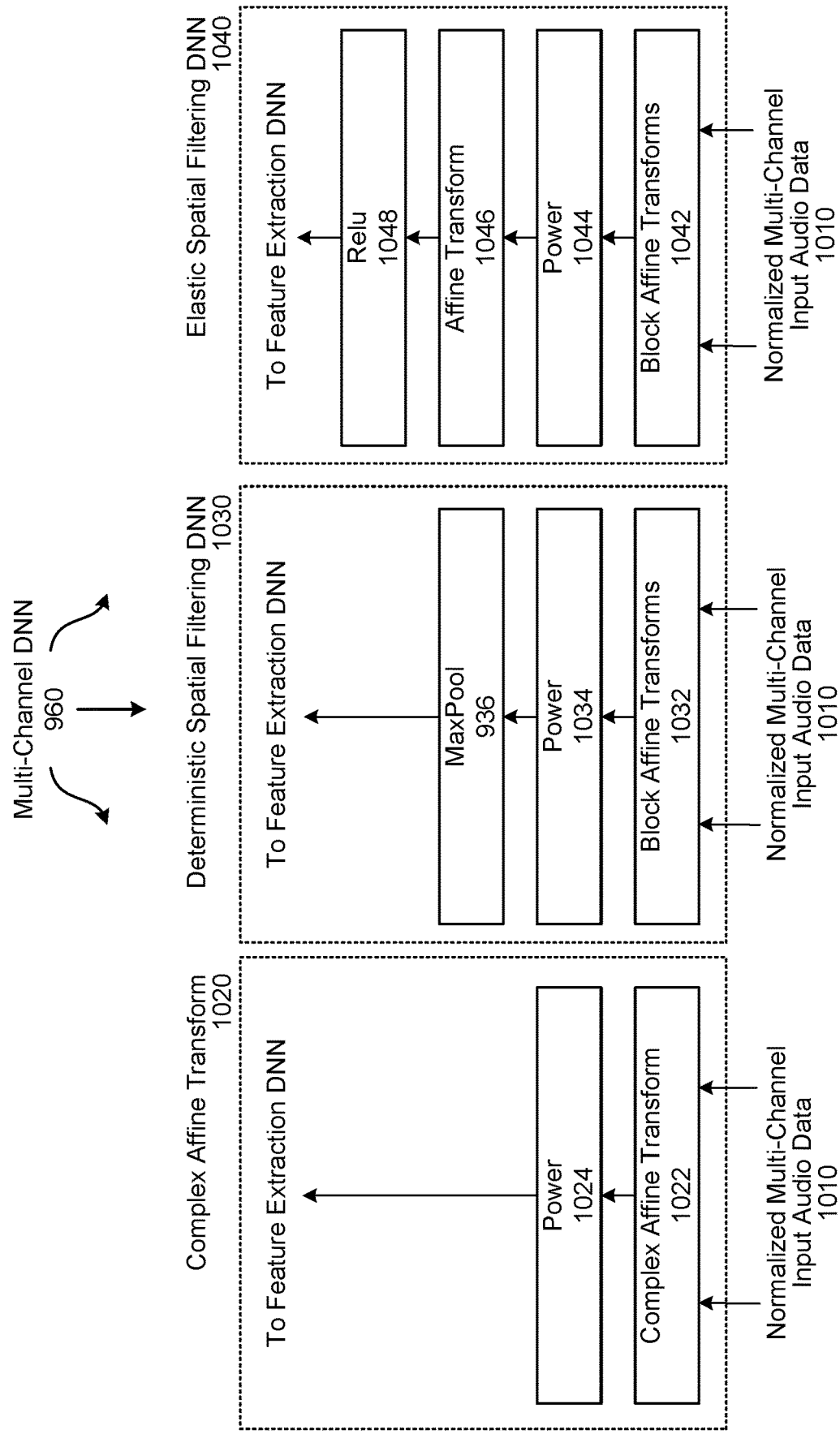
FIG. 10 is a conceptual diagram of components of multi-channel DNNs according to embodiments of the present disclosure.

FIG. 10 is a conceptual diagram of components of multi-channel DNNs according to embodiments of the present disclosure. As illustrated in FIG. 10, the multi-channel DNN 960 may use one of three different architectures to generate the first feature vector. However, the disclosure is not limited thereto and the examples illustrated in FIG. 10 are intended merely to illustrate potential architectures. While FIG. 10 illustrates potential implementations for the multi-channel DNN 960, the multi-channel DNN 960 may use any technique known to one of skill in the art without departing from the disclosure.

A first architecture is illustrated in FIG. 10 by complex affine transform 1020, which may receive normalized-multi-channel input audio data 1010 in the frequency domain and perform a complex affine transform (CAT) 1022 and power 1024 calculation to generate the first feature vector. The complex affine transform 1022 performs a transformation on the input audio data 1010 to generate an intermediate feature vector indicating an amount of energy in individual frequency bands, and the power 1024 calculation determines an amount of power in the individual frequency bands.

A second architecture is illustrated in FIG. 10 by deterministic spatial filtering DNN 1030, which may receive normalized-multi-channel input audio data 1010 in the frequency domain, perform a block affine transform 1032, power 1034 calculation, and MaxPool 1036 calculation to generate the first feature vector. The block affine transforms 1032 performs a transformation on the input audio data 1010 in order to separate the input audio data 1010 into a plurality of directions and determine an amount of energy in individual frequency bands for each of the plurality of directions, similar to beamforming. The power 1034 calculation corresponds to a complex square computation (e.g., calculates a sum of a square on a pair of outputs from the block affine transforms 1032) that determines an amount of power in the individual frequency bands for each of the plurality of directions. The MaxPool 936 calculation performs a max-pooling operation meant to mimic beamformer selection based on a maximum power at each frequency band (e.g., frequency bin). However, due to the deterministic nature of this output selection, it may not be capable of recovering a selection error. To alleviate the unrecoverable error, the deterministic spatial filtering DNN 1030 allows the block affine transforms 1032 to interact with different frequency components. For example, the output of the deterministic spatial filtering DNN 1030 for each frequency $\omega_k$ may be expressed as the following affine transform:

$$Y(\omega_k) = \max\left(pow\left(\begin{bmatrix} 0_{M(k-1)} & w_{SD}^H(\omega_k, p_1) & 0_{M(K-k)} \\ & \vdots & \\ 0_{M(k-1)} & w_{SD}^H(\omega_k, p_D) & 0_{M(K-k)} \end{bmatrix} \begin{bmatrix} X(\omega_1) \\ X(\omega_2) \\ \vdots \\ X(\omega_K) \end{bmatrix} + b\right)\right) \quad [6]$$

where $\omega_k$ is a frequency band (e.g., frequency bin), K is a number of different frequency bands (e.g., [k=1 ... K]), $Y(\omega_k)$ is a single output of the deterministic spatial filtering DNN 1030 for a single frequency band, max( ) corresponds to the max-pooling operation, pow( ) is the sum of squares of two adjacent values, $0_L$ is an L-dimension zero vector for initializing a non-target frequency weight to zero, $0_0$ represents null, $w_{SD}^H$ are existing beamformer coefficients corresponding to particular directions $p_d$ for each frequency band $\omega_k$, D is a number of different directions (e.g., [d=1 ... D]), $X(\omega_k)$ is an input FFT from multiple channels (e.g., concatenated multi-channel feature vector corresponding to the input audio data 1010), and b is a bias vector. Thus, each row corresponds to a different direction (e.g., from a first direction $p_1$ to a final direction $p_D$), and initializing the first layer (e.g., block affine transforms 1032) with beamformer coefficients $w_{SD}^H$ (e.g., beamformer weights) improves results.

A third architecture is illustrated in FIG. 10 by elastic spatial filtering DNN 1040, which may receive normalized-multi-channel input audio data 1010 in the frequency domain, perform a block affine transform 1042, power 1044 calculation, affine transform 1046, and Rectified Linear Unit (Relu) 948 calculation to generate the first feature vector. As discussed above with regard to the deterministic spatial filtering DNN 1030, the block affine transforms 1042 performs a transformation on the input audio data 1010 in order to separate the input audio data 1010 into a plurality of directions and determine an amount of energy in individual frequency bands for each of the plurality of directions, similar to beamforming, and the power 1044 calculation corresponds to a complex square computation (e.g., calculates a sum of a square on a pair of outputs from the block affine transforms 1042) that determines an amount of power in the individual frequency bands for each of the plurality of directions. For example, the output of the power 1044 calculation may be represented by a block of frequency independent affine transforms:

$$\begin{bmatrix} Y_{1,1}(\omega_1) \\ \vdots \\ Y_D(\omega_1) \\ \vdots \\ Y_{1,}(\omega_K) \\ \vdots \\ Y_D(\omega_K) \end{bmatrix} = pow \begin{pmatrix} w_{SD}^H(\omega_1, p_1)X(\omega_1) + b_1 \\ \vdots \\ w_{SD}^H(\omega_1, p_D)X(\omega_1) + b_D \\ \vdots \\ w_{SD}^H(\omega_K, p_1)X(\omega_K) + b_{D(K-1)+1} \\ \vdots \\ w_{SD}^H(\omega_K, p_D)X(\omega_K) + b_{DK} \end{pmatrix} \quad [7]$$

where $\omega_k$ is a frequency band (e.g., frequency bin), K is a number of different frequency bands (e.g., [k=1 ... K]), D is a number of different directions (e.g., [d=1 ... D]), $Y_d(\omega_k)$ is an output of the elastic spatial filtering DNN 1040 for a single frequency band k and a single direction $p_d$, pow( ) is the sum of squares of two adjacent values, $w_{SD}^H$ are existing beamformer coefficients corresponding to particular directions $p_d$ for each frequency band $\omega_k$, $X(\omega_k)$ is an input FFT from multiple channels (e.g., concatenated multi-channel feature vector corresponding to the input audio data 1010), and b is a bias vector (e.g., [b=$b_1$ ... $b_{DK}$] for each direction $p_d$ and frequency band $\omega_k$. Thus, the output of the power 1044 calculation is a vector or matrix with each row indicating a power associated with an individual direction $p_d$ and frequency band $\omega_k$. The beamforming weights and bias vectors will be updated during training.

While the deterministic spatial filtering DNN 1030 mimics beamforming by selecting a maximum power at each frequency band (e.g., similar to beamformer selection 914), the elastic spatial filtering DNN 1040 does not. Instead, the elastic spatial filtering DNN 1040 performs another affine transform 1046 to determine a combined power corresponding to multiple directions. Thus, beamformer selection errors can be alleviated by combining the weighted output of two or more directions. The output of the affine transform 1046 is input to the Relu 1048 calculation, which replaces negative numbers with a value of zero so that the output of the multi-channel DNN 960 does not include any negative numbers.

Figure 11:
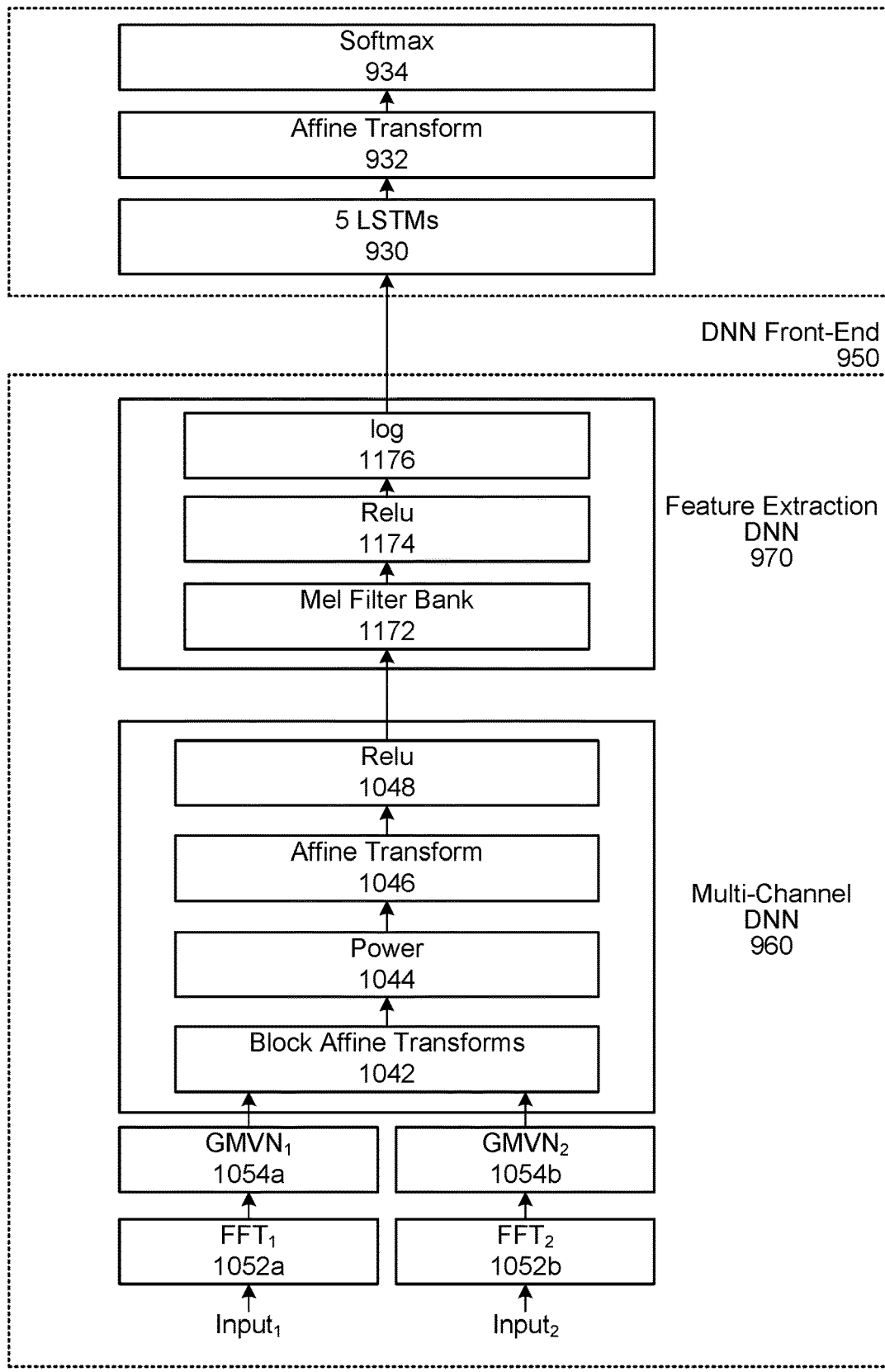
FIG. 11 is a conceptual diagram illustrating components of a front-end DNN according to embodiments of the present disclosure.

FIG. 11 is a conceptual diagram illustrating components of a front-end DNN according to embodiments of the present disclosure. As illustrated in FIG. 11, the DNN front-end 950 includes an input stage that receives input audio data (e.g., Input$_1$ and Input$_2$) for each input channel (e.g., from each of the microphone(s) 114) and performs Fast Fourier Transform (FFT) 1052 processing and global mean and variance normalization (GMVN) 1054 processing separately for each input channel. For example, FIG. 11 illustrates the DNN front-end 950 receiving two input channels, with first input audio data Input$_1$ being processed by FFT$_1$ 1052$a$ and GMVN$_1$ 1054$a$ and second input audio data Input$_2$ being processed by FFT$_2$ 1052$b$ and GMVN$_2$ 1054$b$.

The FFT 1052 processing may convert the input audio data from the time domain to the frequency domain using any technique known to one of skill in the art. After converting to the frequency domain, the GMVN 1054 normalizes the input audio data by transforming the input audio data to a global mean and global variance. Thus, normalizing the input audio data may standardize values based on a uniform scale, which may eliminate mismatches between training and test utterances as well as between utterances from different users. However, the disclosure is not limited thereto and the system 100 may perform normalization using any technique known to one of skill in the art without departing from the disclosure.

After the input audio data is converted to the frequency domain (e.g., using FFT 1052) and normalized (e.g., using GMVN 1054) to generate Discrete Fourier Transform (DFT) coefficients, the two channels of input audio data are concatenated and passed to a multi-channel deep neural network (DNN) 960.

While FIG. 11 illustrates the steps of performing FFT and GMVN as two separate steps, the disclosure is not limited thereto. Instead, the DNN front-end 950 may perform both FFT and GMVN as a single step without departing from the disclosure.

While FIG. 11 illustrates the DNN front-end 950 performing FFT 1052 processing, this is intended to illustrate a single example and the disclosure is not limited thereto. Instead, as FFT processing is just one technique to convert a signal from the time domain to the frequency domain, the DNN front-end 950 may use any technique known to one of skill in the art without departing from the disclosure.

The multi-channel DNN 960 takes raw signals collected from multiple microphones and produces a compact representation (e.g., first feature vector, first feature vector data, etc.) that may be used similarly to beamformed features generated by beamforming 912 and/or beamformer selection 914. For example, as discussed in greater detail above with regard to FIG. 10, the multi-channel DNN 960 may perform spatial filtering to separate the input audio data into a plurality of directions and determine an amount of energy in individual frequency bands for each of the plurality of directions. FIG. 11 illustrates the multi-channel DNN 960 comprising the third architecture discussed above, including the block affine transforms 1042, power 1044 calculation, affine transform 1046, and Relu 1048.

The output of the multi-channel DNN 960 (e.g., first feature vector) is sent to feature extraction DNN 970, which transforms this output to a lower dimensional representation (e.g., second feature vector, second feature vector data, etc.). For example, the feature extraction DNN 970 may multiply the first feature vector by a Mel filter bank 1172 (e.g., affine matrix weighted to convert to the Mel-scale) to combine multiple frequency bands based on the Mel-scale. The feature extraction DNN 970 may then perform a Rectified Linear Unit (Relu) 1174 calculation to replace negative values with a value of zero prior to performing a log 1176 calculation to generate the second feature vector. As discussed above with regard to equations [2] and [3], the Mel-scale aims to mimic the non-linear human ear perception of sound, by being more discriminative at lower frequencies and less discriminative at higher frequencies. Thus, the second feature vector may indicate a magnitude of energy in individual frequency bands of the beamformed audio data, where the frequency bands are non-uniform and based on the Mel-scale.

The device 110 may generate the second feature vector and send the second feature vector to the server(s) 120 to perform acoustic unit classification using the classification DNN 930. For example, the classification DNN 930 may detect distinct short sounds (e.g., predict ASR senon or phoneme targets) and ultimately generate text for NLU processing. As illustrated in FIG. 11, the classification DNN 930 may include 5 long short-term memory components (LSTMs) 930, affine transform 932 and softmax 934 layers. The classification DNN 930 is trained using data in the form of the second feature vector in order to classify senons. The posterior of each senon is associated with the Hidden Markov Model (HMM) state.

Figure 12:
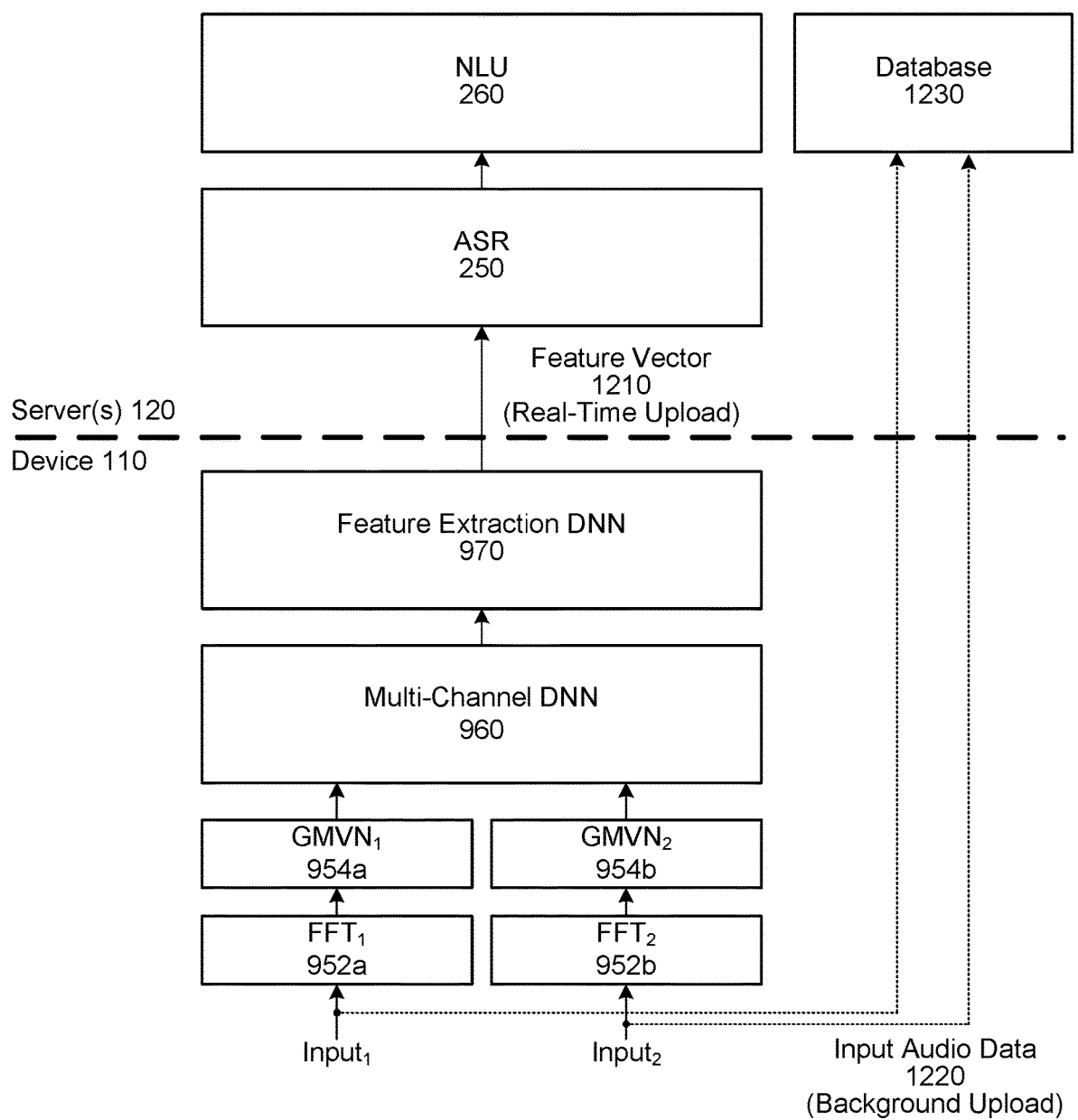
FIG. 12 is a conceptual diagram illustrating components for uploading feature vectors and audio data according to embodiments of the present disclosure.

FIG. 12 is a conceptual diagram illustrating components for uploading feature vectors and audio data according to embodiments of the present disclosure. As discussed above, the device 110 may include the multi-channel DNN 960 and the feature extraction DNN 970 and may upload a feature vector 1210 (e.g., the second feature vector generated by the feature extraction DNN 970) to the server(s) 120 for speech processing. The server(s) 120 may perform speech recognition using the Automatic Speech Recognition (ASR) component 250 using the feature vector 1210 and may perform natural language understanding (NLU) using the NLU component 260. The server(s) 120 may perform additional processing to identify a voice command, perform an action, and/or send an instruction to the device 110 to perform an action.

Whereas a conventional audio front-end uploads audio data (e.g., beamformed audio data) during real-time processing in order for the server(s) 120 to determine the voice command and/or determine the action to perform, the device 110 illustrated in FIG. 12 only needs to upload the feature vector 1210 during real-time processing. Thus, an amount of bandwidth required to perform speech processing is reduced during real-time processing. At a later point in time, when the device 110 is inactive and/or bandwidth is not an issue, the device 110 may upload the input audio data 1220 to the server(s) 120. For example, the device 110 may upload the input audio data 1220 to a database 1230 as a background upload, enabling the server(s) 120 to perform training or additional processing on the input audio data 1220 itself. Thus, the device 110 may send the feature vector 1210 to the server(s) 120 at a first time, may receive a voice command or an instruction to perform an action from the server(s) 120 at a second time, and may send the input audio data 1220 to the server(s) 120 at a third time. However, the disclosure is not limited thereto, and in some examples the device 110 may never upload the input audio data 1220 to the server(s) 120 without departing from the disclosure.

As illustrated in FIG. 12, the system 100 may upload the feature vector 1210 to a first component within the server(s) 120 (e.g., ASR component 250) and may upload the input audio data 1220 to a second component within the server(s) 120 (e.g., database 1230). Thus, in some examples the device 110 may upload the feature vector 1210 to a first server 120a and may upload the input audio data 1220 to a second server 120b that is separate from the first server 120a without departing from the disclosure. However, the disclosure is not limited thereto and the device 110 may upload the feature vector 1210 and the input audio data 1220 to a single server 120 without departing from the disclosure.

Additionally or alternatively, while FIG. 12 illustrates the device 110 uploading the input audio data 1220 at the third time after the first time, the disclosure is not limited thereto. Instead, the device 110 may upload (i) input audio data in a time domain (e.g., output of the microphone(s) 114 and/or after performing audio processing), (ii) input audio data in a frequency domain (e.g., output of the FFT 952 and/or normalized output of the GMVN 954), (iii) the feature vector 1210, or (iv) a combination thereof without departing from the disclosure. For example, the device 110 may upload the feature vector 1210 along with the input audio data 1220 to enable the server(s) 120 to compare the feature vector 1210 to another feature vector generated by the server(s) 120 using the input audio data 1220.

Figure 13:
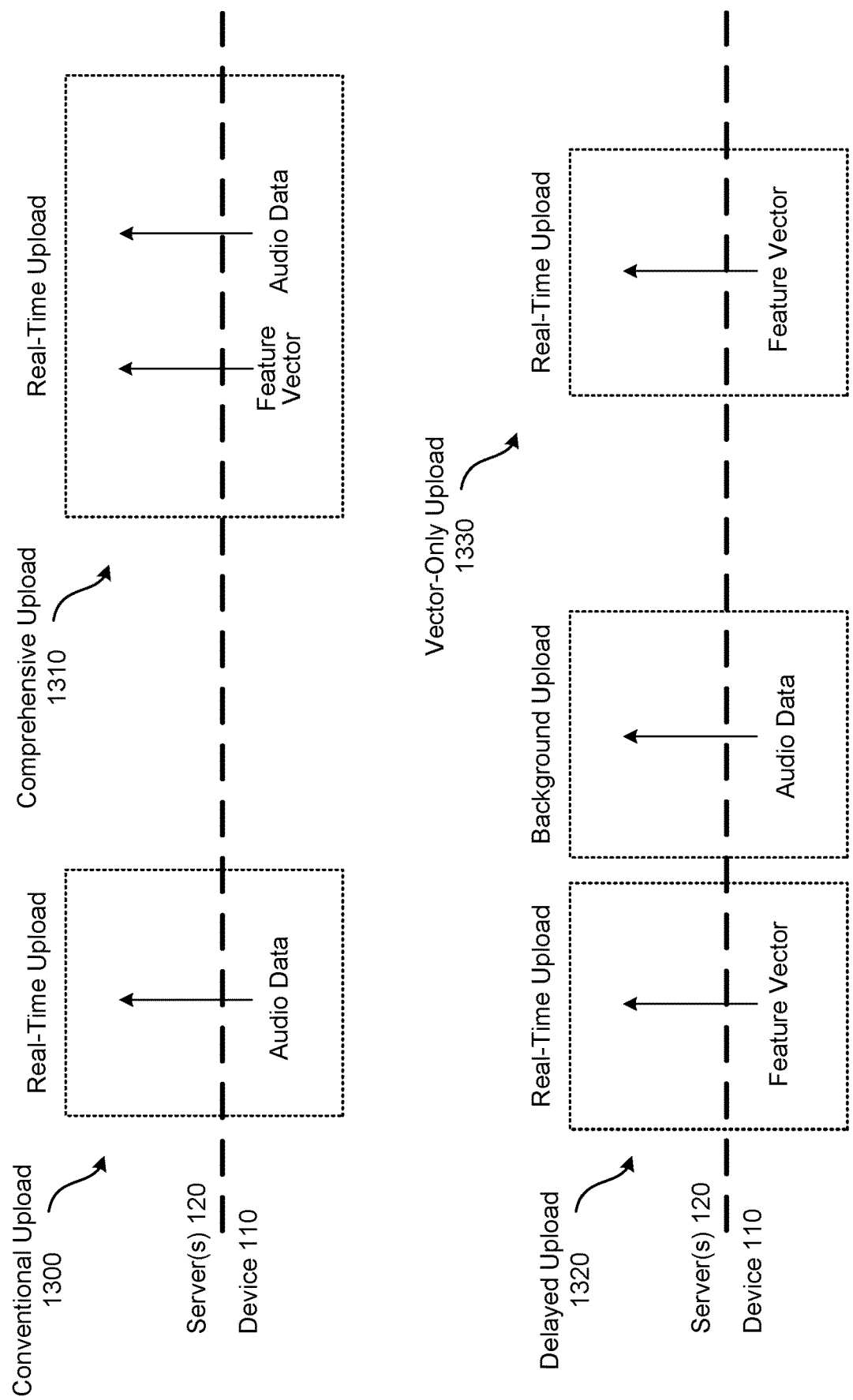
FIG. 13 illustrates examples of timing associated with uploading feature vectors and/or audio data according to embodiments of the present disclosure.

FIG. 13 illustrates examples of timing associated with uploading feature vectors and/or audio data according to embodiments of the present disclosure. As illustrated in FIG. 13, a conventional upload 1300 corresponds to the device 110 uploading audio data during real-time processing as a real-time upload. Thus, the device 110 uploads the audio data prior to the server(s) 120 performing speech processing.

In some examples, the device 110 may perform a comprehensive upload 1310, meaning that the device 110 uploads a feature vector and audio data during real-time processing as a real-time upload. However, the device 110 may instead perform a delayed upload 1320, meaning that the device 110 uploads the feature vector prior to the server(s) 120 performing speech processing and then uploads the audio data at a later point in time. Additionally or alternatively, the device 110 may perform a vector-only upload 1330, meaning that the device 110 only uploads the feature vector and does not upload audio data to the server(s) 120.

While FIGS. 9-12 described above illustrate the system 100 performing spatial filtering using a multi-channel DNN (e.g., multi-channel DNN 960), the disclosure is not limited thereto. To improve spatial filtering and account for different shapes of a microphone array, the system 100 may perform spatial filtering using a multi-geometry/multi-channel (MG/MC) DNN that processes the multi-channel input audio data using multiple microphone array geometries simultaneously and generates a single output. For example, the MG/MC DNN may separate the multi-channel input audio data into a plurality of directions for individual microphone array geometries (e.g., generate individual directional audio data for each microphone array configuration and/or estimated position associated with the microphone array configuration), determine an amount of energy in individual frequency bands for each of the plurality of directions and plurality of microphone array geometries, and determine an amount of power in one or more of the plurality of directions.

Figure 14:
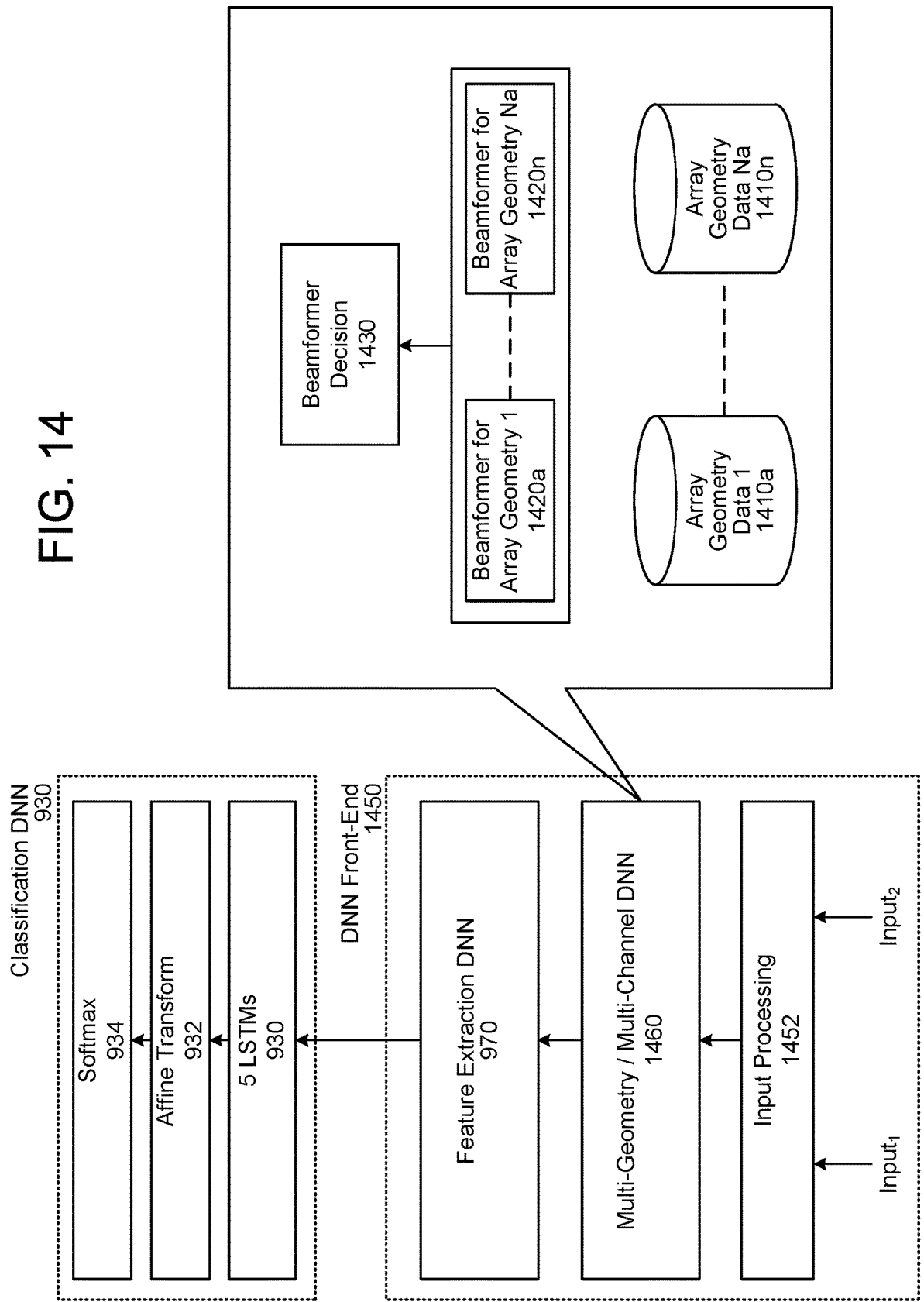
FIG. 14 is a conceptual diagram illustrating components of a front-end DNN initialized with data corresponding to multiple microphone array geometries according to embodiments of the present disclosure.

FIG. 14 is a conceptual diagram illustrating components of a front-end DNN initialized with data corresponding to multiple microphone array geometries according to embodiments of the present disclosure. To improve speech processing, the present disclosure illustrates an example architecture that includes a DNN-based acoustic model front-end that mimics beamforming and feature extraction in a data-driven manner for multiple microphone array geometries. To account for the multiple microphone array geometries, FIG. 14 illustrates a DNN front-end 1450 that replaces the multi-channel DNN 960 with a MG/MC DNN 1460.

The DNN front-end 1450 includes an input stage that receives input audio data (e.g., Input$_1$ and Input$_2$) for each input channel (e.g., from each of the microphone(s) 114) and performs input processing 1452. For example, the DNN front-end 1450 may convert the input audio data from a time domain to a frequency domain and/or perform normalization to control a magnitude of the modified input audio data.

In some examples, the input processing 1452 may perform Fast Fourier Transform (FFT) processing and/or global mean and variance normalization (GMVN) processing to generate the modified input audio data. For example, the FFT processing may convert the input audio data from the time domain to the frequency domain using any technique known to one of skill in the art. After converting to the frequency domain, GMVN processing normalizes the input audio data by transforming the input audio data to a global mean and global variance. Thus, normalizing the input audio data may standardize values based on a uniform scale, which may eliminate mismatches between training and test utterances as well as between utterances from different users. However, the disclosure is not limited thereto and the system 100 may perform normalization using any technique known to one of skill in the art without departing from the disclosure.

In some examples, the input processing 1452 may perform FFT processing and/or GMVN processing separately for each input channel, although the disclosure is not limited thereto. However, for ease of illustration FIG. 14 illustrates the input stage as a single input processing component 1452 configured to process multiple channels of input audio data. For example, FIG. 14 illustrates the input processing component 1452 receiving two input channels, first input audio data Input$_1$ and second input audio data Input$_2$. After the input audio data is converted to the frequency domain (e.g., using FFT processing) and/or normalized (e.g., using GMVN processing) to generate Discrete Fourier Transform (DFT) coefficients, the two channels of input audio data are concatenated and passed to the MG/MC DNN 1460. However, the disclosure is not limited thereto and the DNN front-end 1450 may modify the input audio data using any technique known to one of skill in the art before inputting the input audio data to the MG/MC DNN 1460. For example, the DNN front-end 1450 may use any technique to convert the input audio data to the frequency domain and/or to normalize the input audio data without departing from the disclosure.

The MG/MC DNN 1460 takes raw signals collected from multiple microphones and produces a compact representation (e.g., first feature vector) that may be used similarly to beamformed features generated by beamforming 912 and/or beamformer selection 914 in the conventional front-end 900 described above with regard to FIG. 9. For example, as will be discussed in greater detail with regard to FIG. 15, the MG/MC DNN 1460 may perform spatial filtering to separate the input audio data into a plurality of directions for a plurality of microphone array geometries and determine an amount of energy in individual frequency bands for each of the plurality of directions associated with an individual microphone array geometry.

As illustrated in FIG. 14, the MG/MC DNN 1460 may be conceptually illustrated as including a plurality of beamformers, one for each microphone array geometry, enabling the MG/MC DNN 1460 to effectively process the multi-channel input audio data using each of the plurality of beamformers and generates an output using a beamformer decision component 1430. For example, FIG. 14 illustrates array geometry data 1410 (e.g., array geometry data 1 1410*a*-array geometry data Na 1410*n*, corresponding to array geometry data for Na different geometries), which may be used to simulate a plurality of beamformers 1420 (e.g., beamformer for array geometry 1 1420*a*-beamformer for array geometry Na 1420*n*). Thus, the MG/MC DNN 1460 may generate directional audio data for each of the plurality of beamformers 1420 and may generate a single output using the beamformer decision component 1430.

In some examples, the MG/MC DNN 1460 may generate a weighted output that combines a portion of each of the plurality of beamformers 1420. However, the disclosure is not limited thereto, and the MG/MC DNN 1460 may generate the output using any technique known to one of skill in the art. For example, the MG/MC DNN 1460 may select an output from a single beamformer 1420 or generate a combined output using a subset of the plurality of beamformers 1420 without departing from the disclosure. Thus, while the output from a single beamformer 1420 may correspond to directional data that is physically interpretable, the output of the MG/MC DNN 1460 may be a representation of multiple directional data associated with multiple beamformers 1420 and therefore may not be conceptually the same as the output of a single beamformer 1420.

Additionally or alternatively, the MG/MC DNN 1460 may generate the output using different weights for individual frequency bands. For example, the MG/MC DNN 1460 may use first weights for a first frequency band (e.g., 0-100 Hz), which may favor a first beamformer 1420*a*, while using second weights for a second frequency band (e.g., 100-500 Hz), which may favor a second beamformer 1420*b*. Thus, the MG/MC DNN 1460 may adaptively determine the weights for individual frequency bands without departing from the disclosure.

While FIG. 14 illustrates the MG/MC DNN 1460 including individual beamformers 1420 and the beamformer decision component 1430, this is intended for illustrative purposes only and the MG/MC DNN 1460 may not include the beamformers 1420 and/or the beamformer decision component 1430 without departing from the disclosure. Instead, a technical description of the MG/MC DNN 1460 is described below with regard to FIG. 15.

The output of the MG/MC DNN 1460 (e.g., first feature vector) is sent to feature extraction DNN 970, as described above with regard to FIG. 9, which transforms this output to a lower dimensional representation (e.g., second feature vector). For example, the feature extraction DNN 970 may multiply the first feature vector by a matrix to combine multiple frequency bands based on the Mel-scale. The Mel-scale aims to mimic the non-linear human ear perception of sound, by being more discriminative at lower frequencies and less discriminative at higher frequencies, as discussed above with regard to equations [2] and [3]. Thus, the second feature vector may indicate a magnitude of energy in individual frequency bands of the beamformed audio data, where the frequency bands are non-uniform and based on the Mel-scale. For example, the first feature vector output by the MG/MC DNN 1460 may include a plurality of frequency ranges having a first size, whereas the second feature vector output by the feature extraction DNN 970 may include a plurality of frequency ranges having varying sizes (e.g., second size, third size, etc.) based on the Mel-scale. However, the feature extraction DNN 970 is not limited thereto and in some examples the feature extraction DNN 970 may determine Mel-Frequency Cepstrum Coefficients (MFCCs) without departing from the disclosure While feature extraction corresponding to LFBE extraction 918 is performed using a remote device in the conventional front-end 900, the device 110 may perform feature extraction DNN 970 locally and send the second feature vector to the server(s) 120 to perform acoustic unit classification using the classification DNN 930. For example, the classification DNN 930 may detect distinct short sounds (e.g., predict ASR senon or phoneme targets, sometimes referred to as acoustic modeling). The results from the acoustic modeling may be used in a language modeling operation to ultimately generate output text, which may be used for NLU processing. ASR operations may include both acoustic modeling and language modeling. As illustrated in FIG. 14, the classification DNN 930 may include 5 long short-term memory components (LSTMs) 930, affine transform 932 and softmax 934 layers. The classification DNN 930 is trained using data in the form of the second feature vector in order to classify senons. The posterior of each senon is associated with the Hidden Markov Model (HMM) state.

By replacing the conventional audio front-end 900 with the DNN front-end 1450, the far-field speech recognition system may be jointly optimized for ASR processing (as opposed to individually optimized for signal enhancement). For example, the MG/MC DNN 1460, the feature extraction DNN 970, and the classification DNN 930 may be jointly optimized, despite being divided between the device 110 and the server(s) 120, by optimizing each processing block in a stage-wise manner. Additionally or alternatively, the far-field speech recognition system may be optimized to capture speech (e.g., target phonemes), even if this results in more noise, as this improves performance of ASR processing.

Another benefit of using the DNN front-end 1450 is that the system may be able to obtain desired system performance even if there is a reduction in a number of microphones, as performance using the techniques herein may be similar using two microphones for audio capture as it is using four or more microphones. However, the disclosure is not limited thereto and the DNN front-end 1450 may receive input audio data from three or more microphones 114 without departing from the disclosure. Additionally or alternatively, a bandwidth requirement may be reduced during real time processing as the device 110 only needs to upload low dimensional feature vectors (e.g., a second feature vector) for speech processing by the server(s) 120 rather than sending more bandwidth intensive raw audio data (or other data). In some examples, the raw input audio data may be uploaded at a later point in time (for example for system correction and/or retraining), although the disclosure is not limited thereto and the device 110 may either upload or not upload the raw audio data without departing from the disclosure.

Figure 15:
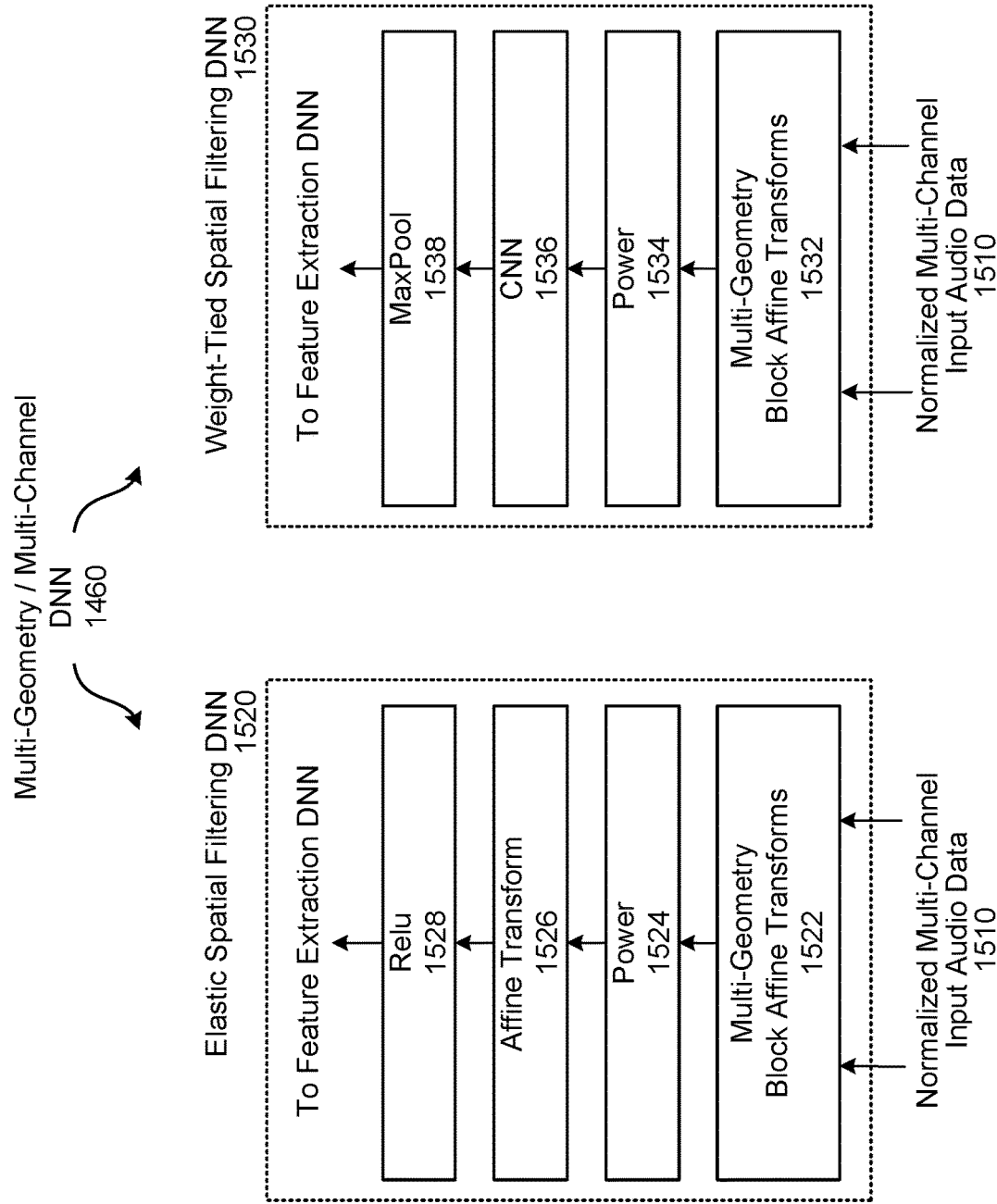
FIG. 15 is a conceptual diagram of components of multi-geometry multi-channel DNNs according to embodiments of the present disclosure.

FIG. 15 is a conceptual diagram of components of multi-geometry multi-channel DNNs according to embodiments of the present disclosure. While FIG. 15 only illustrates two MG/MC DNN architectures, the disclosure is not limited thereto and the MG/MC DNN 1460 may vary without departing from the disclosure. For example, the MG/MC DNN 1460 may include any components known to one of skill in the art in order to generate an output that is equivalent to an output of the architectures described below.

A first architecture is illustrated in FIG. 15 by elastic spatial filtering DNN 1520, which may receive normalized multi-channel input audio data 1510 in the frequency domain, perform multi-geometry block affine transforms 1522, power 1524 calculations, an affine transform 1526, and a Rectified Linear Unit (Relu) 1538 calculation to generate the first feature vector. The only difference between the elastic spatial filtering DNN 1520 and elastic spatial filtering DNN 1040 described above is that the elastic spatial filtering DNN 1040 performs block affine transforms 1042 and affine transform 1046 for a single microphone array geometry, whereas the elastic spatial filtering DNN 1520 performs multi-geometry block affine transforms 1522 and affine transform 1526 for multiple microphone array geometries.

As discussed above, the multi-geometry block affine transforms 1522 perform a transformation on the normalized multi-channel input audio data 1510 in order to separate the normalized multi-channel input audio data 1510 into a plurality of directions for multiple microphone array geometries. For example, the multi-geometry block affine transforms 1522 determine an amount of energy in individual frequency bands for each of the plurality of directions for an individual microphone array geometry, similar to beamforming using an individual beamformer. By embedding multiple microphone array geometries into the multi-geometry block affine transforms 1522, the MG/MC DNN 1460 generates directional data for the plurality of beamformers instead of a single beamformer.

The multi-geometry block affine transforms may be referred to as transform data. In some examples, the multi-geometry block affine transforms may include coefficient values, which may represent weight values associated with individual microphone signals. These coefficient values may represent data similar to beamformer coefficient values used in a conventional beamformer. For example, a first affine transform for a particular frequency band and a first geometry may include a first plurality of M coefficient values used to generate first directional data (e.g., first energy value corresponding to a first weighted sum of the microphone signals) associated with a first direction and the first geometry, a second affine transform for the particular frequency band may include a second plurality of M coefficient values used to generate second directional data (e.g., second energy value corresponding to a second weighted sum of the microphone signals) associated with a second direction and the first geometry, and so on. Thus, each frequency band and each geometry may be associated with coefficient values for each of the plurality of directions. In addition to the coefficient values, the multi-geometry block affine transforms may include a bias vector (or multiple bias vectors) and/or additional coefficients or values without departing from the disclosure. Thus, the multi-geometry block affine transforms may apply one or more mathematical operations without departing from the disclosure.

The power 1524 calculation corresponds to a complex square computation (e.g., calculates a sum of a square on a pair of outputs from the multi-geometry block affine transforms 1522) that determines an amount of power in the individual frequency bands for each of the plurality of directions for an individual microphone array geometry. For example, the output of the power 1524 calculation may be represented by A*D*K blocks of frequency independent affine transforms:

$$\begin{bmatrix} Y_{1,1}(\omega_1) \\ \vdots \\ Y_{1,D}(\omega_1) \\ \vdots \\ Y_{a,d}(\omega_k) \\ \vdots \\ Y_{A,1}(\omega_K) \\ \vdots \\ Y_{A,D}(\omega_K) \end{bmatrix} = pow\left(\begin{bmatrix} w_{SD,1}^H(\omega_1, p_1)X(\omega_1) \\ \vdots \\ w_{SD,1}^H(\omega_1, p_D)X(\omega_1) \\ \vdots \\ w_{SD,a}^H(\omega_k, p_d)X(\omega_k) \\ \vdots \\ w_{SD,A}^H(\omega_K, p_1)X(\omega_K) \\ \vdots \\ w_{SD,A}^H(\omega_K, p_D)X(\omega_K) \end{bmatrix}\right) + b \quad [8]$$

where $\omega_k$ is a frequency band (e.g., frequency bin), K is a number of different frequency bands (e.g., [k=1 ... K]), D is a number of different directions (e.g., [d=1 ... D]), A is a number of different microphone array geometries (e.g., [a=1 ... A]), $Y_{a,d}(\omega_k)$ indicates a power value within the elastic spatial filtering DNN 1520 for a single frequency band k, a single direction $p_d$, and a single microphone array geometry a, pow( ) is the sum of squares of two adjacent values, $w_{SD}^H$ are existing beamformer coefficients corresponding to particular directions $p_d$ for each frequency band $\omega_k$ for the individual microphone array geometry a, $X(\omega_k)$ is an input FFT from multiple channels (e.g., concatenated multi-channel feature vector corresponding to the normalized multi-channel input audio data 1510), and b is a bias vector (e.g., [b=$b_1$ ... $b_{ADK}$] for each direction $p_d$, frequency band $\omega k$, and microphone array geometry a. Thus, the output of the power 1524 calculation is a feature vector (e.g., matrix having dimensions A*D*K×1) with each row indicating a power associated with an individual direction $p_d$, frequency band $\omega_k$, and microphone array geometry a. The beamforming weights and bias vectors may be determined and/or updated during training. Initializing the first layer with beamformer filter coefficients (e.g., beamformer weights) results in more efficient optimization in comparison to random initialization. The output of the power 1524 may be combined with the fully connected weights, which may mix different frequency components.

Using the output of the power 1524, the elastic spatial filtering DNN 1520 performs another affine transform 1526. In some examples, the affine transform 1526 may determine a combined power corresponding to several of the plurality of directions (e.g., group multiple neighboring directions together). Thus, beamformer selection errors can be alleviated by combining the weighted output of two or more directions. However, the disclosure is not limited thereto and the affine transform 1526 may only combine power values for the individual directions included in the plurality of directions without departing from the disclosure.

Additionally or alternatively, in some examples the affine transform 1526 may combine the weighted output of two or more of the microphone array geometries. For example, the affine transform 1526 may combine power values from two or more of the microphone array geometries to generate a single output for each frequency band and/or direction(s). To illustrate an example, the affine transform 1526 may use first weight values (e.g., first weighting) to generate a first combined power value for a first frequency band, second weight values (e.g., second weighting) to generate a second combined power value for a second frequency band, and so on. Individual weight values may vary between a value of zero and one, such that the weighting may correspond to equal weights for all of the microphone array geometries, equal weights for some of the microphone array geometries, unequal weights for all of the microphone array geometries, unequal weights for some of the microphone array geometries, selecting a single microphone array geometry (e.g., first weight value of 1 for the selected microphone array geometry, second weight value of 0 for the remaining microphone array geometries), and/or the like without departing from the disclosure.

As will be discussed in greater detail below, the output of the affine transform 1526 may correspond to a single direction (e.g., one set of combined power values that is associated with a single direction) or to multiple discrete directions (e.g., two or more sets of combined power values, each set associated with a single direction) without departing from the disclosure. To illustrate an example of the output corresponding to a single direction, the affine transform 1526 may generate output data that includes a first set of combined power values associated with a single direction, with each combined power value of the first set of combined power values corresponding to an individual frequency band for the selected direction. To illustrate an example of the output corresponding to multiple discrete directions, the affine transform 1526 may generate output data that includes two or more sets of combined power values, with each set of combined power values associated with one of the multiple discrete directions and each combined power value corresponding to an individual frequency band.

The output of the affine transform 1526 is input to the Relu 1528 calculation, which replaces negative numbers with a value of zero so that the output of the MG/MC DNN 1460 does not include any negative numbers.

A second architecture is illustrated in FIG. 15 by weight-tied spatial filtering DNN 1530. Similar to the elastic spatial filtering DNN 1520, the weight-tied spatial filtering DNN 1530 may receive the normalized-multi-channel input audio data 1510 in the frequency domain, perform multi-geometry block affine transforms 1532, and perform power 1534 calculations, as described in greater detail above. The weights of the multi-geometry block affine transforms 1532 are initialized with data corresponding to beamformer filter coefficients (e.g., beamformer weights) in the same manner as described above with regard to the multi-geometry block affine transforms 1522. For example, the weight-tied spatial filtering DNN 1530 may determine the output of the power 1534 calculation using the A*D*K blocks of frequency independent affine transforms represented in equation [8] above.

The weight-tied spatial filtering DNN 1530 may then process the power values using a convolutional neural network (CNN) component 1536. The CNN component 1536 is similar to the affine transform 1526 in that it combines power values generated by multiple beamformers. However, while the affine transform 1526 is easy to implement, it requires a number of independent parameters for each microphone array geometry and/or frequency band, increasing the complexity of the elastic spatial filtering DNN 1520. In contrast, the CNN component 1536 shares weights between different microphone array geometries, reducing a computational complexity (e.g., requiring only one value for each of the beamformer parameters instead of requiring 1*A values for each of the beamformer parameters). For example, the CNN 1536 may apply the weight tied over all the frequencies in order to combine the multiple beamformers, as described below:

$$\begin{bmatrix} Y_{1,1}(\omega_1) & \dots & Y_{1,D}(\omega_1) & \dots & Y_{1,d}(\omega_k) & \dots & Y_{1,D}(\omega_K) \\ Y_{2,1}(\omega_1) & \dots & Y_{2,D}(\omega_1) & \dots & Y_{2,d}(\omega_k) & \dots & Y_{2,D}(\omega_K) \\ \vdots & \ddots & \vdots & \ddots & \vdots & \ddots & \vdots \\ Y_{A,1}(\omega_1) & \dots & Y_{A,D}(\omega_1) & \dots & Y_{A,d}(\omega_k) & \dots & Y_{A,D}(\omega_K) \end{bmatrix} \quad [9]$$

where each element of the matrix in equation [9] is computed in the same manner as equation [8]. The spatial filtering layer output (e.g., power values output by the power 1534 calculations) is convoluted with 1 ×D filters with D width stride and one height stride. For example, a 1×D filter may be convoluted with entries associated with a first frequency band $\omega_1$ (e.g., $Y_{1,1}(\omega_1)$, $Y_{1,2}(\omega_1)$, ... $Y_{1,D}(\omega_1)$), with entries associated with a second frequency band $\omega_2$ (e.g., $Y_{1,1}((\omega_2)$, $Y_{1,2}(\omega_2)$, ... $Y_{1,D}(\omega_2)$), and so on until entries associated with a K-th frequency band $\omega_K$ (e.g., $Y_{1,1}(\omega_K)$, $Y_{1,2}(\omega_K)$, ... $Y_{1,D}(\omega_K)$). Similarly, the 1×D filter may be applied to each row in equation [9], such that the 1×D filter may be convoluted with entries associated with the first frequency band $\omega_1$ and a second microphone array geometry (e.g., $Y_{2,1}(\omega_1)$, $Y_{2,2}(\omega_1)$, ... $Y_{2,D}(\omega_1)$), with entries associated with the first frequency band $\omega_1$ and a third microphone array geometry (e.g., $Y_{3,1}(\omega_1)$, $Y_{3,2}(\omega_1)$, ... $Y_{3,D}(\omega_1)$), and so on until entries associated with the first frequency band $\omega_1$ and an A-th microphone array geometry (e.g., $Y_{A,1}(\omega_1)$, $Y_{A,2}(\omega_1)$, ... $Y_{A,D}(\omega_1)$). This two-dimensional (e.g., 2D) convolution process can avoid the permutation problem known in blind source separation, taking different directions at different frequency bands inconsistently.

In some examples, the CNN component 1536 may determine a combined power corresponding to several of the plurality of directions (e.g., group multiple neighboring directions together). However, the disclosure is not limited thereto and the CNN component 1526 may only combine power values for the individual directions included in the plurality of directions without departing from the disclosure.

Additionally or alternatively, in some examples the CNN component 1536 may combine the weighted output of two or more of the microphone array geometries. For example, the CNN component 1536 may combine power values from two or more of the microphone array geometries to generate a single output for each direction(s). To illustrate an example, the CNN component 1536 may use first weight values (e.g., first weighting) to generate a first combined power value for a first direction, second weight values (e.g., second weighting) to generate a second combined power value for a second direction, and so on. Individual weight values may vary between a value of zero and one, such that the weighting may correspond to equal weights for all of the microphone array geometries, equal weights for some of the microphone array geometries, unequal weights for all of the microphone array geometries, unequal weights for some of the microphone array geometries, selecting a single microphone array geometry (e.g., first weight value of 1 for the selected microphone array geometry, second weight value of 0 for the remaining microphone array geometries), and/or the like without departing from the disclosure. In contrast to the affine transform 1526, which may be configured with specific weight values for individual frequency bands, the CNN component 1536 shares the same weight values across all frequency bands (e.g., each of the microphone array geometries is associated with a single weight value that is constant across frequency bands).

As will be discussed in greater detail below, the output of the CNN component 1536 may correspond to a single direction (e.g., one set of combined power values that is associated with a single direction) or to multiple discrete directions (e.g., two or more sets of combined power values, each set associated with a single direction) without departing from the disclosure. To illustrate an example of the output corresponding to a single direction, the CNN component 1536 may generate output data that includes a first set of combined power values associated with a single direction, with each combined power value of the first set of combined power values corresponding to an individual frequency band for the selected direction. To illustrate an example of the output corresponding to multiple discrete directions, the CNN component 1536 may generate output data that includes two or more sets of combined power values, with each set of combined power values associated with one of the multiple discrete directions and each combined power value corresponding to an individual frequency band.

The weight-tied spatial filtering DNN 1530 may then process an output of the CNN component 1536 by performing a MaxPool 1538 calculation to generate the first feature vector. The MaxPool 1538 calculation performs a max-pooling operation meant to mimic beamformer selection based on a maximum power at each frequency band (e.g., frequency bin) between the different directions and/or the multiple microphone array geometries. Thus, the MaxPool 1538 may select the best output for individual frequency bands (e.g., selecting a highest power value for each individual frequency band), which may reduce the dimension of the first feature vector relative to the intermediate data generated by the CNN component 1536. However, the disclosure is not limited thereto and the MaxPool 1538 may vary without departing from the disclosure.

To reduce a processing power, reduce a bandwidth or power consumption, improve battery life, and/or other benefits, the MG/MC DNN 1460 may generate the first feature vector using fewer than the total number of microphones in the microphone array 114. For example, the MG/MC DNN 1460 may select two microphone input channels from a microphone array 114 comprising three or more microphones. Thus, while the microphone array 114 includes three or more microphones in a fixed configuration, this fixed configuration may correspond to multiple different two-microphone combinations.

As used herein, the fixed configuration of the microphone array 114 may be referred to as a microphone array configuration, which includes all microphones in the microphone array 114. In contrast, an individual combination of microphones within the microphone array 114 may be referred to as microphone array geometry or an estimated position of the microphones. For example, a first microphone array comprising only two microphones corresponds to only one microphone array geometry (e.g., an estimated position representing a line between the two microphones), whereas a second microphone array comprising three microphones corresponds to four microphone array geometries (e.g., three estimated positions representing lines between individual pairs of microphones and a fourth estimated position representing a triangle between all three microphones).

Figure 16:
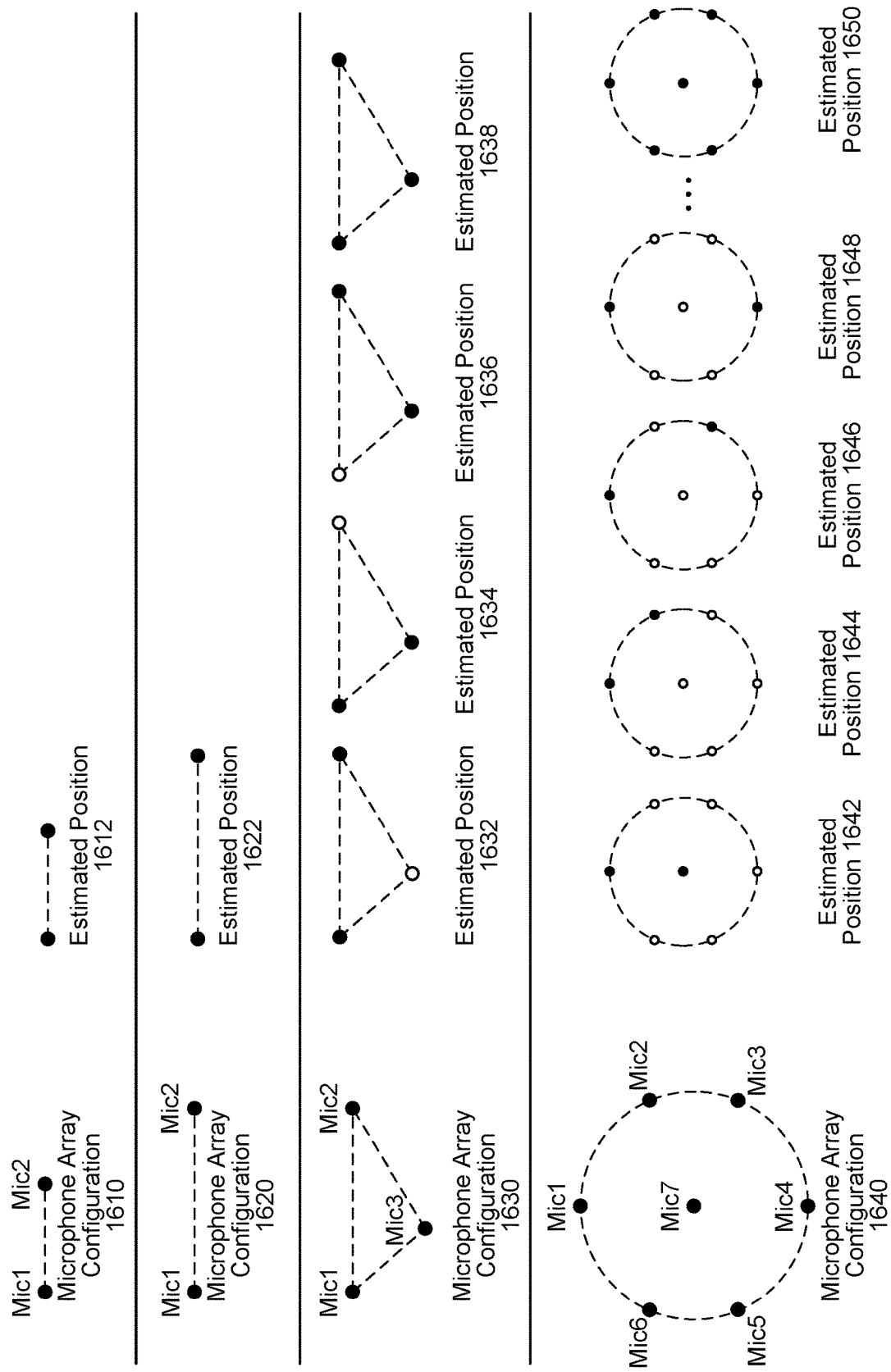
FIG. 16 illustrates examples of estimated positions corresponding to microphone array geometries according to embodiments of the present disclosure.

FIG. 16 illustrates examples of estimated positions corresponding to microphone array geometries according to embodiments of the present disclosure. As illustrated in FIG. 16, a first microphone array configuration 1610 corresponds to two microphones (e.g., Mic1 and Mic2) positioned a first distance apart. As there are only two microphones, the first microphone array configuration 1610 corresponds to estimated position 1612.

Similarly, a second microphone array configuration 1620 corresponds to two microphones (e.g., Mic1 and Mic2) positioned a second distance apart, the second distance being slightly farther than the first distance. As there are only two microphones, the second microphone array configuration 1620 corresponds to estimated position 1622. While the first estimated position 1612 and the second estimated position 1622 both correspond to microphone array geometries including two microphones, the system 100 must train the MG/MC DNN 1460 individually for each estimated position. For example, using beamformer coefficients or other parameters configured for the first estimated position 1612 will not process the input audio data correctly when applied to the second estimated position 1622 because the second distance is different from the first distance, changing a time of arrival associated with an individual direction and/or other parameters.

As illustrated in FIG. 16, a third microphone array configuration 1630 corresponds to three microphones (e.g., Mic1, Mic2, and Mic3) positioned in a triangle. While FIG. 16 illustrates the three microphones as a triangle, the disclosure is not limited thereto and the three microphones may be configured in a line without departing from the disclosure. As there are three microphones, the third microphone array configuration 1630 corresponds to estimated position 1632 (e.g., Mic1 and Mic2), estimated position 1634 (e.g., Mid 1 and Mic3), estimated position 1636 (e.g., Mic2 and Mic3), and estimated position 1638 (e.g., Mic1, Mic2, and Mic3). Thus, the MG/MC DNN 1460 may select any two microphones from the third microphone array configuration 1630, which corresponds to three different distances, or may select all three microphones without departing from the disclosure.

While not illustrated in FIG. 16, this concept applies to any number of microphones in a microphone array configuration, with an individual microphone array configuration corresponding to multiple microphone array geometries (e.g., estimated positions) based on sub-combinations of the microphones. For example, a microphone array configuration including four microphones may correspond to six 2-microphone microphone array geometries, four 3-microphone microphone array geometries, and one 4-microphone microphone array geometry, for a total of eleven potential microphone array geometries.

While the four microphones may correspond to eleven potential microphone array geometries based on unique sub-combinations of the four microphones, this represents a maximum number of microphone array geometries for the microphone array configuration. However, depending on the actual positioning of the microphones within the microphone array configuration, there may be fewer unique microphone array geometries as multiple microphone array geometries may share the same distance/shape. For example, while a 4-microphone configuration may have six potential 2-microphone microphone array geometries, if the four microphones are configured in a square with four equal length sides, there are only two unique 2-microphone microphone array geometries, as the four microphone pairs along the perimeter share a first distance and the two microphone pairs between opposing corners share a second distance.

FIG. 16 illustrates an example of this using a microphone array configuration 1640 that includes seven microphones. As illustrated in FIG. 16, the microphone array configuration 1640 includes six microphones equally spaced around a perimeter of a circle and a seventh microphone in a middle of the circle. While a 7-microphone configuration corresponds to up to 21 potential 2-microphone microphone array geometries, the microphone array configuration 1640 only corresponds to four unique 2-microphone microphone array geometries. For example, estimated position 1642 corresponds to a first distance associated with microphone pairs between the middle microphone and each of the perimeter microphones (e.g., Mic7 and Mic1, Mic7 and Mic2, etc.), estimated position 1644 corresponds to a second distance associated with neighboring microphone pairs along the perimeter of the circle (e.g., Mic1 and Mic2, Mic2 and Mic3, etc.), estimated position 1646 corresponds to a third distance associated with separated microphone pairs along the perimeter of the circle (e.g., Mic1 and Mic3, Mic2 and Mic4, etc.), and estimated position 1648 corresponds to a fourth distance associated with opposite microphone pairs along the perimeter of the circle (e.g., Mic1 and Mic4, Mic2 and Mic5, etc.). While not illustrated in FIG. 16, the microphone array configuration 1640 includes a number of additional microphone array geometries corresponding to 3-microphone combinations, 4-microphone combinations, 5-microphone combinations, 6-microphone combinations, and finally a 7-microphone combination represented as estimated position 1650.

Figure 17C:
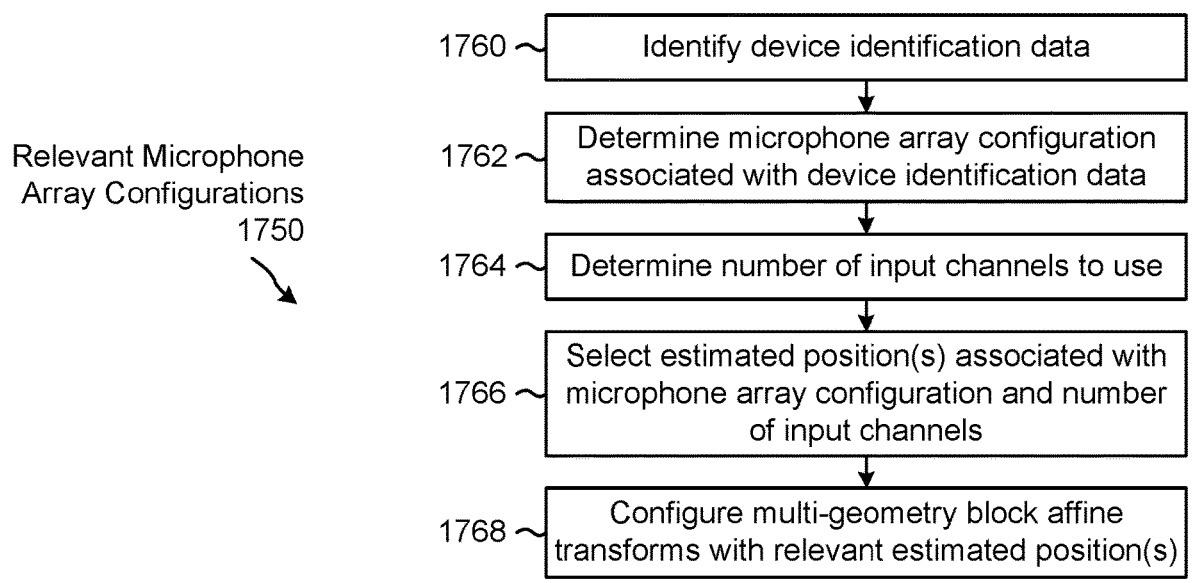

FIGS. 17A-17C illustrate examples of processing input audio data using all potential estimated positions or selecting a reduced number relevant estimated positions according to embodiments of the present disclosure. As illustrated in FIG. 17A, in some examples the system 100 may configure the MG/MC DNN 1460 to process multi-channel input audio data using all potential microphone array configurations 1710. For example, FIG. 17A illustrates that the multi-geometry block affine transforms 1532 are configured to perform a block affine transform for all potential estimated positions 1712 associated with all potential microphone array configurations 1710.

As illustrated in FIG. 17A, the system 100 may determine (1720) estimated position(s) associated with all potential microphone array configurations and may configure (1722) the multi-geometry block affine transforms with all of the estimated position(s) determined in step 1720. For example, FIG. 17A illustrates that all potential microphone array configurations 1710 include two 2-microphone configurations, a 3-microphone configuration, and a 7-microphone configuration. In addition, all potential estimated positions 1712 include two estimated positions associated with the two 2-microphone configurations, four estimated positions associated with the 3-microphone configuration, and four estimated positions associated with the 7-microphone configuration, although the disclosure is not limited thereto.

As illustrated in FIG. 17B, in other examples the system 100 may configure the MG/MC DNN 1460 to process multi-channel input audio data using relevant potential microphone array configurations 1730 based on device identification data. For example, FIG. 17B illustrates that the multi-geometry block affine transforms 1532 are configured to perform a block affine transform for relevant estimated positions 1732 associated with the relevant microphone array configurations 1730.

As illustrated in FIG. 17B, the system 100 may identify (1740) device identification data associated with the device (e.g., embedded in the input audio data or the like), may determine (1742) a microphone array configuration associated with the device identification data, may select (1744) estimated position(s) associated with the microphone array configuration and may configure (1746) the multi-geometry block affine transforms with the estimated position(s) determined in step 1744. For example, FIG. 17B illustrates that the relevant microphone array configurations 1730 corresponds only to the 3-microphone configuration and therefore that the relevant estimated positions 1732 only include the four estimated positions associated with the 3-microphone configuration, although the disclosure is not limited thereto.

As illustrated in FIG. 17C, in some examples the system 100 may configure the MG/MC DNN 1460 to process multi-channel input audio data using relevant potential microphone array configurations 1750 and a reduced number of input channels. For example, FIG. 17C illustrates that the multi-geometry block affine transforms 1532 are configured to perform a block affine transform for relevant estimated positions 1732 that are associated with the relevant microphone array configurations 1750 and the desired number of input channels.

As illustrated in FIG. 17C, the system 100 may identify (1760) device identification data associated with the device (e.g., embedded in the input audio data or the like), may determine (1762) a microphone array configuration associated with the device identification data, may determine (1764) a number of input channels to use (e.g., a value between 2 and M, where M is a maximum number of input channels associated with the microphone array configuration), may select (1766) estimated position(s) associated with the microphone array configuration and the number of input channels, and may configure (1768) the multi-geometry block affine transforms with the relevant estimated position(s) determined in step 1768. For example, FIG. 17C illustrates that the relevant microphone array configurations 1750 corresponds only to the 7-microphone configuration and that the number of input channels is two. Therefore, the relevant estimated positions 1752 only include the four estimated positions associated with two input channels using the 7-microphone configuration. However, the disclosure is not limited thereto and the system 100 may select any number of input channels without departing from the disclosure.

FIGS. 18A-18D illustrate examples of data generated by different components within the front-end DNN according to embodiments of the present disclosure. As illustrated in FIG. 18A, an input stage 1810 of the front-end DNN (e.g., input processing component 1452) may receive raw input audio data 1812 corresponding to multiple microphones, may generate normalized input audio data 1814 corresponding to the multiple microphones, and may combine the normalized input audio data 1814 to generate normalized multi-channel input audio data 1816.

As illustrated in FIG. 18A, the raw input audio data 1812 may correspond to M input channels in a time domain, where M is the number of microphones included in the microphone array 114 (e.g., microphone array configuration of the device 110). The input processing component 1452 may convert the raw input audio data 1812 to a frequency domain and apply normalization to generate the normalized input audio data 1814. As illustrated in FIG. 18A, the normalized input audio data 1814 corresponds to M separate matrices having dimensions of K×1, where K is a number of uniform frequency bands (e.g., FFT size). The input processing component 1452 may generate a column vector by concatenating the M separate matrices. For example, the normalized multi-channel input audio data 1816 is represented as a matrix having dimensions (M*K)×1 (e.g., column vector with a number of rows equal to the product of the number of microphones M and the number of frequency bands K).

As illustrated in FIG. 18B, a multi-geometry stage 1820 (e.g., MG/MC DNN 1460) may receive the normalized multi-channel input audio data 1816 and may perform spatial filtering to generate directional data associated with a plurality of microphone array geometries. For example, the elastic spatial filtering (ESF) DNN 1520 may perform spatial filtering to generate ESF data 1822, whereas the weight-tied spatial filtering (WTSF) DNN 1530 may perform spatial filtering to generate WTSF data 1824. In some examples, the ESF data 1822 and the WTSF data 1824 are generated internally within the multi-geometry stage 1820 and are not output, in contrast to the MG/MC DNN Output Data 1832 described below with regard to FIG. 18C.

As illustrated in FIG. 18B, the normalized multi-channel input audio data 1816 may correspond to a matrix having dimensions (M*K)×1, where M is the number of microphones and K is the number of uniform frequency bands as described above. Thus, the normalized multi-channel input audio data 1816 corresponds to two or more input channels associated with two or more microphones in the microphone array 114, converted to the frequency domain, normalized, and concatenated into a column vector as described above.

In some examples, the ESF data 1822 may be represented as a matrix having dimensions (A*D*K)×1, where A is the number of microphone arrays (e.g., microphone array geometries or estimated positions, which corresponds to a number of different block affine transforms applied to the normalized multi-channel input audio data 1816), D is the number of directions (e.g., plurality of directions, such as 12 different directions), and K is the number of uniform frequency bands. Thus, the ESF data 1822 is represented as a column vector with an individual entry for each of the microphone array geometries, directions, and frequency bands.

In some examples, the WTSF data 1824 may also be represented as a matrix having dimensions (A*D*K)×1, similar to the ESF data 1822. However, the disclosure is not limited thereto and the WTSF data 1824 may be represented as a matrix having dimensions A×(D*K). Thus, the WTSF data 1824 may include a row for each microphone array geometry and a column for each direction and frequency band. As described above with regard to FIG. 15 and equation [9], the WTSF DNN 1530 may perform a two-dimensional convolution process between the WTSF data 1824 and a 1×D filters.

As illustrated in FIG. 18C, a multi-geometry multi-channel DNN output stage 1830 (e.g., MG/MC DNN 1460) may receive the normalized multi-channel input audio data 1816 and may perform spatial filtering to generate MG/MC DNN output data 1832. Depending on how much information the system 100 wants to output, the MG/MC DNN output data 1832 may correspond to matrices of drastically different dimensions without departing from the disclosure.

In some examples, the MG/MC DNN output data 1832 may correspond to single direction output data 1832a associated with a desired direction. For example, when there is a single source of audible sound (e.g., a person speaking, a loudspeaker generating audible sound, a mechanical source of audible sound, etc.), the MG/MC DNN 1460 may generate the single direction output data 1832a to include a single value for each frequency band k, resulting in a matrix having dimensions K×1. This corresponds to a column vector associated with the desired direction, with individual entries represented as $Y_{sa,sd}(\omega_k)$, where sa represents a selected microphone array geometry, sd represents a selected direction, and $\omega_k$ indicates an individual frequency band.

While the MG/MC DNN 1460 may generate the single direction output data 1832a by selecting a single direction and a single microphone array geometry, the disclosure is not limited thereto and in some examples the MG/MC DNN 1460 may generate the single direction output data 1832a by combining multiple directions and/or microphone array geometries to generate a single value for each frequency band k. Thus, the first feature vector may correspond to a single direction (e.g., one direction or a combination of two or more directions) and a single microphone array geometry, a single direction and a combination of microphone array geometries (e.g., highest energy in the direction from amongst all of the microphone array geometries), and/or the like.

In some examples, the MG/MC DNN output data 1832 may correspond to multiple direction output data 1832b associated with two or more desired directions. For example, when two or more sources of audible noise are present (e.g., a first person is speaking at the same time that a second person is speaking, a loudspeaker is generating audible sound, mechanical sources of audible sound are present, etc.), the MG/MC DNN 1460 may generate the multiple direction output data 1832b to include a value for each frequency band k for each of the desired directions.

FIG. 18C illustrates an example of two directions, represented as a matrix having dimensions K×2, with individual entries represented as $Y_{sa1,sd1}(\omega_k)$ or $Y_{sa2,sd2}(\omega_k)$, where sa1 represents a first selected microphone array geometry, sd1 represents a first selected direction, sa2 represents a second selected microphone array geometry, sd2 represents a second selected direction, and $\omega_k$ indicates an individual frequency band. While FIG. 18C illustrates the matrix having dimensions K×2, the multiple direction output data 1832b may instead be represented as two column vectors, a first column vector associated with the first direction and a second column vector associated with the second direction.

While the MG/MC DNN 1460 may generate a column vector for each direction in the multiple direction output data 1832b by selecting a single direction and a single microphone array geometry, the disclosure is not limited thereto and in some examples the MG/MC DNN 1460 may generate the multiple direction output data 1832b by combining multiple directions and/or microphone array geometries to generate a single value for each frequency band k for the desired directions without departing from the disclosure.

Additionally or alternatively, while FIG. 18C refers to a selected microphone array geometry, this does not indicate that a single microphone array geometry is selected for every frequency band. Instead, for individual frequency bands, the MG/MC DNN 1460 may generate and/or select a single output from amongst the multiple microphone array geometries. For example, a first frequency band may correspond to a first microphone array geometry and a second frequency band may correspond to a second microphone array geometry without departing from the disclosure. Thus, reference to a first selected microphone array geometry and a second selected microphone array geometry may not refer to two discrete microphone array geometries, but may instead refer to two discrete sets of output data comprising a combination of microphone array geometries. For example, the first set of output data (e.g., first column) may comprise outputs generated and/or selected from multiple microphone array geometries associated with a first direction, while the second set of output data (e.g., second column) may comprise outputs generated and/or selected from the multiple microphone array geometries associated with a second direction.

In some examples, the MG/MC DNN output data 1832 may correspond to single-array output data 1832c representing multiple directions associated with a single microphone array geometry. For example, the MG/MC DNN 1460 may select a first microphone array geometry having the best output of the plurality of microphone array geometries. However, the disclosure is not limited thereto and instead of selecting a single microphone array geometry the MG/MC DNN 1460 may combine outputs from multiple microphone array geometries to generate a single value for each frequency band k and each direction. FIG. 18C illustrates the single-array output data 1832c as a matrix having dimensions K×D, with a column vector for each direction. Thus, individual entries are represented as $Y_{sa,d}(\omega_k)$, where sa represents a first selected microphone array geometry, d represents a direction (e.g., [d=1 . . . D]), and $\omega_k$ indicates an individual frequency band.

In some examples, the MG/MC DNN output data 1832 may correspond to multiple-array output data 1832d representing multiple directions associated with multiple microphone array geometries. For example, the MG/MC DNN 1460 may output a plurality of microphone array geometries, such as selecting two or more microphone array geometries having the most energy, generating two or more microphone array outputs by combining multiple microphone array geometries, outputting all microphone array geometries generated by the multi-geometry block affine transforms 1522, and/or the like. FIG. 18C illustrates the multiple-array output data 1832d as a matrix having dimensions A×(D*K), with a row vector for each microphone array geometry, although the disclosure is not limited thereto. Thus, individual entries are represented as $Y_{a,d}(\omega_k)$, where a represents a microphone array geometry (e.g., [a=1 . . . A]), d represents a direction (e.g., [d=1 . . . D]), and $\omega_k$ indicates an individual frequency band.

Figure 18D:
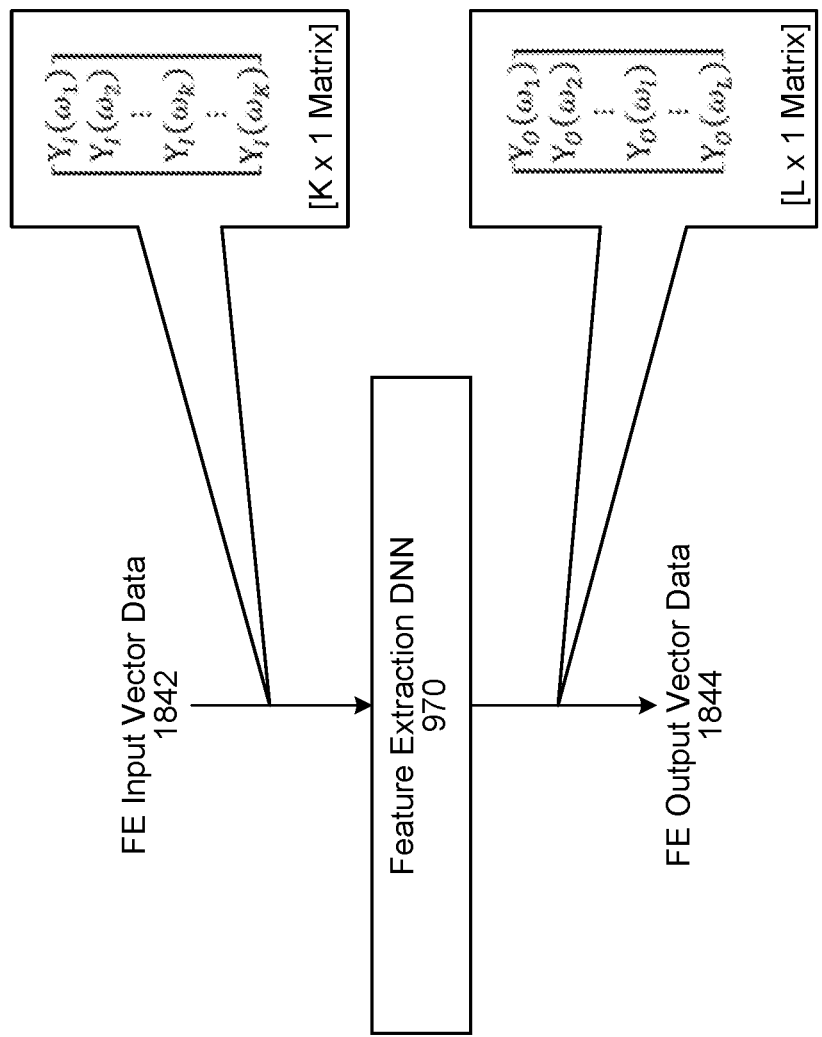

In some examples, the MG/MC DNN 1460 may output the MG/MC DNN output data 1832 described above to the feature extraction DNN 970. For example, the MG/MC DNN 1460 may send the single direction output data 1832a to the feature extraction DNN 970 for feature extraction. As illustrated in FIG. 18D, a FE DNN stage 1840 may include a feature extraction DNN 970 that receives FE input vector data 1842 (e.g., MG/MC DNN output data 1832 generated by the MG/MC DNN 1460) and generates FE output vector data 1844. For example, the FE input vector data 1842 is represented as a matrix having dimensions of K×1, where K is a number of uniform frequency bands, which corresponds to a column vector having a row for each uniform frequency band k (e.g., [k=1 . . . K]). In contrast, the FE output vector data 1844 is represented as a matrix having dimensions of L×1, where L is a number of Mel-scale frequency bands, which corresponds to a column vector having a row for each Mel-scale frequency band l (e.g., [l=1 . . . L]). For example, the feature extraction DNN 970 combines multiple uniform frequency bands k to generate the Mel-scale frequency bands l.

While the example above illustrates the MG/MC DNN 1460 sending the single direction output data 1832a to the feature extraction DNN 970, the disclosure is not limited thereto. In some examples, the MG/MC DNN 1460 may send the multiple direction output data 1832b, the single-array output data 1832c, and/or the multiple-array output data 1832d to the feature extraction DNN 970 without departing from the disclosure. In some examples, the MG/MC DNN 1460 may separate the MG/MC DNN output data 1832 into individual column vectors prior to sending to the feature extraction DNN 970. However, the disclosure is not limited thereto and in other examples the feature extraction DNN 970 may be configured to process each combination of direction and microphone array geometry individually if the MG/MC DNN output data 1832 includes multiple directions and/or multiple microphone array geometries.

In some examples, the MG/MC DNN 1460 may not send MG/MC DNN output data 1832 that includes multiple directions and/or multiple microphone array geometries to the feature extraction DNN 970. Instead, the MG/MC DNN 1460 may be split between the device 110 and the server(s) 120 such that a first MG/MC DNN 1460a on the device 110 outputs the MG/MC DNN output data 1832 described above to a second MG/MC DNN 1460a on the server(s) 120.

Figure 19:
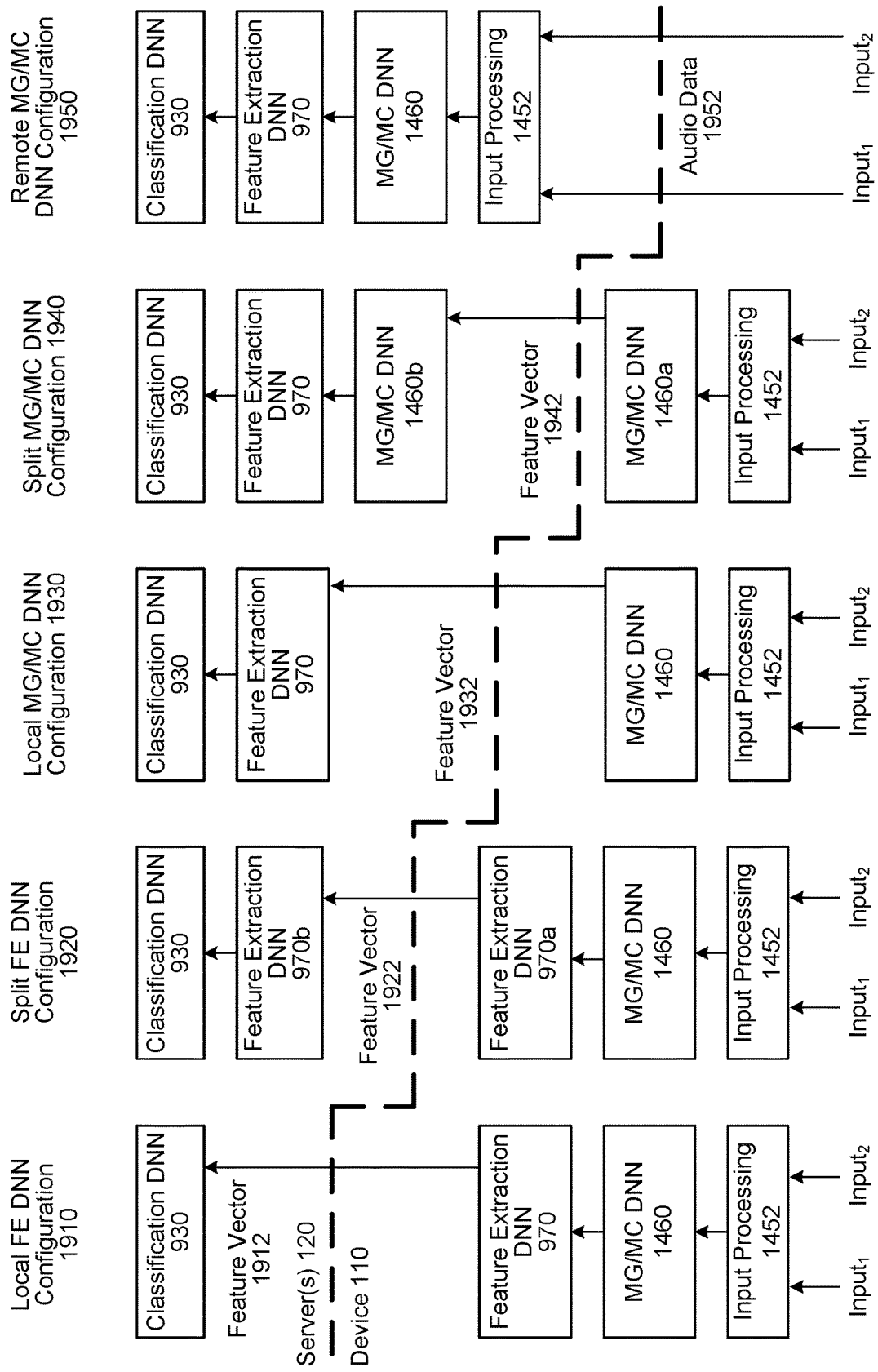
FIG. 19 illustrates examples of splitting a front-end DNN between a local device and a remote system using multiple geometries according to embodiments of the present disclosure.

FIG. 19 illustrates examples of splitting a front-end DNN between a local device and a remote system using multiple configurations according to embodiments of the present disclosure. As illustrated in FIG. 19, a local FE DNN configuration 1910 corresponds to the device 110 including the input processing component 1452, the MG/MC DNN 1460, and the feature extraction DNN 970. Thus, the feature extraction DNN 970 generates a feature vector 1912 and the device 110 uploads the feature vector 1912 to the server(s) 120 to be processed by the server(s) 120 using a classification DNN 930.

In a split FE DNN configuration 1920, the device 110 includes the input processing component 1452, the MG/MC DNN 1460, and a first feature extraction DNN 970a. Thus, the first feature extraction DNN 970a generates a feature vector 1922 and the device 110 uploads the feature vector 1922 to the server(s) 120. The server(s) 120 process the feature vector 1922 using a second feature extraction DNN 970b and the classification DNN 930.

In a local MG/MC DNN configuration 1930, the device 110 includes the input processing component 1452 and the MG/MC DNN 1460. Thus, the MG/MC DNN 1460 generates a feature vector 1932 and the device 110 uploads the feature vector 1932 to the server(s) 120. The server(s) 120 process the feature vector 1932 using the feature extraction DNN 970 and the classification DNN 930.

In a split MG/MC DNN configuration 1940, the device 110 includes the input processing component 1452 and a first MG/MC DNN 1460a. Thus, the first MG/MC DNN 1460a generates a feature vector 1942 and the device 110 uploads the feature vector 1942 to the server(s) 120. The server(s) 120 process the feature vector 1942 using a second MG/MC DNN 1460b, the feature extraction DNN 970, and the classification DNN 930.

In a remote MG/MC DNN configuration 1950, the device 110 uploads audio data 1952 to the server(s) 120 and the server(s) 120 process the audio data 1952 using the input processing component 1452, the MG/MC DNN 1460, the feature extraction DNN 970, and the classification DNN 930.

Figure 20B:
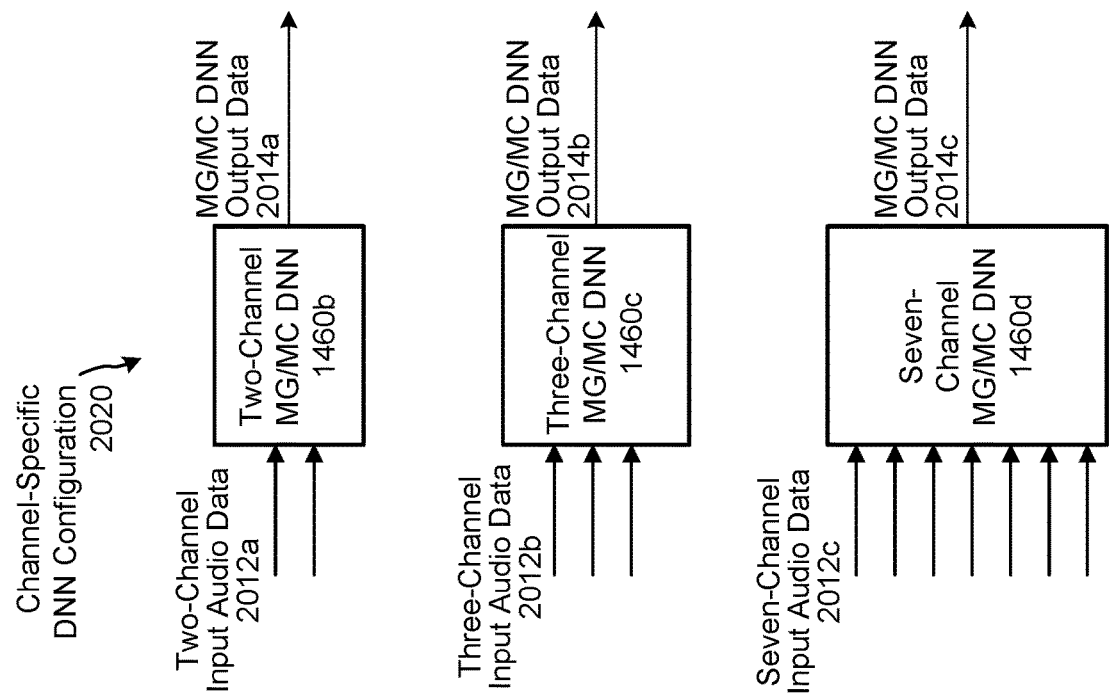
FIGS. 20A-20D illustrate examples of processing input audio data with a varying number of input channels according to embodiments of the present disclosure.
Figure 20A:
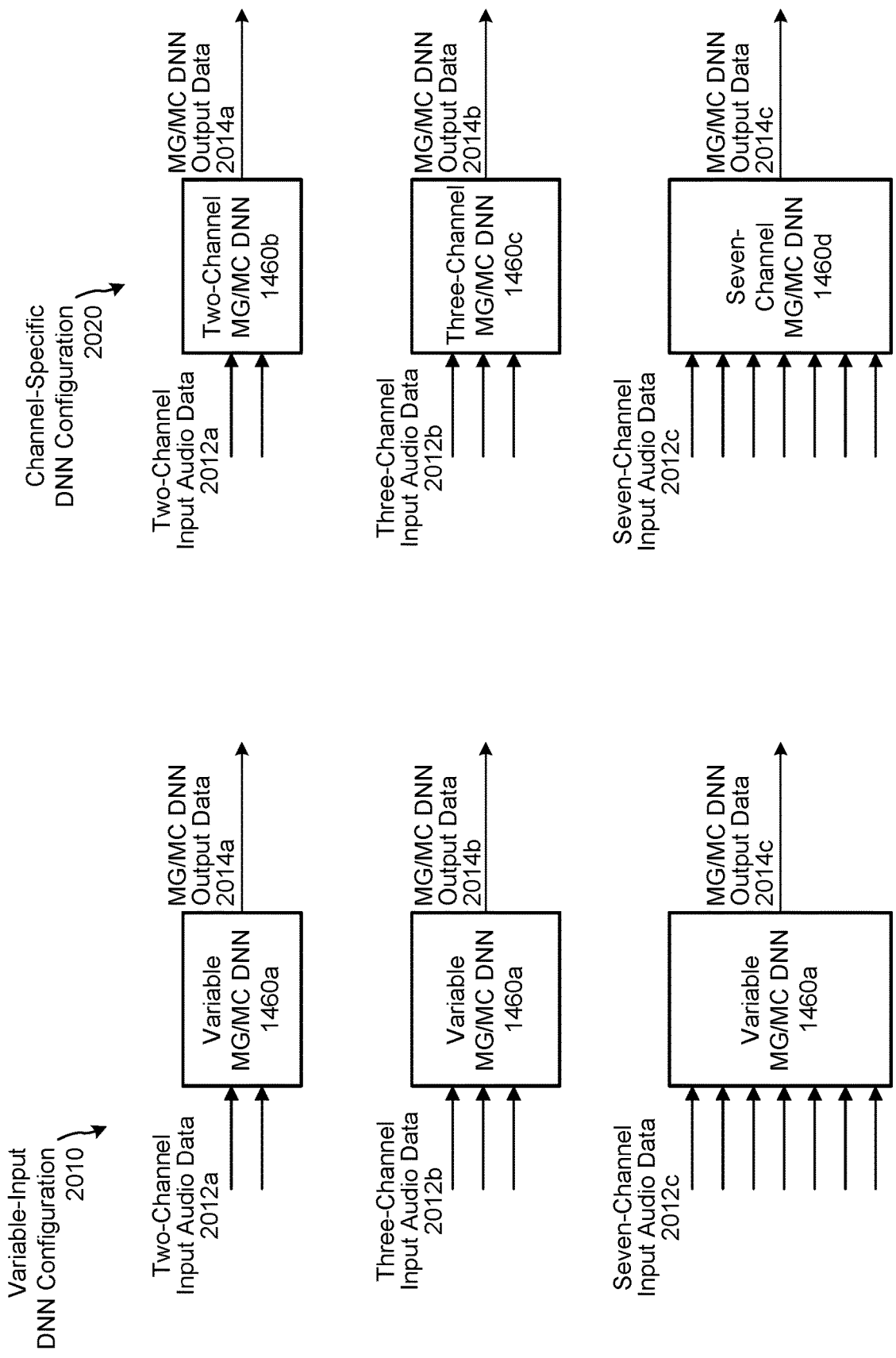

FIGS. 20A-20D illustrate examples of processing audio data with a varying number of input channels according to embodiments of the present disclosure. As illustrated in FIG. 20A, a variable-input DNN configuration 2010 includes a single variable MG/MC DNN 1460a that is configured to process any number of input channels to generate MG/MC DNN output data. For example, FIG. 20A illustrates that the variable MG/MC DNN 1460a may process two-channel input audio data 2012a to generate first MG/MC DNN output data 2014a, may process three-channel input audio data 2012b to generate second MG/MC DNN output data 2014b, and may process seven-channel input audio data 2012c to generate third MG/MC DNN output data 2014c.

While FIG. 20A illustrates a single variable MG/MC DNN 1460a that is configured to process a varying number of input channels, the disclosure is not limited thereto.

Instead, FIG. 20B illustrates a channel-specific DNN configuration 2020 that includes multiple MG/MC DNNs, with each MG/MC DNN configured to process a fixed number of input channels to generate MG/MC DNN output data. For example, FIG. 20B illustrates that a two-channel MG/MC DNN 1460b may process the two-channel input audio data 2012a to generate the first MG/MC DNN output data 2014a, that a three-channel MG/MC DNN 1460c may process the three-channel input audio data 2012b to generate the second MG/MC DNN output data 2014b, and that a seven-channel MG/MC DNN 1460d may process the seven-channel input audio data 2012c to generate the third MG/MC DNN output data 2014c. Thus, as illustrated in FIG. 20B, the MG/MC DNN 1460 may include two or more distinct DNNs that are specifically trained to process a fixed number of input channels without departing from the disclosure.

Figure 20D:
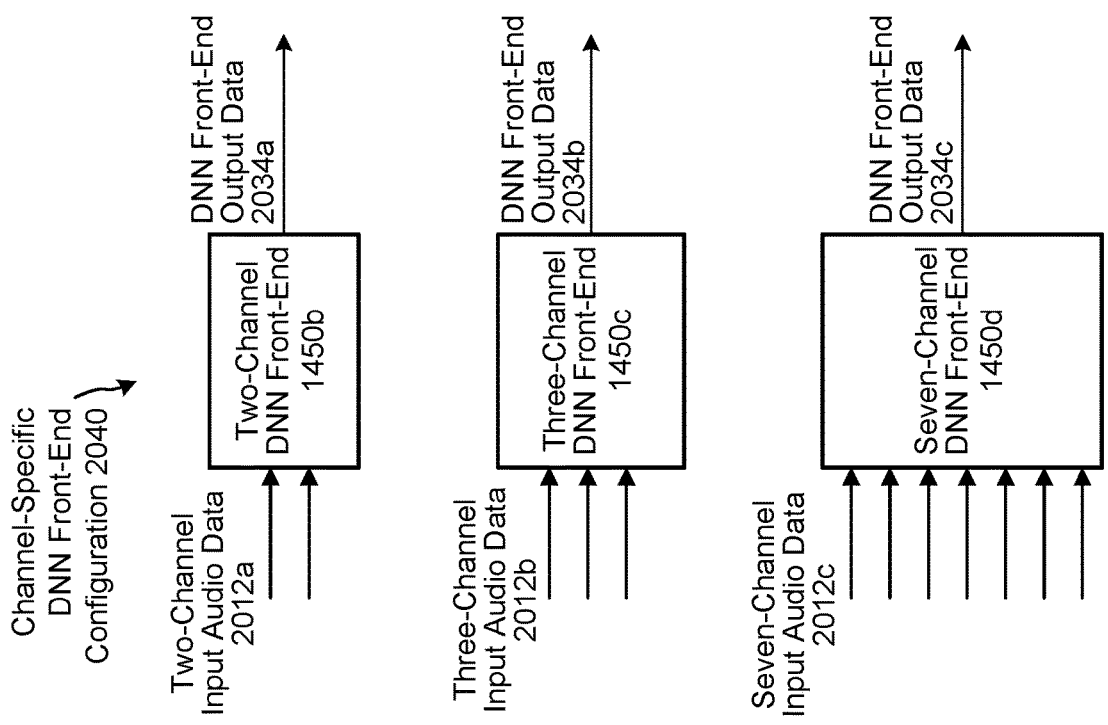
Figure 20C:
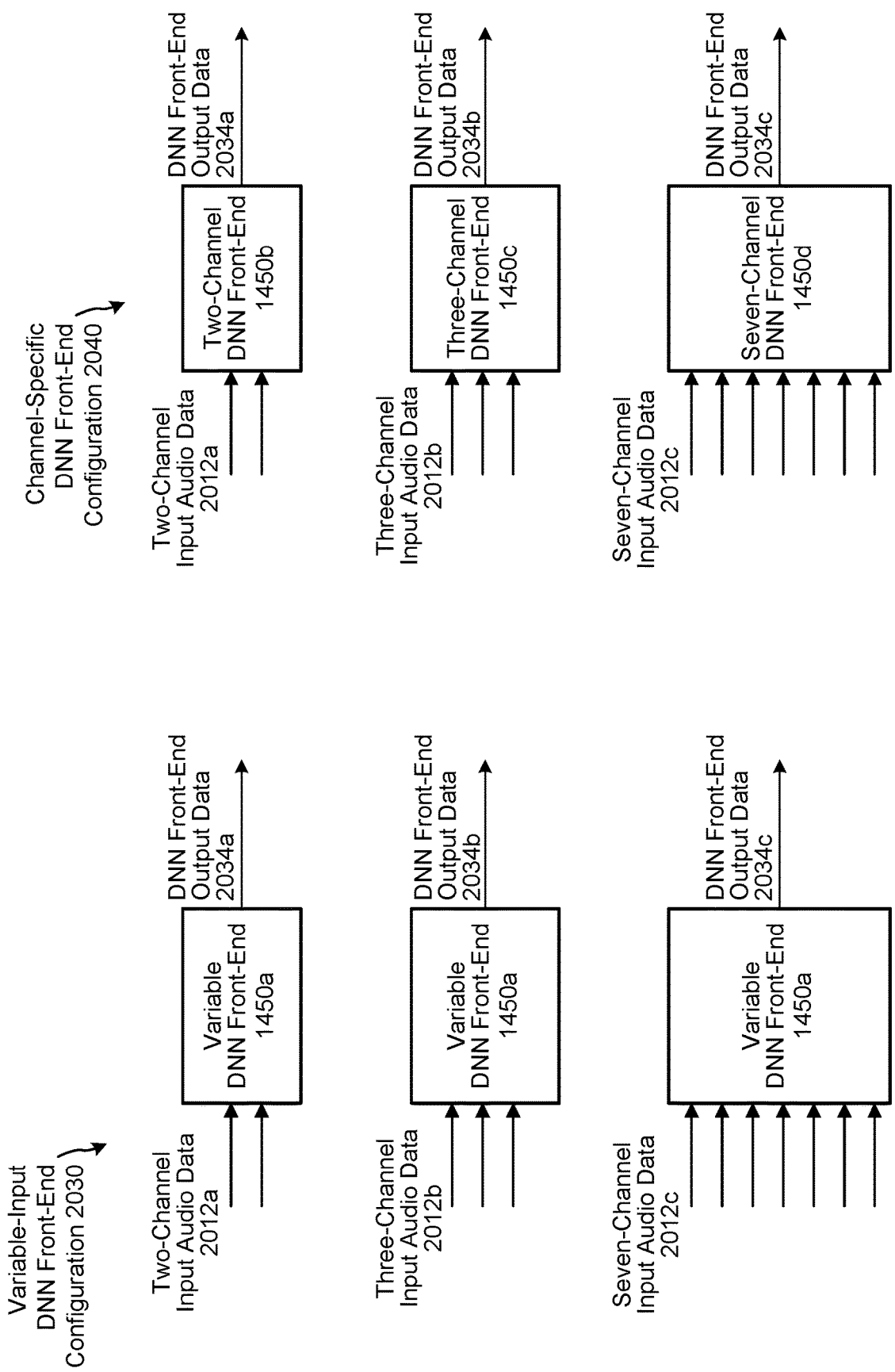

Additionally or alternatively, the DNN front-end 1450 may also be configured to process a varying number of input channels or a fixed number of input channels, as illustrated in FIGS. 20C-20D. Thus, the device 110 may include two or more DNN front-end 1450 without departing from the disclosure.

As illustrated in FIG. 20C, a variable-input DNN front-end configuration 2030 includes a single variable DNN front-end 1450a that is configured to process any number of input channels to generate DNN front-end output data. For example, FIG. 20C illustrates that the variable DNN front-end 1450a may process two-channel input audio data 2012a to generate first DNN front-end output data 2034a, may process three-channel input audio data 2012b to generate second DNN front-end output data 2034b, and may process seven-channel input audio data 2012c to generate third DNN front-end output data 2034c.

While FIG. 20C illustrates a single variable DNN front-end 1450a that is configured to process a varying number of input channels, the disclosure is not limited thereto. Instead, FIG. 20D illustrates a channel-specific DNN front-end configuration 2040 that includes multiple DNN front-ends, with each DNN front-end configured to process a fixed number of input channels to generate DNN front-end output data. For example, FIG. 20D illustrates that a two-channel DNN front-end 1450b may process the two-channel input audio data 2012a to generate the first DNN front-end output data 2034a, that a three-channel DNN front-end 1450c may process the three-channel input audio data 2012b to generate the second DNN front-end output data 2034b, and that a seven-channel DNN front-end 1450d may process the seven-channel input audio data 2012c to generate the third DNN front-end output data 2034c. Thus, as illustrated in FIG. 20D, the DNN front-end 1450 may include two or more distinct DNNs that are specifically trained to process a fixed number of input channels without departing from the disclosure.

Figure 21A:
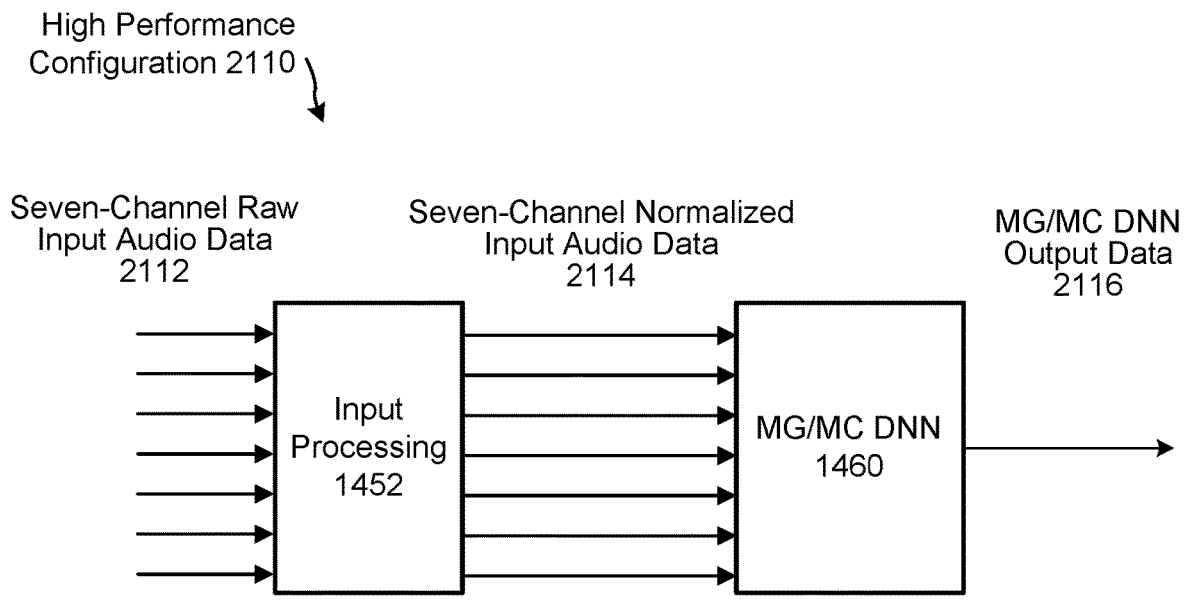
FIGS. 21A-21D illustrate examples of varying a number of input channels according to embodiments of the present disclosure.

FIGS. 21A-21D illustrate examples of varying a number of input channels according to embodiments of the present disclosure. As illustrated in FIG. 21A, in a high performance configuration 2110 the system 100 may be configured to process every available input channel to improve performance. For example, the input processing component 1452 may receive seven-channel raw input audio data 2112 and may generate seven-channel normalized input audio data 2114. The input processing component 1452 may send the seven-channel normalized input audio data 2114 to the MG/MC DNN 1460 and the MG/MC DNN 1460 may process the seven-channel normalized input audio data 2114 to generate MG/MC DNN output data 2116. For example, the MG/MC DNN 1460 may process the seven-channel normalized input audio data 2114 using a plurality of estimated position(s) corresponding to each sub-combination of input channels.

Figure 21B:
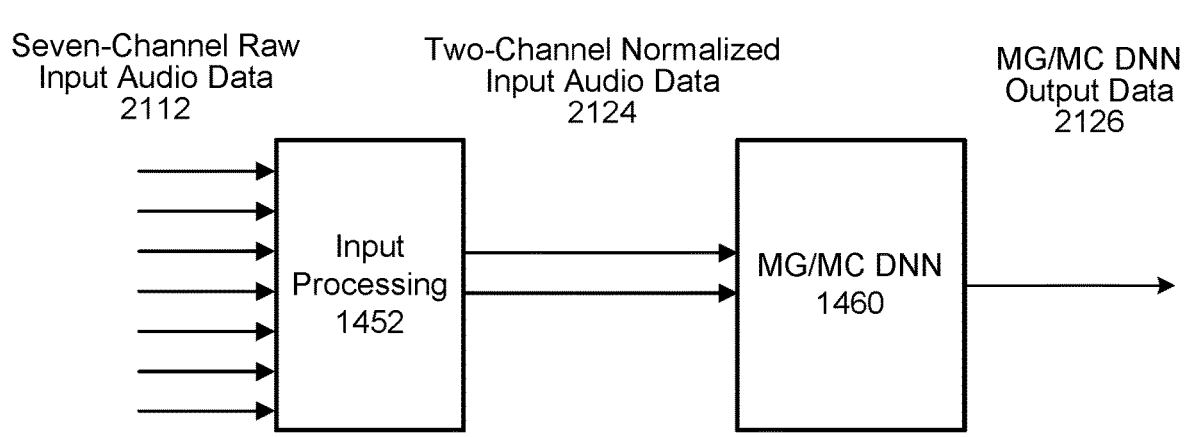

While FIG. 21A illustrates the high performance configuration 2110 processing every available input channel, the disclosure is not limited thereto and the system 100 may limit the number of input channels without departing from the disclosure. As illustrated in FIG. 21B, in a reduced consumption configuration 2120 the system 100 may be configured to process only a portion of the available input channels to reduce a processing, bandwidth, and/or power consumption of the device 110. For example, the input processing component 1452 may receive the seven-channel raw input audio data 2112 but may only generate two-channel normalized input audio data 2124. The input processing component 1452 may send the two-channel normalized input audio data 2124 to the MG/MC DNN 1460 and the MG/MC DNN 1460 may process the two-channel normalized input audio data 2124 to generate MG/MC DNN output data 2126. For example, the MG/MC DNN 1460 may process the two-channel normalized input audio data 2124 using a plurality of estimated position(s) corresponding to two microphones. To illustrate an example, the 7-microphone microphone array configuration 1640 illustrated in FIG. 16 corresponds to four unique estimated positions (e.g., each microphone pair corresponds to one of four different distances).

While FIG. 21B illustrates the input processing component 1452 selecting the number of input channels, the disclosure is not limited thereto. In some examples, the input processing component 1452 may send the seven-channel normalized input audio data 2114 to the MG/MC DNN 1460 and the MG/MC DNN 1460 may only select two input channels with which to generate the MG/MC DNN output data 2126.

Additionally or alternatively, while FIG. 21B illustrates the system 100 selecting only two input channels, the disclosure is not limited thereto. Instead, the reduced consumption configuration 2120 may correspond to any number of input channels that selects fewer than a number of available input channels. For example, the reduced consumption configuration for a three-channel microphone array configuration may correspond to two input channels, the reduced consumption configuration for a four-channel microphone array configuration may correspond to 2-3 input channels, the reduced consumption configuration for a five-channel microphone array configuration may correspond to 2-4 input channels, and so on.

In some examples, the system 100 may modify a number of input channels based on a capability of a DNN (e.g., channel-specific MG/MC DNN 1460 and/or channel-specific DNN front-end 1450). For example, the system 100 may discard an input channel and/or add an additional input channel based on the requirements of a channel-specific DNN.

Figure 21C:
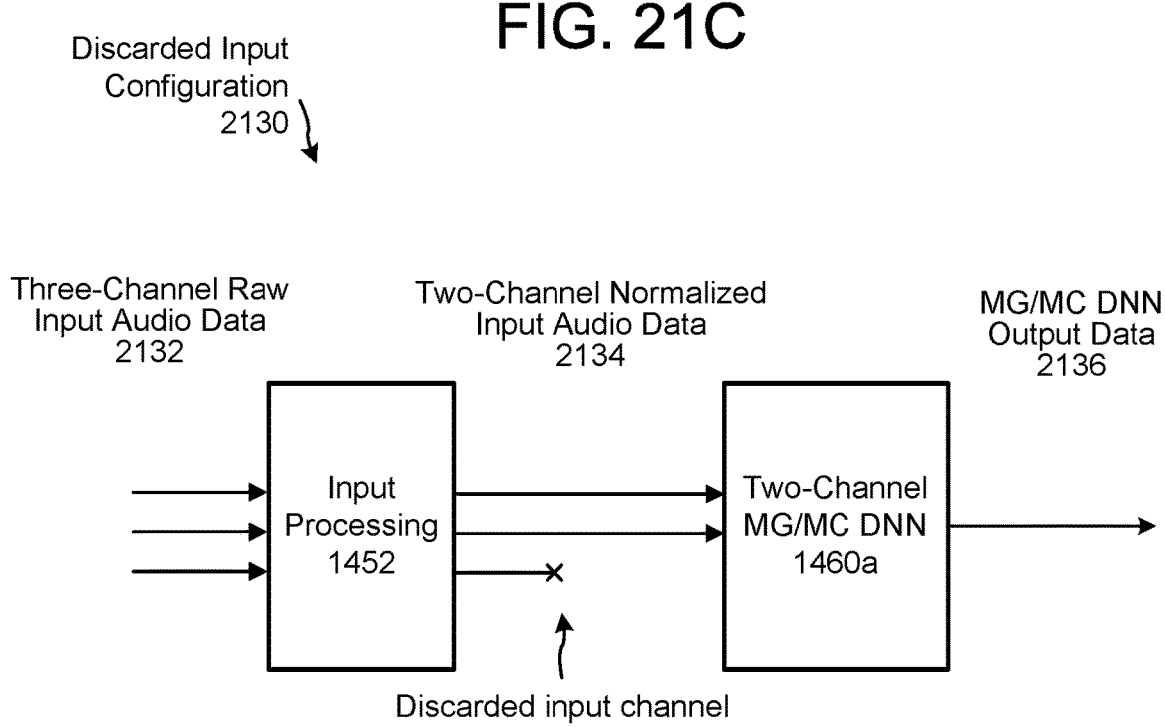

FIG. 21C illustrates a discarded input configuration 2130 that corresponds to the input processing component 1452 receiving three-channel raw input audio data 2132 but discarding an input channel to generate two-channel normalized input audio data 2134. Thus, the input processing component 1452 reduces the number of input channels from three to two, enabling a two-channel MG/MC DNN 1460a to generate MG/MC DNN output data 2136. The input processing component 1452 may discard an input channel using any technique known to one of skill in the art, including ignoring data associated with a single input channel, combining two input channels (e.g., replacing two input channels with a weighted sum), and/or the like without departing from the disclosure.

Figure 21D:
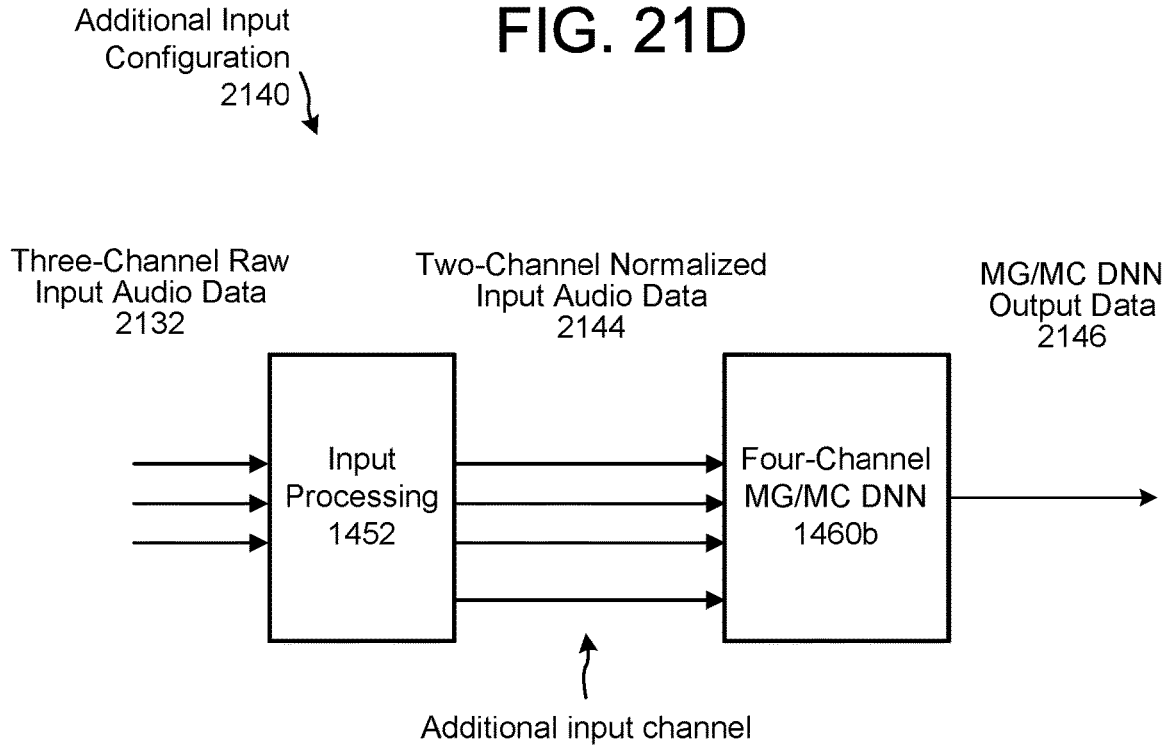

Similarly, FIG. 21D illustrates an additional input configuration 2140 that corresponds to the input processing component 1452 receiving the three-channel raw input audio data 2132 but adding an additional input channel to generate four-channel normalized input audio data 2144. Thus, the input processing component 1452 increases the number of input channels from three to four, enabling a four-channel MG/MC DNN 1460b to generate MG/MC DNN output data 2146. The input processing component 1452 may add an additional input channel using any technique known to one of skill in the art, including duplicating an input channel, generating a weighted sum of the input channels, adding a blank input channel (e.g., value of zero), and/or the like without departing from the disclosure.

While FIGS. 21C-21D illustrate examples of receiving three input channels, the disclosure is not limited thereto and the number of input channels may vary without departing from the disclosure.

Figure 22:
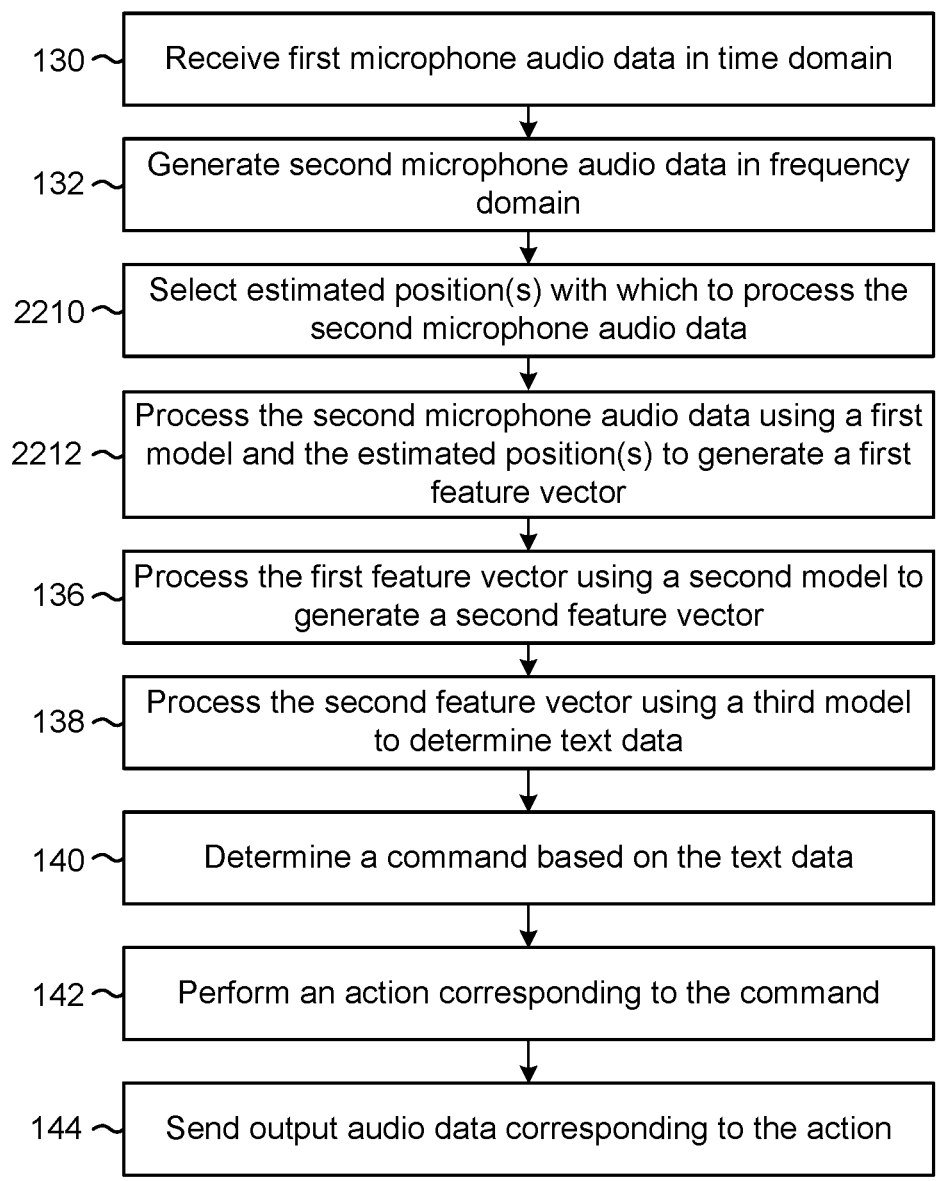
FIG. 22 is a flowchart conceptually illustrating an example method for performing speech processing using a front-end DNN that is initialized with data corresponding to multiple microphone array geometries according to embodiments of the present disclosure.

FIG. 22 is a flowchart conceptually illustrating an example method for performing speech processing using a front-end DNN that is initialized with data corresponding to multiple microphone array geometries according to embodiments of the present disclosure. As illustrated in FIG. 22, the example method illustrated in FIG. 1 may be modified to reduce a number of microphone array geometries with which to process the microphone audio data. Therefore, for ease of explanation, a duplicate description of steps described above with regard to FIG. 1 is omitted.

In the example method illustrated in FIG. 1, the system 100 may process (134) the second microphone audio data using a first model (e.g., MG/MC DNN) and multiple microphone array geometries (e.g., microphone array configuration(s) or estimated positions corresponding to the microphone array configuration(s)) to generate a first feature vector. To improve upon this example method, FIG. 22 illustrates that the system 100 may select (2210) estimated position(s) with which to process the second microphone audio data and may process (2212) the second microphone audio data using the first model and the estimated position(s) to generate the first feature vector. For example, the system 100 may select only the estimated position(s) that are relevant to the device 110 based on a specific microphone array configuration of the device 110 and/or a desired number of input channels, as described above with regard to FIGS. 17B-17C.

Figure 23A:
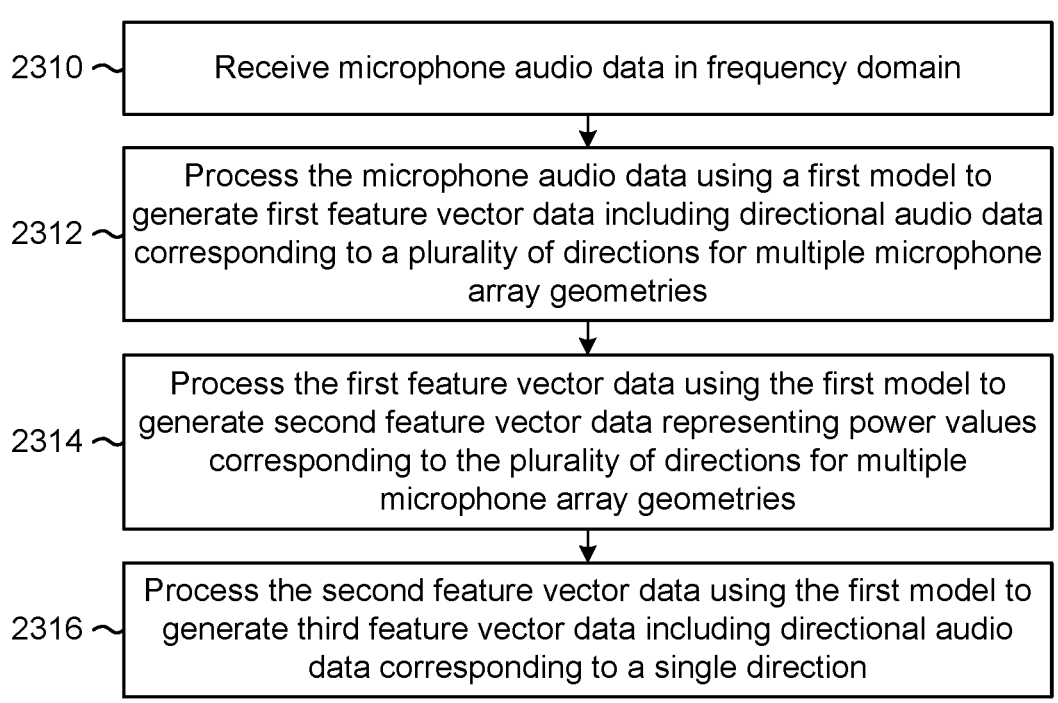
FIGS. 23A-23B are flowcharts conceptually illustrating example methods for processing input audio data using a multi-geometry multi-channel DNN that is initialized with data corresponding to multiple microphone array geometries according to embodiments of the present disclosure.
Figure 23B:
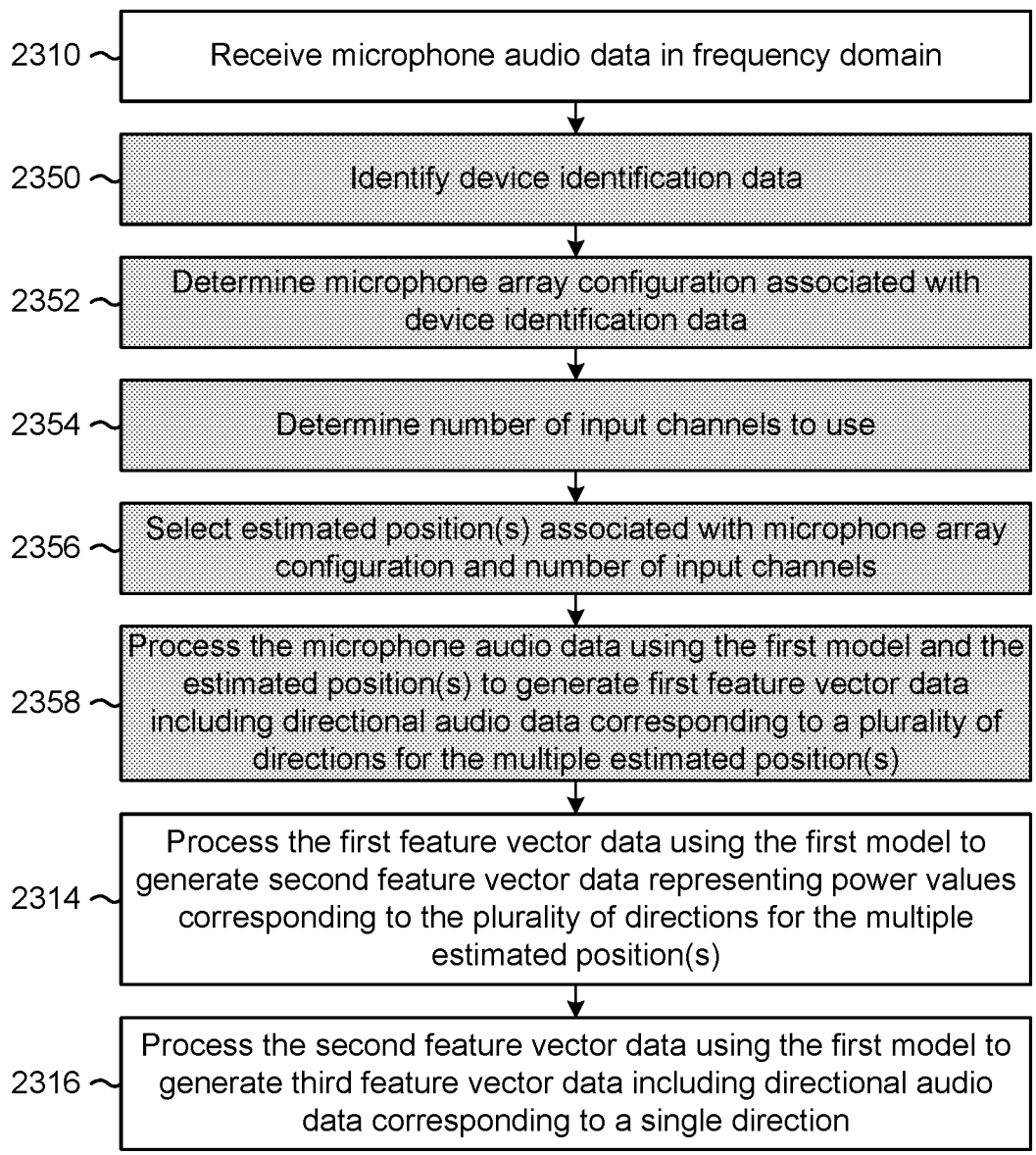

FIGS. 23A-23B are flowcharts conceptually illustrating example methods for processing input audio data using a multi-geometry multi-channel DNN that is initialized with data corresponding to multiple microphone array geometries according to embodiments of the present disclosure. As illustrated in FIG. 23A, the system 100 may receive (2310) microphone audio data in a frequency domain and may process (2312) the microphone audio data using a first model to generate first feature vector data including directional audio data corresponding to a plurality of directions for multiple microphone array geometries. For example, the multiple microphone array geometries may correspond to estimated position(s) associated with one or more microphone array configurations. In some examples the system 100 may select only the microphone array configurations associated with the device 110, although the disclosure is not limited thereto and the system 100 may select a plurality of microphone array configurations without knowing the microphone array configuration(s) associated with the device 110.

The system 100 may process (2314) the first feature vector data using the first model to generate second feature vector data representing power values corresponding to the plurality of directions for the multiple microphone array geometries. The system 100 may process (2316) the second feature vector data using the first model to generate third feature vector data including directional audio data corresponding to a single direction.

As illustrated in FIG. 23B, the system 100 may receive (2310) microphone audio data in a frequency domain. The system 100 may identify (2350) device identification data, may determine (2352) a microphone array configuration associated with the device identification data, may determine (2354) a number of input channels to use, and may select (2356) estimated position(s) associated with the microphone array configuration and the number of input channels. The system 100 may process (2358) the microphone audio data using the first model and the estimated position(s) to generate first feature vector data including directional audio data corresponding to a plurality of directions for the multiple estimated position(s).

The system 100 may process (2314) the first feature vector data using the first model to generate second feature vector data representing power values corresponding to the plurality of directions for the multiple microphone array geometries. The system 100 may process (2316) the second feature vector data using the first model to generate third feature vector data including directional audio data corresponding to a single direction.

Figure 24:
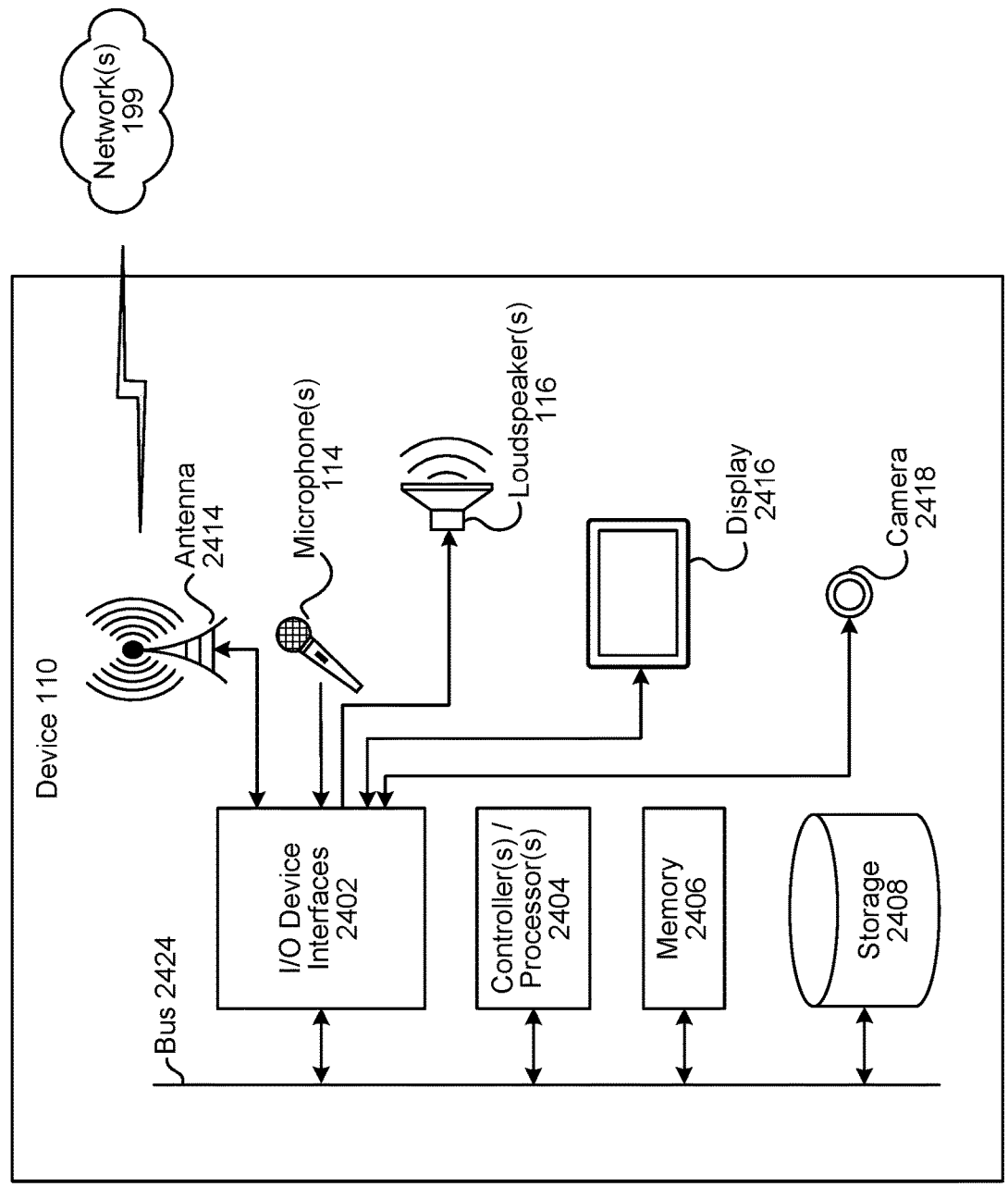
FIG. 24 is a block diagram conceptually illustrating example components of a device according to embodiments of the present disclosure.
Figure 25:
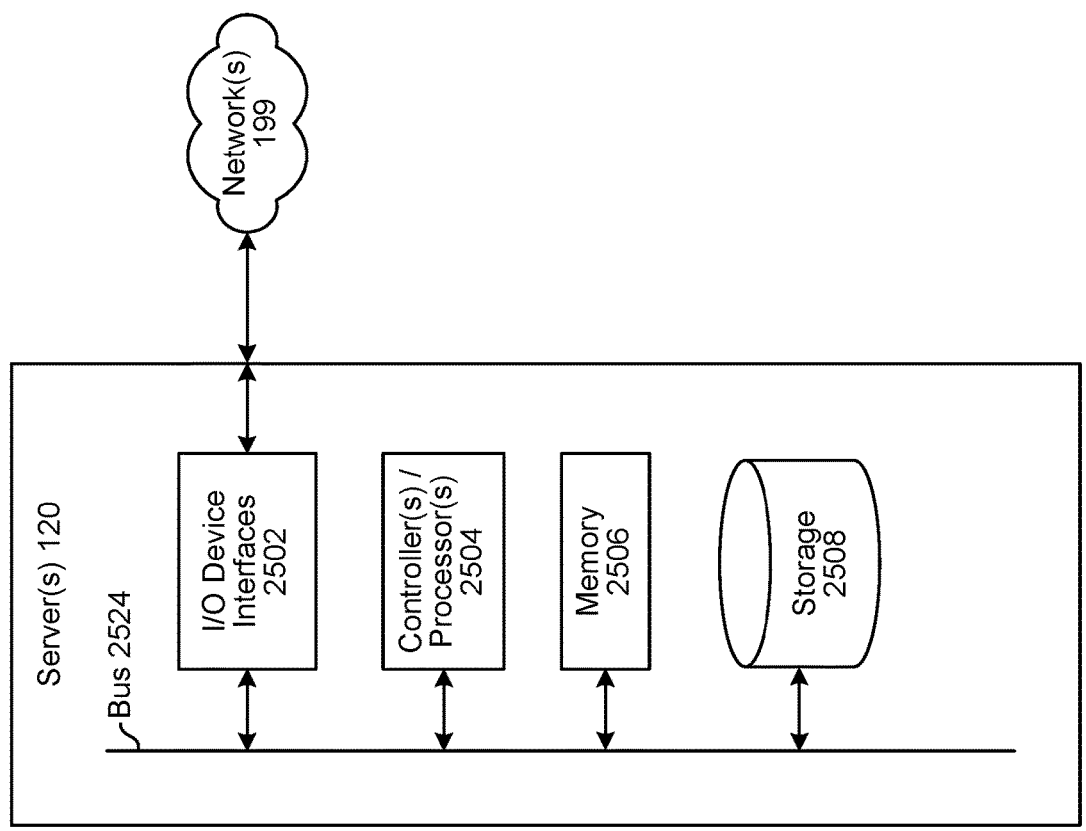
FIG. 25 is a block diagram conceptually illustrating example components of a server according to embodiments of the present disclosure.

FIG. 24 is a block diagram conceptually illustrating a device 110 that may be used with the system. FIG. 25 is a block diagram conceptually illustrating example components of a remote device, such as the server(s) 120, which may assist with ASR processing, NLU processing, etc. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers 120 may be included in the system, such as one or more servers 120 for performing ASR processing, one or more servers 120 for performing NLU processing, etc. In operation, each of these devices (or groups of devices) may include computer-readable and computer-executable instructions that reside on the respective device (110/120), as will be discussed further below.

Each of these devices (110/120) may include one or more controllers/processors (2404/2504), which may each include a central processing unit (CPU) for processing data and computer-readable instructions, and a memory (2406/2506) for storing data and instructions of the respective device. The memories (2406/2506) may individually include volatile random access memory (RAM), non-volatile read only memory (ROM), non-volatile magnetoresistive memory (MRAM), and/or other types of memory. Each device (110/120) may also include a data storage component (2408/2508) for storing data and controller/processor-executable instructions. Each data storage component (2408/2508) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (2402/2502).

Computer instructions for operating each device (110/120) and its various components may be executed by the respective device's controller(s)/processor(s) (2404/2504), using the memory (2406/2506) as temporary "working" storage at runtime. A device's computer instructions may be stored in a non-transitory manner in non-volatile memory (2406/2506), storage (2408/2508), or an external device(s). Alternatively, some or all of the executable instructions may be embedded in hardware or firmware on the respective device in addition to or instead of software.

Each device (110/120) includes input/output device interfaces (2402/2502). A variety of components may be connected through the input/output device interfaces (2402/2502), as will be discussed further below. Additionally, each device (110/120) may include an address/data bus (2424/2524) for conveying data among components of the respective device. Each component within a device (110/120) may also be directly connected to other components in addition to (or instead of) being connected to other components across the bus (2424/2524).

Referring to FIG. 24, the device 110 may include input/output device interfaces 2402 that connect to a variety of components such as an audio output component such as a loudspeaker(s) 116, a wired headset or a wireless headset (not illustrated), or other component capable of outputting audio. The device 110 may also include an audio capture component. The audio capture component may be, for example, microphone(s) 114 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 2416 for displaying content. The device 110 may further include a camera 2418.

Via antenna(s) 2414, the input/output device interfaces 2402 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (2402/2502) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (2402/2502), processor(s) (2404/2504), memory (2406/2506), and/or storage (2408/2508) of the device(s)

110 and server(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are illustrative, and may be located as a stand-alone device or may be included, in whole or in part, as a component of a larger device or system.

Figure 26:
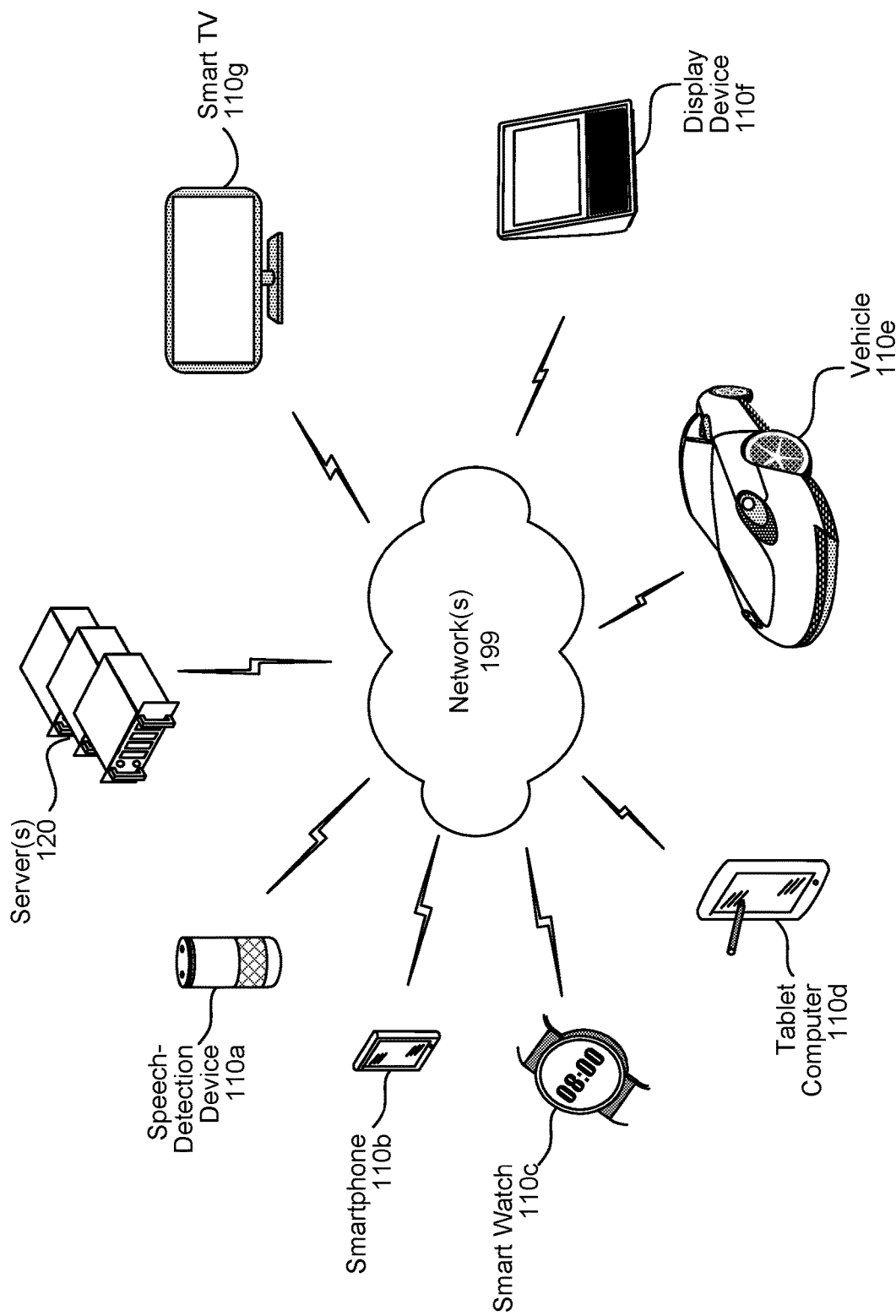
FIG. 26 illustrates an example of a computer network for use with the speech processing system.

As illustrated in FIG. 26, multiple devices (110a-110g, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or smart television 110g may be connected to the network(s) 199 through a wireless service provider, over a WiFi or cellular network connection, via an adapter from a public switched telephone network (PSTN), and/or the like.

Other devices are included as network-connected support devices, such as the server(s) 120, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
    receiving input audio data associated with a device;
    determining a first microphone array configuration associated with the device;
    selecting, using the first microphone array configuration, first coefficient data corresponding to a first estimated position of a first microphone relative to a second microphone;
    selecting, using the first microphone array configuration, second coefficient data corresponding to a second estimated position of the first microphone relative to the second microphone;
    processing the input audio data using a first model to generate:
        first data determined using the first coefficient data corresponding to the first estimated position, wherein a first portion of the first data is associated with a first direction relative to the device and a second portion of the first data is associated with a second direction relative to the device, and
        second data determined using the second coefficient data corresponding to the second estimated position, wherein a first portion of the second data is associated with the first direction and a second portion of the second data is associated with the second direction;

generating first feature vector data based on at least one of the first data or the second data; and sending the first feature vector data to a speech processing device.

2. The computer-implemented method of claim 1, wherein processing the input audio data using the first model further comprises:
   determining that a first portion of the input audio data corresponds to a first frequency range;
   determining, using the first coefficient data, first coefficient values associated with the first direction and the first frequency range;
   determining the first portion of the first data using the first coefficient values and the first portion of the input audio data, wherein the first portion of the first data is associated with the first direction and the first frequency range;
   determining, using the first coefficient data, second coefficient values associated with the second direction and the first frequency range;
   determining the second portion of the first data using the second coefficient values and the first portion of the input audio data, wherein the second portion of the first data is associated with the second direction and the first frequency range;
   determining, using the second coefficient data, third coefficient values associated with the first direction and the first frequency range; and
   determining the first portion of the second data using the third coefficient values and the first portion of the input audio data, wherein the first portion of the second data is associated with the first direction and the first frequency range.

3. The computer-implemented method of claim 1, wherein processing the input audio data using the first model further comprises:
   determining that a first portion of the input audio data corresponds to a first frequency range;
   determining, using the first coefficient data, first coefficient values associated with the first direction and the first frequency range;
   determining a first bias vector that corresponds to the first direction and the first frequency range;
   determining a product of the first portion of the input audio data and the first coefficient values; and
   determining the first portion of the first data by summing the first bias vector with the product.

4. The computer-implemented method of claim 1, wherein generating the first feature vector data further comprises:
   determining a first power value corresponding to the first portion of the first data, wherein the first power value is associated with the first direction and a first frequency range;
   determining a second power value corresponding to the second portion of the first data, wherein the second power value is associated with the second direction and the first frequency range;
   generating second feature vector data, a first portion of the second feature vector data generated by combining the first power value and the second power value, the first portion of the second feature vector data associated with the first frequency range; and
   replacing at least one negative value in the second feature vector data with a value of zero to generate the first feature vector data.

5. The computer-implemented method of claim 1, wherein processing the input audio data using the first model further comprises:
   determining that a first portion of the input audio data corresponds to a first frequency range;
   determining, using the first portion of the input audio data and the first estimated position, the first portion of the first data, wherein the first portion of the first data is associated with the first direction, the first frequency range, and the first estimated position; and
   determining, using the first portion of the input audio data and the second estimated position, the first portion of the second data, wherein the first portion of the second data is associated with the first direction, the first frequency range, and the second estimated position,
   wherein generating the first feature vector data further comprises:
      determining, using the first portion of the first data, a first power value corresponding to the first direction, the first frequency range, and the first estimated position;
      determining, using the first portion of the second data, a second power value corresponding to the second direction, the first frequency range, and the second estimated position; and
      generating a first portion of the first feature vector data using at least the first power value and the second power value, the first portion of the first feature vector data associated with the first frequency range and the first direction.

6. The computer-implemented method of claim 1, wherein processing the input audio data using the first model further comprises:
   processing, using a first layer of the first model and using first transform data associated with the first estimated position, the input audio data to generate the first data; and
   processing, using the first layer of the first model and using second transform data associated with the second estimated position, the input audio data to generate the second data, wherein generating the first feature vector data further comprises:
      processing, using a second layer of the first model, the first data to generate third data including a first power value corresponding to the first direction and the first estimated position;
      processing, using the second layer of the first model, the second data to generate fourth data including a second power value corresponding to the first direction and the second estimated position;
      generating, using a third layer of the first model, fifth data by combining the third data and the fourth data, the fifth data including a third power value corresponding to a weighted sum of the first power value and the second power value; and
      generating, using a fourth layer of the first model, the first feature vector data by replacing at least one negative value in the fifth data with a value of zero.

7. The computer-implemented method of claim 1, wherein processing the input audio data using the first model further comprises:
   processing, using a first layer of the first model and using first transform data associated with the first estimated position, the input audio data to generate the first data; and
   processing, using the first layer of the first model and using second transform data associated with the second estimated position, the input audio data to generate the second data, wherein generating the first feature vector data further comprises:
processing, using a second layer of the first model, the first data to generate third data including a first power value corresponding to the first direction and the first estimated position;
processing, using the second layer of the first model, the second data to generate fourth data including a second power value corresponding to the first direction and the second estimated position;
generating, using a convolutional neural network (CNN) corresponding to a third layer of the first model, fifth data by combining the third data and the fourth data, the fifth data including a third power value corresponding to a first weighted sum of the first power value and the second power value;
generating, using the CNN corresponding to the third layer of the first model, sixth data by combining the third data and the fourth data, the sixth data including a fourth power value corresponding to a second weighted sum of the first power value and the second power value;
determining, using a fourth layer of the first model, that the third power value is greater than the fourth power value; and
generating, using the fourth layer of the first model, the first feature vector data, the first feature vector data including the third power value.

8. The computer-implemented method of claim 1, further comprising:
receiving, by a second model, the first feature vector data;
processing, using the second model, the first feature vector data to generate second feature vector data, a first portion of the second feature vector data corresponding to a first frequency range having a first size, and a second portion of the second feature vector data corresponding to a second frequency range having a second size that is different than the first size; and
sending the second feature vector data to one or more remote devices.

9. The computer-implemented method of claim 1, wherein:
generating the first feature vector data further comprises:
processing the first data and the second data using the first model to generate:
a first portion of the first feature vector data, wherein the first portion of the first feature vector data corresponds to a first frequency range having a first size,
a second portion of the first feature vector data, wherein the second portion of the first feature vector data corresponds to a second frequency range having the first size, and
a third portion of the first feature vector data, wherein the third portion of the first feature vector data corresponds to a third frequency range having the first size;
sending the first feature vector data further comprises sending the first feature vector data to a second model; and
the method further comprises:
processing the first feature vector data using the second model to generate:
a first portion of second feature vector data, wherein the first portion of the second feature vector data corresponds to a fourth frequency range that has a second size and includes the third frequency range, and
a second portion of the second feature vector data, wherein the second portion of the second feature vector data corresponds to a fifth frequency range that has a third size and includes the second frequency range and the third frequency range.

10. The computer-implemented method of claim 1, further comprising:
receiving first audio data from a third microphone associated with the device, the first audio data being in a time domain;
receiving second audio data from a fourth microphone associated with the device, the second audio data being in the time domain;
generating, based on the first audio data, third audio data associated with the third microphone, the third audio data being in a frequency domain;
generating, based on the second audio data, fourth audio data associated with the fourth microphone, the fourth audio data being in the frequency domain;
generating fifth audio data by normalizing the third audio data based on a global mean and a global variance;
generating sixth audio data by normalizing the fourth audio data based on the global mean and the global variance; and
generating the input audio data by concatenating the fifth audio data and the sixth audio data.

11. The computer-implemented method of claim 1, further comprising:
determining that the input audio data corresponds to three or more microphones;
determining that the device is operating in a first mode; and
selecting, in response to determining that the device is operating in the first mode, from a plurality of estimated positions associated with the first microphone array configuration, a first set of estimated positions corresponding to only two microphones and including the first estimated position and the second estimated position,
wherein processing the input audio data further comprises processing, using the first model and the first set of estimated positions, a portion of the input audio data to generate at least the first data and the second data, the portion of the input audio data corresponding to only two of the three or more microphones.

12. The computer-implemented method of claim 1, wherein processing the input audio data using the first model further comprises:
processing, using the first model and the first estimated position, the input audio data to generate the first data, wherein the first data corresponds to a first matrix having a first number of rows and a second number of columns, the first number of rows corresponding to a plurality of frequency bands and the second number of columns corresponding to a plurality of directions; and
processing, using the first model and the second estimated position, the input audio data to generate the second data, wherein the second data corresponds to a second matrix having the first number of rows and the second number of columns,
wherein generating the first feature vector data further comprises:
processing the first data and the second data using the first model to generate the first feature vector data, wherein the first feature vector data corresponds to a third matrix having the first number of rows and a single column.

13. The computer-implemented method of claim 1, further comprising:
   determining, using the first coefficient data, first coefficient values associated with the first direction and a first frequency range;
   determining, using the first coefficient data, second coefficient values associated with the second direction and the first frequency range; and
   determining, using the second coefficient data, third coefficient values associated with the first direction and the first frequency range.

14. The computer-implemented method of claim 1, further comprising:
   selecting from a plurality of estimated positions associated with the first microphone array configuration, a first set of estimated positions corresponding to only two microphones and including the first estimated position and the second estimated position.

15. A system comprising:
   a first microphone and a second microphone;
   at least one processor; and
   memory including instructions operable to be executed by the at least one processor to cause the system to:
      receive input audio data associated with a device, wherein a first segment of the input audio data represents first audio captured by the first microphone and a second segment of the input audio data represents second audio captured by the second microphone;
      retrieve first coefficient data corresponding to a first estimated position of the first microphone relative to the second microphone;
      retrieve second coefficient data corresponding to a second estimated position of the first microphone relative to the second microphone;
      process the input audio data using a first model to generate:
         first data determined using the first coefficient data corresponding to the first estimated position, wherein a first portion of the first data is associated with a first direction relative to the device and a second portion of the first data is associated with a second direction relative to the device, and
         second data determined using the second coefficient data corresponding to the second estimated position, wherein a first portion of the second data is associated with the first direction and a second portion of the second data is associated with the second direction;
      generate first feature vector data based on at least one of the first data or the second data; and
      send the first feature vector data.

16. The system of claim 15, wherein the memory further comprises instructions that, when executed by the at least one processor, further cause the system to:
   determine that the input audio data is associated with first device identification data;
   determine a first microphone array configuration associated with the first device identification data;
   select, using the first microphone array configuration, the first coefficient data corresponding to the first estimated position; and
   select, using the first microphone array configuration, the second coefficient data corresponding to the second estimated position.

17. The system of claim 15, wherein the memory further comprises instructions that, when executed by the at least one processor, further cause the system to:
   determine that a first portion of the input audio data corresponds to a first frequency range;
   determine, using the first portion of the input audio data and the first estimated position, the first data, wherein the first data is associated with the first direction, the first frequency range, and the first estimated position;
   determine, using the first portion of the input audio data and the first estimated position, the second data, wherein the second data is associated with the second direction, the first frequency range, and the first estimated position;
   determine, using the first data, a first power value corresponding to the first direction, the first frequency range, and the first estimated position;
   determine, using the second data, a second power value corresponding to the second direction, the first frequency range, and the first estimated position; and
   generate the first portion of the first feature vector data by summing at least the first power value and the second power value, the first portion of the first feature vector data associated with the first frequency range, the first estimated position, and a combination of the first direction and the second direction.

18. The system of claim 15, wherein the memory further comprises instructions that, when executed by the at least one processor, further cause the system to:
   process, using a first layer of the first model and using first transform data associated with the first estimated position, the input audio data to generate the first data;
   process, using the first layer of the first model and using second transform data associated with the second estimated position, the input audio data to generate the second data;
   process, using a second layer of the first model, the first data to generate third data including a first power value corresponding to the first direction and the first estimated position;
   process, using the second layer of the first model, the second data to generate fourth data including a second power value corresponding to the first direction and the second estimated position;
   generate, using a third layer of the first model, fifth data by combining the third data and the fourth data, the fifth data including a third power value corresponding to a weighted sum of the first power value and the second power value; and
   generate, using a fourth layer of the first model, the first feature vector data by replacing at least one negative value in the fifth data with a value of zero.

19. The system of claim 15, wherein the memory further comprises instructions that, when executed by the at least one processor, further cause the system to:
   process, using a first layer of the first model and using first transform data associated with the first estimated position, the input audio data to generate the first data;
   process, using the first layer of the first model and using second transform data associated with the second estimated position, the input audio data to generate the second data;

process, using a second layer of the first model, the first data to generate third data including a first power value corresponding to the first direction and the first estimated position;

process, using the second layer of the first model, the second data to generate fourth data including a second power value corresponding to the first direction and the second estimated position;

generate, using a convolutional neural network (CNN) corresponding to a third layer of the first model, fifth data by combining the third data and the fourth data, the fifth data including a third power value corresponding to a first weighted sum of the first power value and the second power value;

generate, using the CNN corresponding to the third layer of the first model, sixth data by combining the third data and the fourth data, the sixth data including a fourth power value corresponding to a second weighted sum of the first power value and the second power value;

determine, using a fourth layer of the first model, that the third power value is greater than the fourth power value; and generate, using the fourth layer of the first model, the first feature vector data, the first feature vector data including the third power value.

20. The system of claim 15, wherein the memory further comprises instructions that, when executed by the at least one processor, further cause the system to:

determine a first microphone array configuration associated with the device;

determine that the input audio data corresponds to three or more microphones;

determine that the device is operating in a first mode;

select, in response to determining that the device is operating in the first mode, from a plurality of estimated positions associated with the first microphone array configuration, a first set of estimated positions corresponding to only two microphones and including the first estimated position and the second estimated position; and process, using the first model and the first set of estimated positions, a portion of the input audio data to generate at least the first data and the second data, the portion of the input audio data corresponding to only two of the three or more microphones.

21. A computer-implemented method, the method comprising:

receiving input audio data associated with a device;

retrieving a first estimated position of a first microphone relative to a second microphone;

retrieving a second estimated position of the first microphone relative to the second microphone;

processing the input audio data using a first layer of a first model to generate:

first data determined using the first estimated position, wherein a first portion of the first data is associated with a first direction relative to the device and a second portion of the first data is associated with a second direction relative to the device, and second data determined using the second estimated position, wherein a first portion of the second data is associated with the first direction and a second portion of the second data is associated with the second direction;

generating, using a convolutional neural network (CNN) corresponding to a second layer of the first model, first feature vector data based on at least one of the first data or the second data;

sending the first feature vector data to a second model;

processing, using the second model, the first feature vector data to generate second feature vector data, a first portion of the second feature vector data corresponding to a first frequency range having a first size, and a second portion of the second feature vector data corresponding to a second frequency range having a second size that is different than the first size; and sending the second feature vector data to one or more remote speech processing devices.

* * * * *